United States Patent [19]

Chiba et al.

[11] Patent Number: 5,614,960
[45] Date of Patent: Mar. 25, 1997

[54] IMAGE DATA ENCODING METHOD AND DEVICE, IMAGE DATA RECONSTRUCTING METHOD AND DEVICE, SCENE CHANGE DETECTING METHOD AND DEVICE, SCENE CHANGE RECORDING DEVICE, AND IMAGE DATA SCENE CHANGE RECORD/REGENERATING DEVICE

[75] Inventors: Hirotaka Chiba; Tsugio Noda, both of Kawasaki, Japan

[73] Assignee: Fujitsu Limited, Kawasaki, Japan

[21] Appl. No.: 663,866

[22] Filed: Jun. 19, 1996

Related U.S. Application Data

[63] Continuation of Ser. No. 116,960, Sep. 7, 1993, abandoned.

[30] Foreign Application Priority Data

Sep. 7, 1992 [JP] Japan ................................. 4-238574
Jul. 19, 1993 [JP] Japan ................................. 5-178349

[51] Int. Cl.$^6$ ............................... H04N 7/50; H04N 7/32
[52] U.S. Cl. ........................ 348/700; 348/415; 348/416
[58] Field of Search ................................. 348/700, 415, 348/416; H04N 7/50, 7/36

[56] References Cited

U.S. PATENT DOCUMENTS

| | | | |
|---|---|---|---|
| 4,760,446 | 7/1988 | Ninomiya | 348/700 |
| 4,809,067 | 2/1989 | Kikuchi et al. | 348/417 |
| 5,260,782 | 11/1993 | Hui | 348/416 |
| 5,267,037 | 11/1993 | Sugiyama | 348/415 |

FOREIGN PATENT DOCUMENTS 0473384  3/1992  European Pat. Off. ......... H04N 7/13

OTHER PUBLICATIONS

Tsuboi et al., *System and Device for Picture Data Transfer Reproducing*, Patent Abstracts of Japan, vol. 14, No. 584, Abstract Date: Dec. 27, 1990, for Published Application 2254887, Oct. 15, 1990.

K. S. Thyagarajan et al., *Image Sequence Coding Listing Interframe VDPCM & Motion Compensation*, ICASSP '89, vol. 3, pp. 1858–1861, May 1989.

Kondo, *High Efficiency Coding Device*, Patent Abstracts of Japan, vol. 14, No. 182, Abstract Date: Dec. 4, 1990, for Published Application 203328, Feb. 2, 1990.

*Primary Examiner*—Howard W. Britton
*Attorney, Agent, or Firm*—Staas & Halsey

[57] ABSTRACT

An encoding unit encodes the received image data in frame units. A code buffer stores the amount of codes per 1 frame. The detection condition setting unit sets a detection condition (a standard value of a code amount difference) specified according to the detection designation data entered externally. A scene determining unit calculates the difference between the amount of codes in the present frame entered from the code buffer and the amount of codes in the previous frame. If the difference is larger than the detection condition (the standard value of the code amount difference), the scene determining unit issues a COS code indicating a scene-changed frame and sets a selection signal in an active state. A switch adds the COS code to the encoded data in the present frame and externally outputs it when the selection signal indicates an active state.

59 Claims, 69 Drawing Sheets

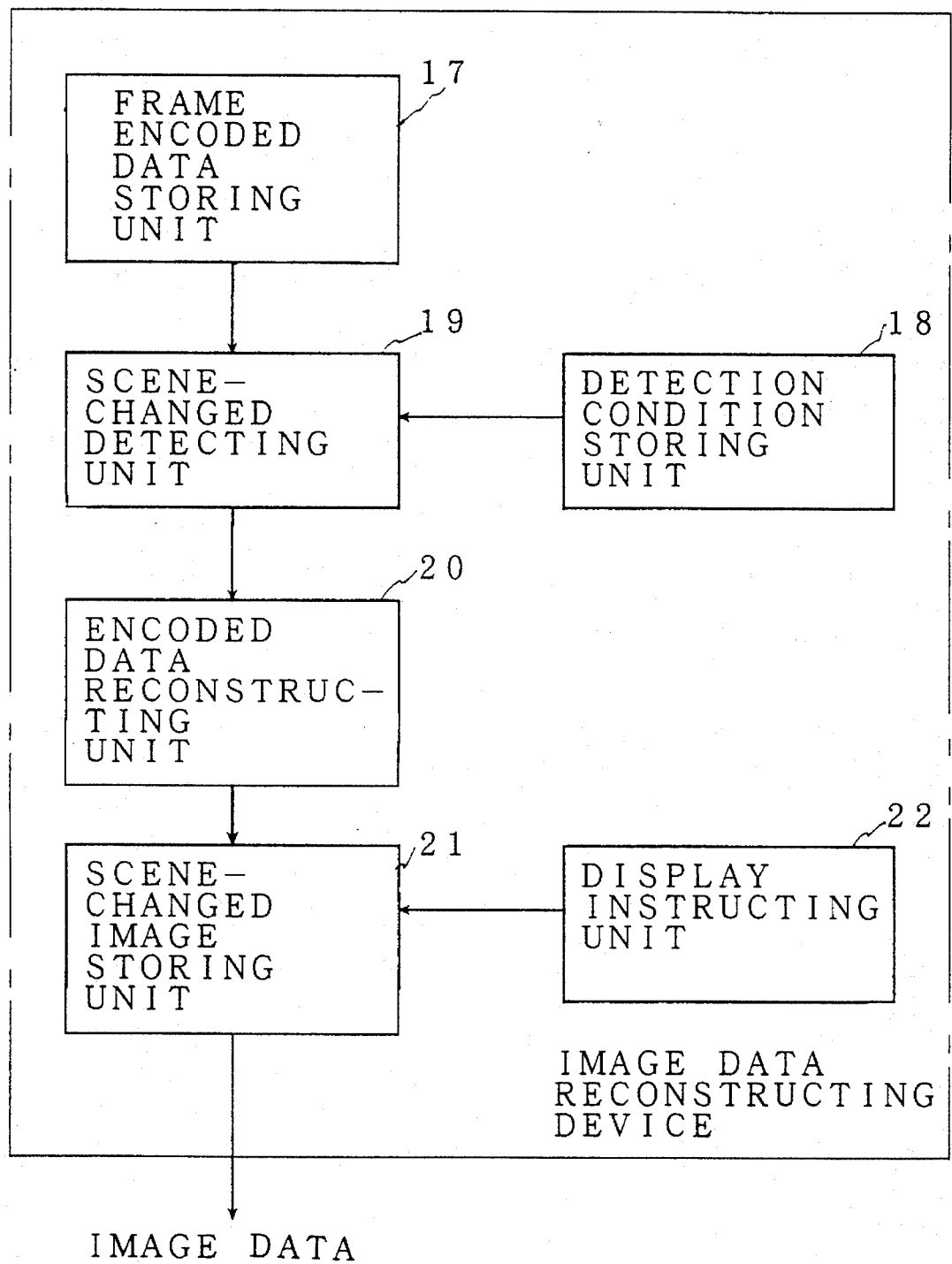
F I G. 9

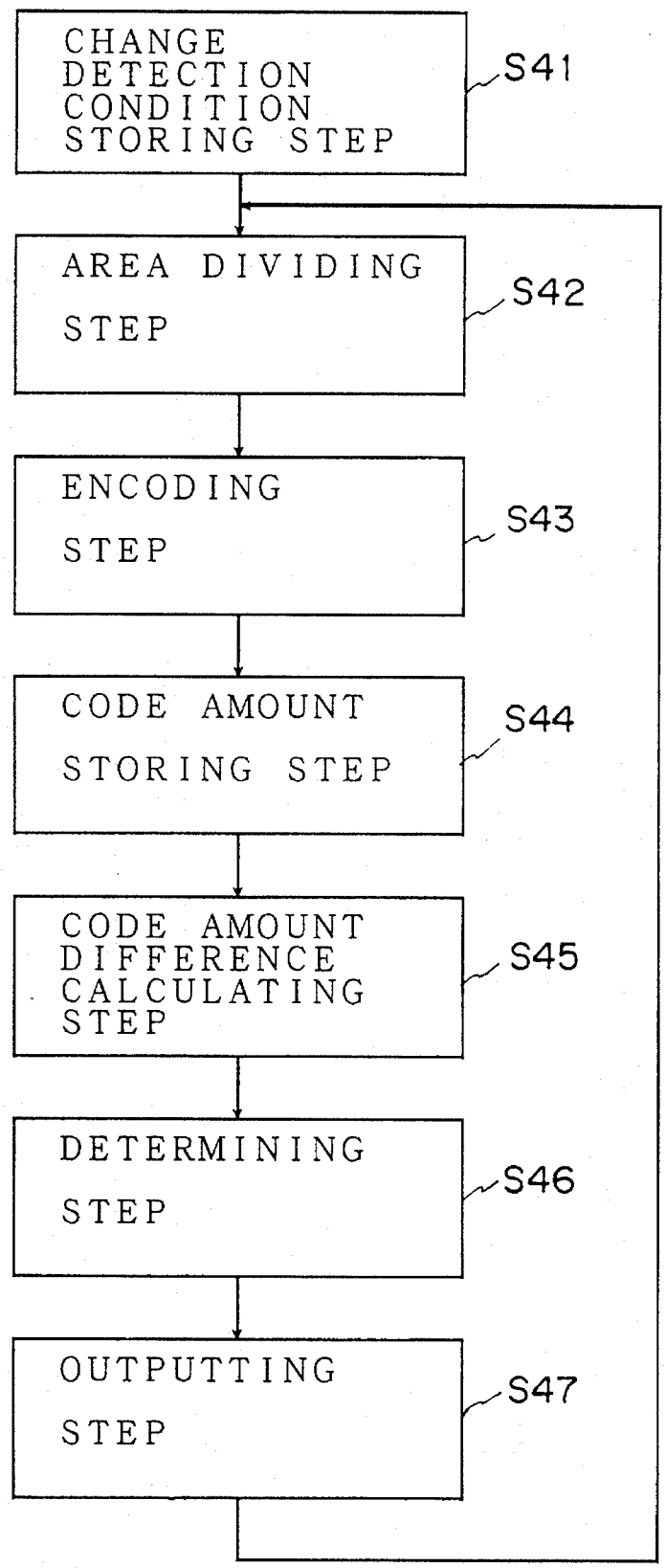
F I G. 1 2

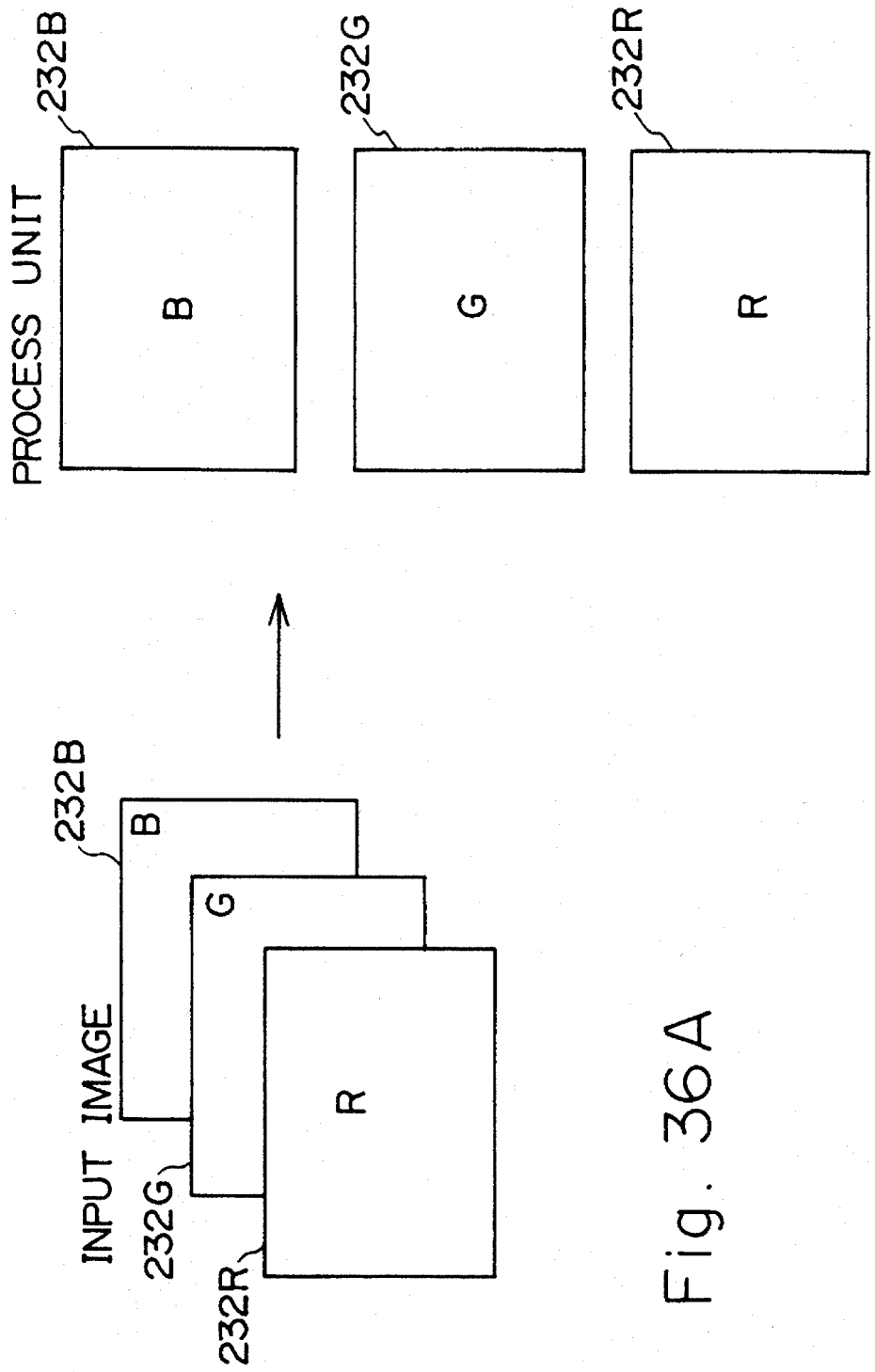

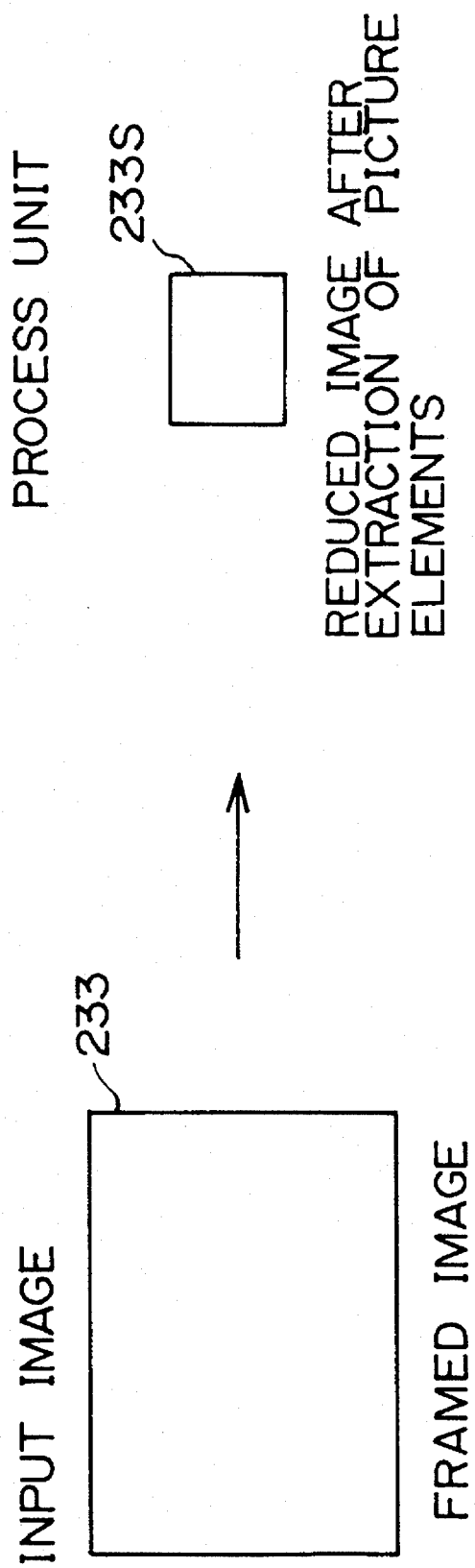

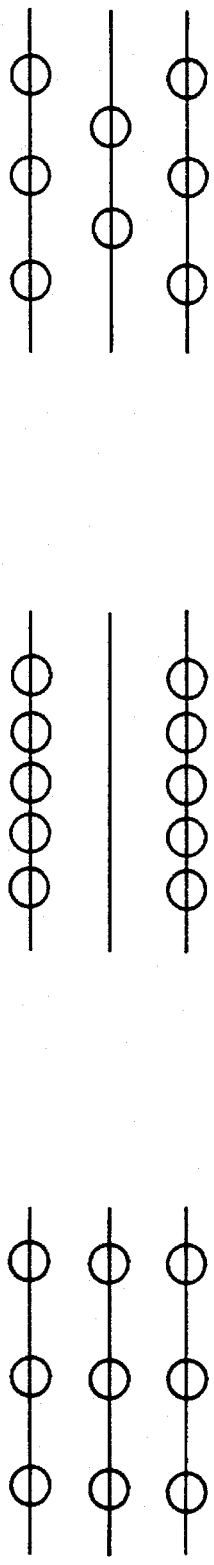

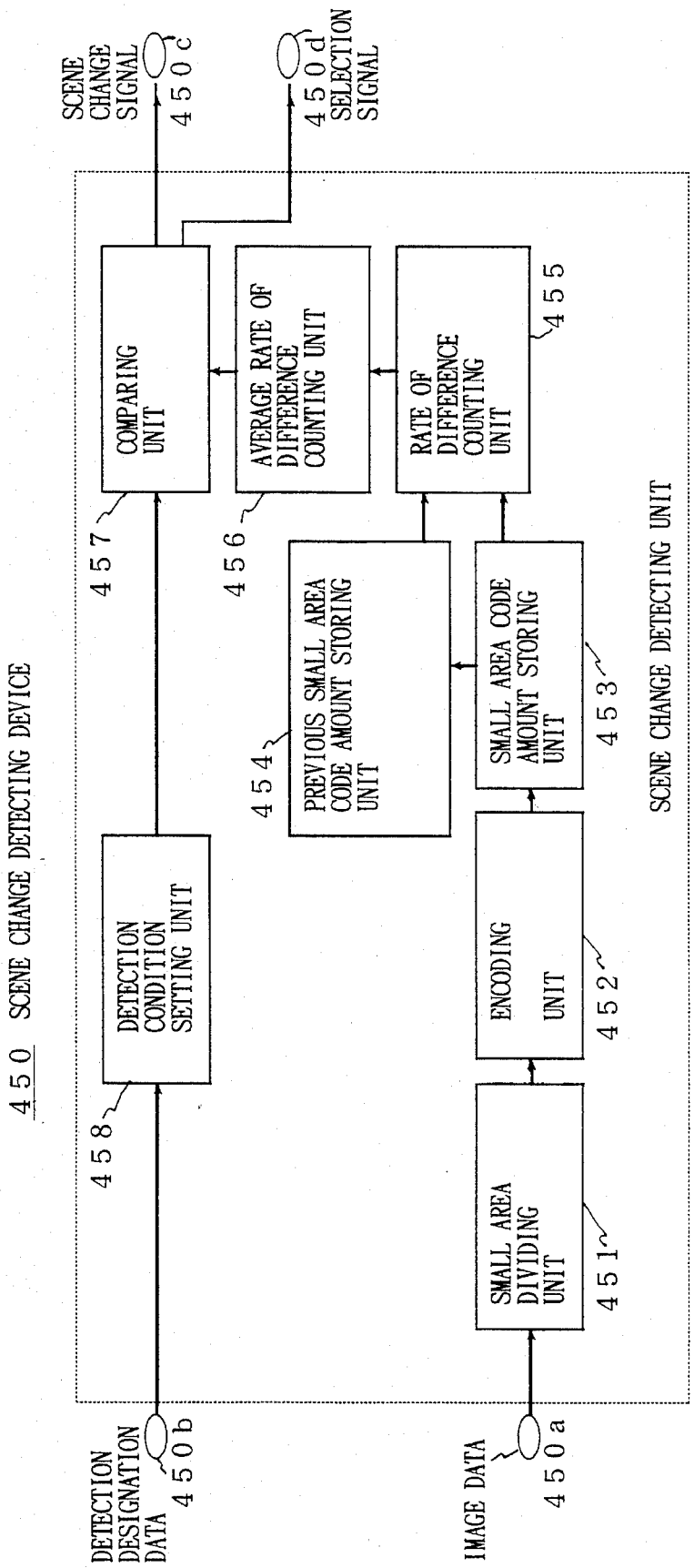
F I G. 4 6

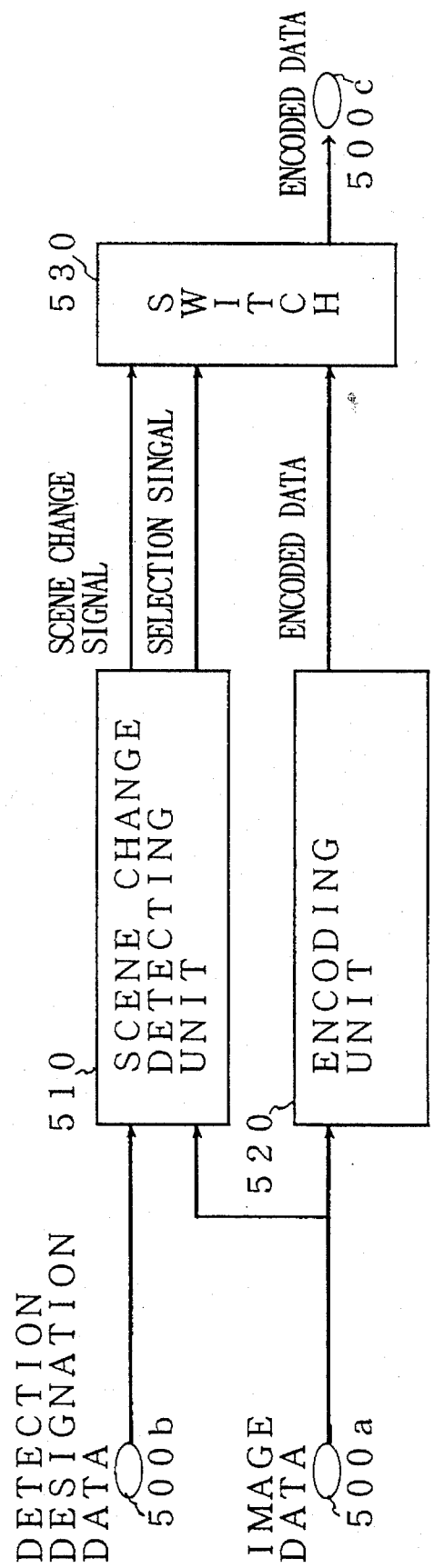
F I G. 4 7

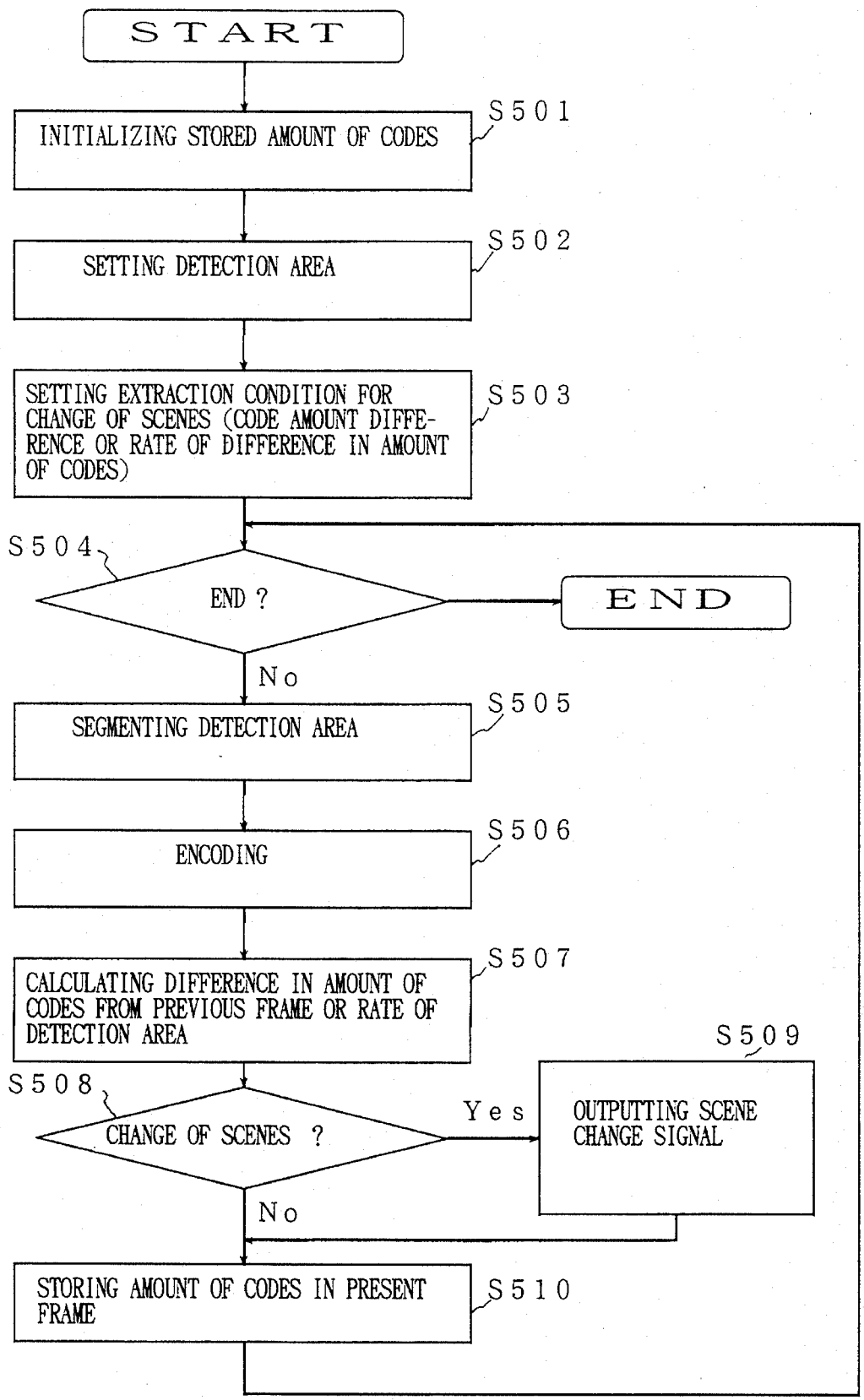
F I G. 5 1

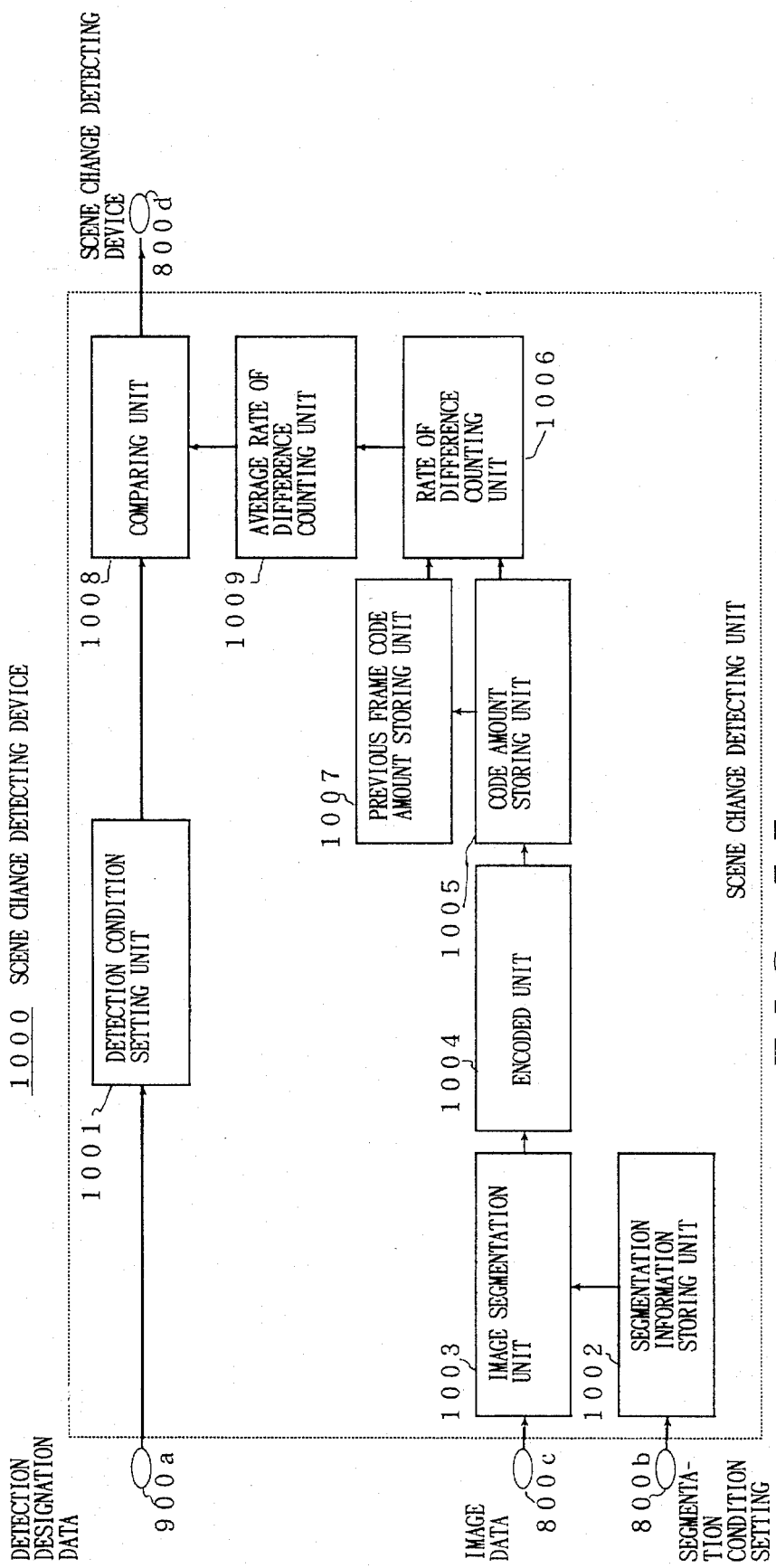
F I G. 5 5

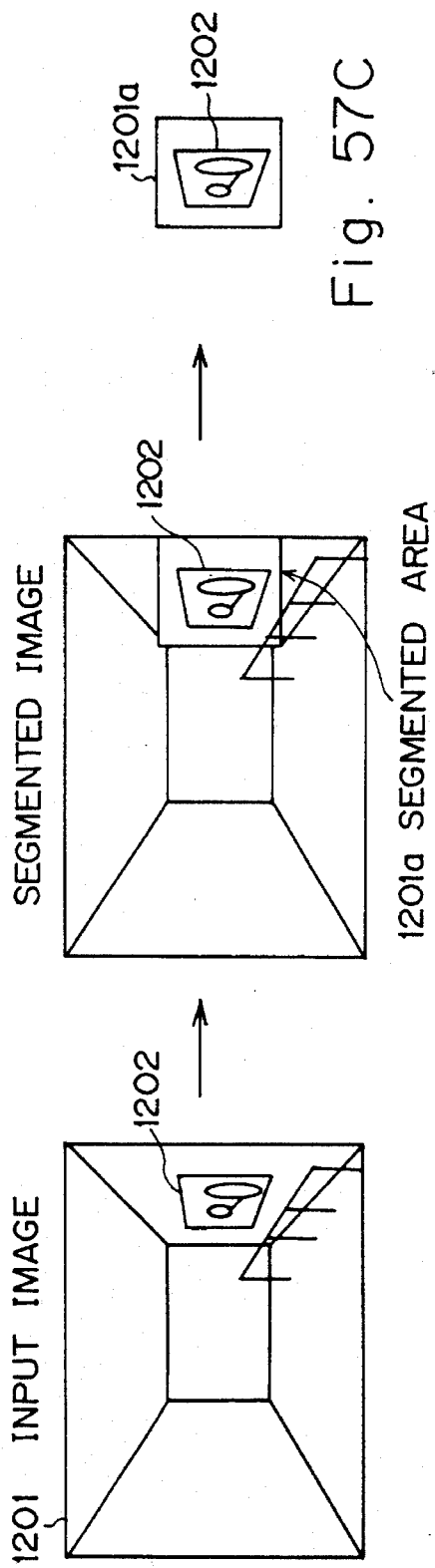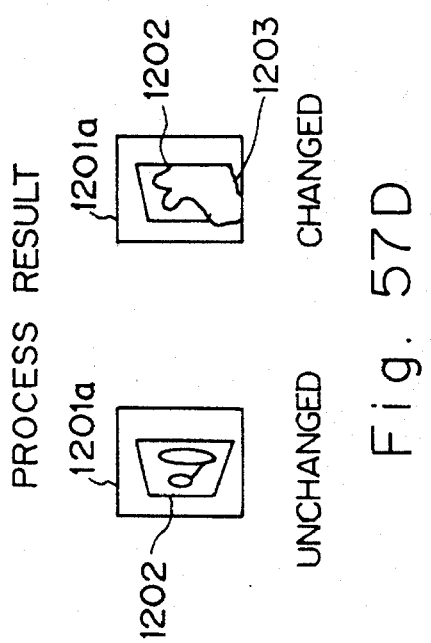

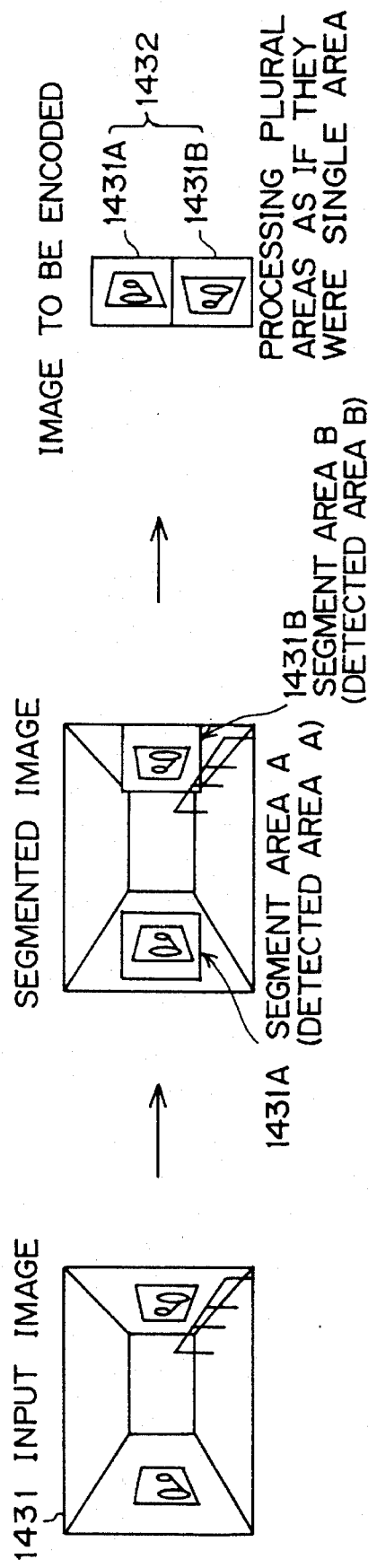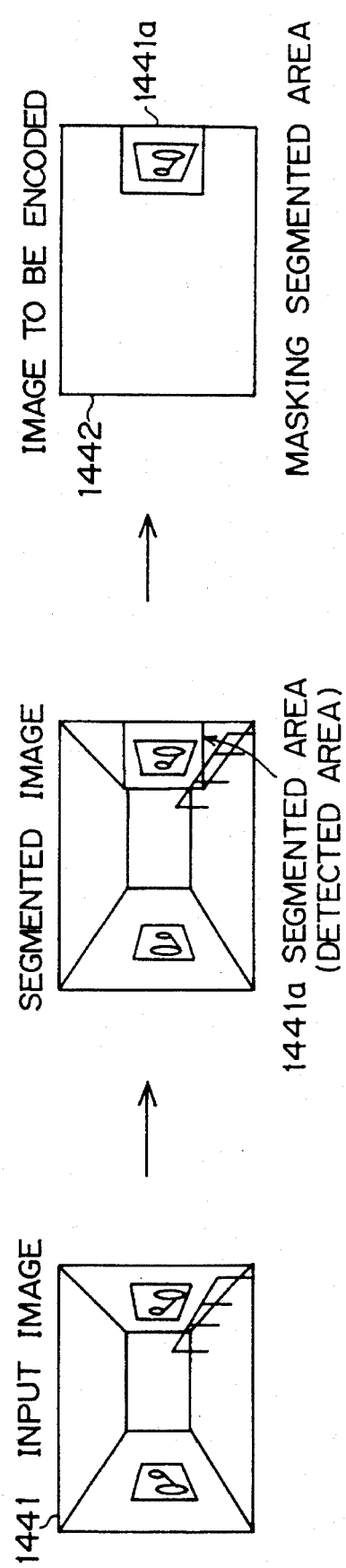
Fig. 59C
Fig. 59D

IMAGE DATA ENCODING METHOD AND DEVICE, IMAGE DATA RECONSTRUCTING METHOD AND DEVICE, SCENE CHANGE DETECTING METHOD AND DEVICE, SCENE CHANGE RECORDING DEVICE, AND IMAGE DATA SCENE CHANGE RECORD/REGENERATING DEVICE

This application is a continuation application Ser. No. 08/116,960, filed Sep. 7, 1993, now abandoned.

BACKGROUND OF THE INVENTION

1. Field of the Invention

The present invention relates to an image data encoding method and device for compressing image data, an image data reconstructing method and device for reconstructing original image data from compressed image data, and a scene-changed frame detecting method and scene change recording/regenerating device for detecting a change of scenes in continuous image frames.

2. Description of the Prior Art

Conventionally, image data having enormously large amount of data, compared with numerical data, specifically gray-scale images and colored image data are stored and transmitted at a high speed with high quality only by efficiently encoding gradation values for each picture element.

An adaptive discrete cosine transform (hereinafter referred to as ADCT for abbreviation) is used to efficiently compress image data. The ADCT is a high-performance encoding method based on a two-dimensional discrete cosine transform (hereinafter referred to as a two-dimensional DCT).

The two-dimensional DCT was published as a proposed recommendation presented by the JPEG (Joint Photographic Experts Group), that is, a joint organization of the CCITT and the ISO which are developing the international standardization of a high-performance encoding of colored static images (referred to is "International Standard in Encoding Multimedia, 1991 version, written by Hiroshi Yasuda, published by Maruzen).

According to the above described ADCT, an input multivalue image are divided into a plurality of blocks each comprising 8×8 picture elements, an image signal (multiple data) for 8×8 picture elements in each block is transformed through a two-dimensional DCT to 8×8 two-dimensional DCT coefficients distributed as spatial frequencies, the two-dimensional DCT coefficients are quantized by a visually adaptive threshold, and the quantized coefficients are encoded to variable-length codes according to a statistically obtained Huffman table.

FIG. 1 is a basic block diagram showing a conventional image data encoding device for encoding a multivalue image according to the ADCT.

With the image data encoding device shown in FIG. 1, a multivalue image is divided into a plurality of blocks each comprising 8×8 picture elements, and inputted in block units from a terminal 134a to a DCT unit 134c through a block buffer 134b. The DCT unit 134c orthogonally transforms through a two-dimensional DCT an input image signal for 8×8 picture elements into 8×8 two-dimensional DCT coefficients distributed as spatial frequencies, and outputs them to a quantizing unit 134d.

The quantizing unit 134d linearly quantizes each of the inputted 8×8 two-dimensional DCT coefficients using a corresponding quantization threshold 134e in a quantization matrix not shown in FIG. 1. As a result, a two-dimensional DCT coefficient smaller than the above described corresponding quantization threshold 134e is set to "0", while DC components (direct current coefficient) and a small amount of AC components (alternating current coefficient) indicate a value other than "0".

As described above, quantized coefficients linearly quantized by the quantizing unit 134d are applied to a variable-length encoding unit 134f.

The variable-length encoding unit 134f refers to a Huffman code table comprising Huffman tables provided for DC components and AC components separately, and encodes an input quantized coefficient string to variable-length codes. That is, for DC components, it refers to a one-dimensional Huffman table, and encodes the difference between the leading DC component and the previous DC component into variable-length codes. For AC components, it refers to a two-dimensional Huffman table, and encodes to variable-length codes the combination of a significant coefficient having a value other than "0" (index) and the run-length of an insignificant coefficient having the value "0" before the significant coefficient. Thus, the variable-length encoding unit 134f encodes DC and AC components into variable-length codes according to the above described Huffman code table 134g, and outputs the encoded data from a terminal 134h.

In encoding a multivalue image according to the ADCT, a quantized coefficient can be determined according to a two-dimensional DCT coefficient and a corresponding quantization threshold 134e in a quantization matrix. The process is performed in block units on all the blocks of one image (one frame). Thus, two-dimensional DCT coefficients for one image (one frame) can be quantized.

FIG. 2 is a block diagram showing a static image reconstructing device for reconstructing an original image from data encoded to variable-length codes. The static image reconstructing device reconstructs an original image from encoded data applied to a terminal 135a through a variable-length code decoding unit 135b, a quantizing unit 135c, and an inverse DCT unit in the order reverse to that for the encoding process shown in FIG. 1. The reconstructed image is sequentially written at corresponding addresses of an image memory 135e to complete the reconstruction of one screen of an image.

That is, to explain further in detail, the data encoded by the static image encoding device are applied in block units from the input terminal 135a to the variable-length code decoding unit 135b via predetermined transmission lines.

The variable-length code decoding unit 135b decodes quantized coefficients containing DC and AC components in each block according to a Huffman code table 135f used in the above described variable-length encoding process.

A dequantizing unit 135c decodes the quantized coefficients containing DC and AC components in each block to two-dimensional DCT coefficients using a quantization threshold 135g used in the above described variable-length encoding process.

The inverse DCT unit 135d performs an inverse two-dimensional DCT using the decoded two-dimensional DCT coefficients in each block, and reconstructs an image signal for each picture element in each block.

The reconstructed image signal for each picture element in each block is written to the image memory 135e in block units.

A writing of an image signal for each picture element in each block to the image memory 135e can be controlled by an intra-block picture element write control unit 135h. That is, the intra-block picture element write control unit 135h controls a block address generating unit 135i such that the block address generating unit 135i outputs an address of a corresponding block in which a picture element signal is to be written, thereby controlling the writing of a reconstructed image in each frame to the image memory 135e in block units.

FIG. 3 shows the configuration of the basic part of a conventional moving picture encoding device for encoding moving picture data by an inter-frame prediction encoding method based on the interrelation between the images in the present and previous frames.

Moving picture in each scene is applied to a difference image generating unit 136b through an input terminal 136a.

An image memory 136c stores standard images (reconstructed images used as images in previous frames).

The difference image generating unit 136b obtains the difference image between a standard image stored in the image memory 136c and the present image (an image in the present frame) applied to the above described input terminal 136a, and stores the difference image in a block buffer 136d. The difference image is obtained for each block containing 8×8 picture elements. Therefore, the block buffer 136d stores the difference image (block difference image) indicating the difference between the images in the present and previous frames, each comprising 8×8 picture elements, at corresponding positions.

A DCT unit 136e performs a two-dimensional DCT on a difference block image comprising 8×8 picture elements stored in the block buffer 136d, obtains 8×8 two-dimensional DCT coefficients, and outputs them to a quantizing unit 136f.

The quantizing unit 136f linearly quantizes inputted two-dimensional DCT coefficients by a visually adaptive threshold, and obtains 8×8 quantized coefficients. The 8×8 quantized coefficients are zigzag scanned and outputted to a variable-length encoding unit 136g in the order of DC components, AC components having a low spatial frequency, and AC components having a high spatial frequency.

The variable-length encoding unit 136g encodes the inputted 8×8 quantized coefficients to variable-length codes according to a Huffman code table 136h, and stores the obtained encoded data in a code buffer 136i.

The 8×8 quantized coefficients outputted from the quantizing unit 136f are applied to a dequantizing unit 136i, and the dequantizing unit 136i decodes the coefficients to 8×8 two-dimensional DCT coefficients.

An inverse DCT unit 136k performs an inverse two-dimensional DCT using the 8×8 two-dimensional DCT coefficients, and reconstructs the difference block image.

An adding unit 136m adds the reconstructed difference block image to the previous image in the corresponding block in the basic image stored in the image memory 136c, and rewrites the resultant image to the image memory 136c.

The encoded data of a difference block image for all blocks of the present image are temporarily stored in the code buffer 136i by performing a series of the operations on all blocks of images in new frames inputted from the input terminal 136a, and then outputted by the terminal 136n. Thus, image data in the present frame are not encoded as is, but the image indicating the difference between the previous and present frames is encoded, thus successfully reducing the number of codes to be processed.

The difference image reconstructed using the encoded data of the difference image is added to the image in the image memory 136c. Then, the image memory 136c stores the image identical to that reconstructed by the reconstructing unit based on the encoded data of the difference image and put in the present frame. The image is used as an image in the previous frame of a standard image when an image in the next frame is applied from the input terminal 136a.

Next, FIG. 4 shows the configuration of the basic part of a conventional moving picture reconstructing device for reconstructing an original image from the encoded data outputted by the above described moving picture encoding device.

When the encoded data of the difference image are sequentially applied in block units from an input terminal 137a, a variable-length code decoding unit 137b decodes them to quantized coefficients in block units according to a Huffman code table 137c similar to the Huffman code table 136h in the conventional moving picture encoding device.

A dequantizing unit 137d dequantizes a decoded quantized coefficient in each block according to a quantization matrix (similar to the quantization matrix used by the dequantizing unit 136i in the conventional moving picture encoding device shown in FIG. 3) not shown in FIG. 4.

An inverse DCT unit 137e performs an inverse two-dimensional DCT in block units using decoded two-dimensional DCT coefficients in each block, and reconstructs a difference image in each block.

An adding unit 137f adds the reconstructed difference image in each block to an image in the corresponding block in an image memory 137g, and rewrites the resultant image in the image memory.

The writing of a reconstructed image in the image memory 137g for each block can be controlled by an intra-block picture element write control unit 137h. That is, the intra-block picture element write control unit 137h controls a block address generating unit 137i such that the block address generating unit 137i outputs to the image memory 137g an address of a block in which a difference image should be stored in the image memory 137g, thereby successfully writing a reconstructed image of each frame in block units.

The image memory 137g stores a reconstructed image of each frame by performing a series of the above described processes on encoded data of difference images of all blocks forming an image in each frame.

In a television broadcasting station which normally processes a large amount of pictures, picture signals accumulated in a storage device are edited. The editing operation is performed manually by an editor by combining picture sources (images) and regenerating pictures to be broadcast. At this time, the head of a combined picture source (change of scenes) can be visually identified in regenerating pictures.

With a video tape recorder for use by a consumer, when a plurality of picture sources are recorded in a roll of video tape, the portion (frame) to be regenerated can be detected by visually determining the change of pictures (scene-changed frame or change of scenes) while regenerating pictures at a high speed.

Thus, with a conventional picture recording/regenerating device, a change of scenes can be extracted visually by a user while regenerating pictures at a high speed.

In the above described editing process at a television station and the detecting process performed at home to detect a desired portion to be regenerated, different scenes contained in a series of recorded moving picture data would be recognized in a short time if the change of scenes could be automatically extracted from the series of recorded moving picture data. In this case, compared with a conventional method of visually detecting a desired scene while regenerating pictures at a high speed, a timesaving operation could be performed and the contents of the whole scenes could be easily recognized. However, such convenient devices have not been developed at all.

If a change of scenes can be automatically extracted from a series of recorded moving picture data, various significant effects can be expected when it is used with an image recording/regenerating device. For example, a recording system for recording moving picture data responsively to motions in pictures can be produced by controlling the recording system according to the extracted information on changes of scenes, only the changes of scenes can be regenerated among a series of recorded moving picture data by recording the extracted information on changes of scenes together with picture information or encoded data, or only the changes of scenes can be recorded and regenerated according to extracted information on changes of scenes.

Since moving picture is composed of a series of static images, the moving picture can be encoded and reconstructed by an encoder and a decoder to be used for processing static images. An encoder for static images has the advantage over that for moving picture that it is based on a simpler method and has a smaller circuit. However, since the above described static image encoding method has aimed at reducing the amount of data to be accumulated and transmitted, other applications such as automatically extracting frames containing changes of scenes from recorded moving picture data have never been expected at all.

SUMMARY OF THE INVENTION

The present invention aims at providing a method and system for performing the following operations with the above described encoder having a small circuit for static images.

1. Automatically extracting (detecting) a frame containing a change of scenes from a series of moving picture data.

2. Encoding moving picture data such that a frame containing a change of scenes (scene-changed frame) can be easily discriminated against a normal frame (scene-unchanged frame).

3. Automatically extracting encoded data indicating frames containing changes of scenes (scene-changed frames) from moving picture data encoded by a general purpose encoder, reconstructing image data of the scene-changed frames, and displaying the image of the scene-changed frames in a predetermined format.

4. Automatically detecting a difference at a specific portion in a picture recorded by a camera, etc., and automatically recording and regenerating scene-changed frames.

5. Automatically recording frames containing changes of scenes only or those frames together with frames within a predetermined time preceded by the frames containing changes of scenes.

6. Automatically extracting frames containing changes of scenes from moving picture data and displaying them.

7. Statically displaying frames containing changes of scenes for a predetermined time while moving picture is regenerated at a high speed.

The image data encoding device according to the present invention comprises a frame encoding unit for sequentially encoding image data in an input frame, a frame encoded data storing unit for storing encoded data of frames whose data are encoded by the frame encoding step, a detection condition storing unit for storing the condition set for detecting that a frame encoded by the frame encoding unit is a scene-changed frame, a scene-changed frame detecting unit for detecting a scene-changed frame according to the difference in the amount of codes between the encoded data in the previous frame stored in the frame code storing unit and the data, encoded by the frame encoding unit, in the present frame, and to the detection condition stored by the detection condition storing unit, and an output unit for outputting encoded data stored in the frame code storing unit and encoded data indicating a scene-changed frame for a scene-changed frame detected by the scene-changed frame detecting unit, and outputting only the encoded data for a normal frame (scene-unchanged frame).

With the configuration, the device detects a scene-changed frame according to the difference in the amount of codes between adjacent frames. It outputs only encoded image data for a normal frame, that is, a scene-unchanged frame. If a frame is a scene-changed frame, it outputs encoded data together with code data indicating that the frame is a scene-changed frame.

Therefore, an image reconstructing unit can easily identify encoded data of a scene-changed frame from those of a scene-unchanged frame according to the existence of the code data indicating a scene-changed frame.

The image data reconstructing device according to the present invention reconstructs image data from the data encoded by the image data encoding device, and comprises a scene-changed frame detecting unit for extracting encoded data of a scene-changed frame from all encoded data, an encoded data reconstructing unit for reconstructing image data from the encoded data of a scene-changed frame extracted by the scene-changed frame detecting unit, a scene-changed frame image storing unit for storing image data of a scene-changed frame reconstructed by the encoded data reconstructing unit, and a display instructing unit for instructing a method of displaying image data in a scene-changed frame stored by the scene-changed frame image storing unit.

With the configuration, it displays on a single screen of a predetermined display device only images indicating scene-changed frames.

The scene change detecting device according to the present invention comprises a detection condition storing unit for storing the condition set for detecting changes of scenes in moving picture data, a previous frame code amount storing unit for storing the amount of codes in image data in the previous frame, a present frame code amount storing unit for storing the amount of codes in image data in the present frame, a code difference storing unit for obtaining the difference between the amount of codes in the previous frame stored in the previous frame code amount storing unit and the amount of codes in the present frame stored in the present frame code amount storing unit, and storing the difference, and a scene change detecting unit for detecting changes of scenes according to the difference in the amount of codes stored in the code difference storing unit and to the detection condition stored in the detection condition storing unit, and outputting a scene change detection signal when changes of scenes are detected.

With the configuration, it detects a change of scenes according to the difference in the amount of codes of image data between adjacent frames, and externally outputs a scene change detection signal if a change of scenes has been detected.

The scene change recording device according to the present invention comprises a signal converting unit for converting to a record instruction signal a scene change detection signal applied from the scene change detecting device and outputting it, and an image signal storing unit 92 for recording image data according to the recording instruction signal applied from the signal converting unit 91.

It records only the image data indicating scene-changed frames among, for example, moving picture data.

The scene change recording/regenerating device comprises a mark signal converting unit for converting a scene change detection signal outputted by the scene change detecting device to a mark signal indicating a change of scenes and outputting it, an image recording unit for, when recording image data, adding a mark signal outputted by the mark signal converting unit to a corresponding image data, an image regenerating unit for regenerating the image data recorded by the image recording unit, an image extracting unit for extracting only the image data provided with a mark signal from the image data regenerated by the image data replying unit, and an image display unit for displaying image data extracted by the image extracting unit.

It records image data in a scene-changed frame after adding to them the above described mark signal to identify them from normal (scene-unchanged) image data. When thus recorded image data are regenerated, only the images in scene-changed frames provided with the above described mark signal are regenerated and displayed.

BRIEF DESCRIPTION OF THE DRAWINGS

One skilled in the art can easily understand additional features and objects of this invention from the description of the preferred embodiments and some of the attached drawings. In the drawings:

FIG. 9 is the block diagram (3) indicating the principle of the second image data reconstructing device;

FIG. 12 is the flowchart indicating the principle of the second image data encoding method;

FIGS. 36A–B show the method (2) of reducing the amount of framed image data;

FIGS. 37A–B show the method (3) of reducing the amount of framed image data;

FIGS. 38A–B show the method (4) of reducing the amount of framed image data;

FIG. 46 is the block diagram showing the scene change detecting device according to the ninth embodiment of the present invention;

FIG. 47 is the block diagram showing the image encoding device according to the 10th embodiment of the present invention;

FIG. 51 is the flowchart indicating the method of detecting a change of scenes according to the 14th embodiment of the present invention;

FIG. 55 is the block diagram showing the scene change detecting device according to the 17th embodiment of the present invention;

FIGS. 57A–D show an example of a practical operation of the scene change detecting device according to the 15th through 18th embodiments of the present invention;

FIGS. 59A–D show the method of designating a segmented area (detection area) in a frame;

DESCRIPTION OF THE PREFERRED EMBODIMENTS

The first image data encoding method comprises a detection condition storing step 1 of storing a detection condition set for detecting a scene-changed frame, an encoding step 2 of encoding image data of an input frame, a code amount storing step 3 of storing the amount of codes in the data, encoded in the encoding step 2, of previous and present frames, a determining step 4 of determining whether or not the present frame is a scene-changed frame according to the amount of codes of the previous and present frames stored in the code amount storing step 3 and to the condition set for detecting a scene-changed frame stored in the detection condition storing step 1, and an output step 5 for outputting, as a determination result of the determining step 4, the encoded data generated in the code amount storing step 3 and a code indicating a scene-changed frame if the present frame is a scene-changed frame, and only the encoded data if the present frame is not a scene-changed frame. The method is configured such that the above listed encoding step 2, the code amount storing step 3, the determining step 4, and the output step 5 are performed on image data in a plurality of frames whose data are to be encoded.

Figure 1:
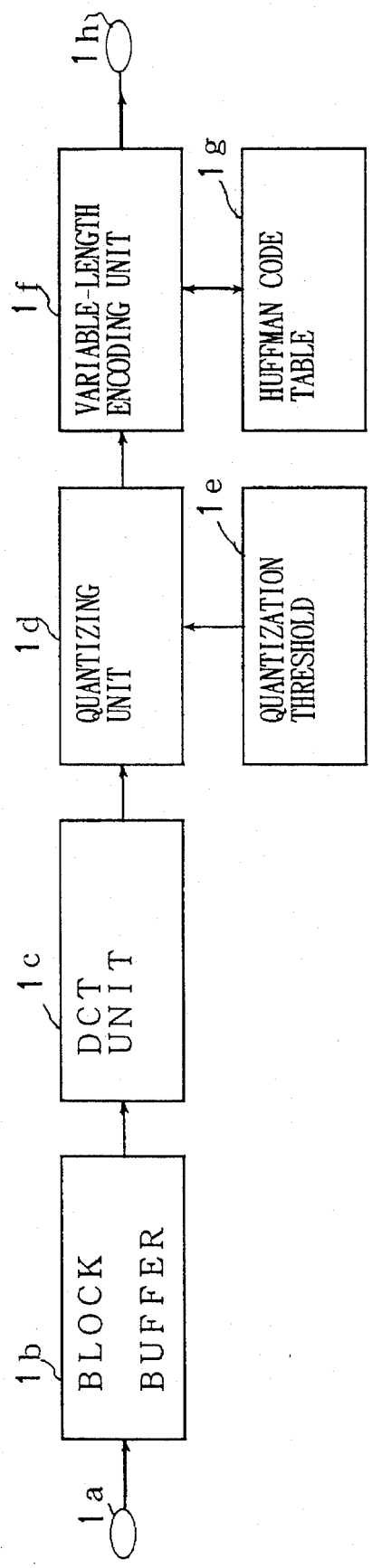
FIG. 1 is the block diagram showing the conventional encoding device for static images.
Figure 2:
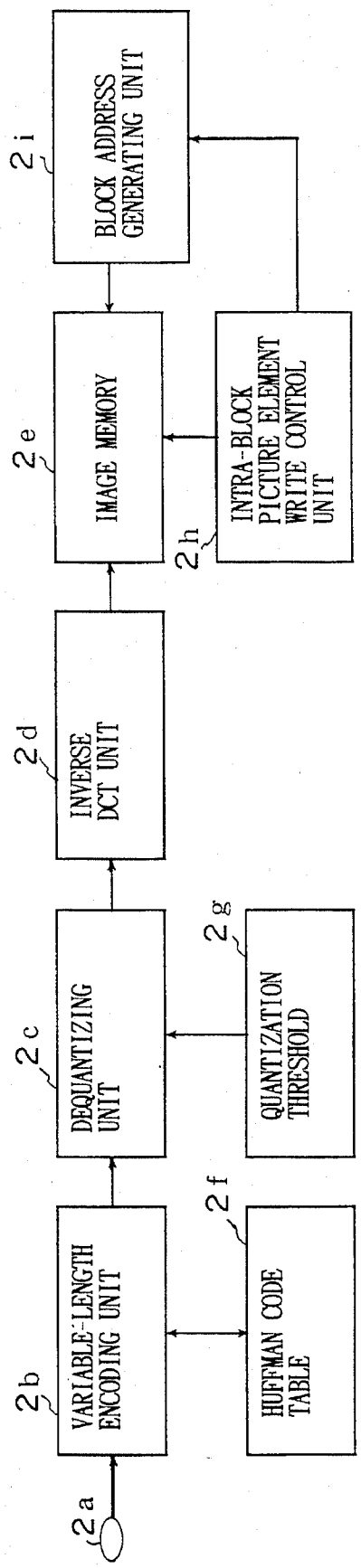
FIG. 2 is the block diagram showing the conventional reconstructing device for static images.
Figure 3:
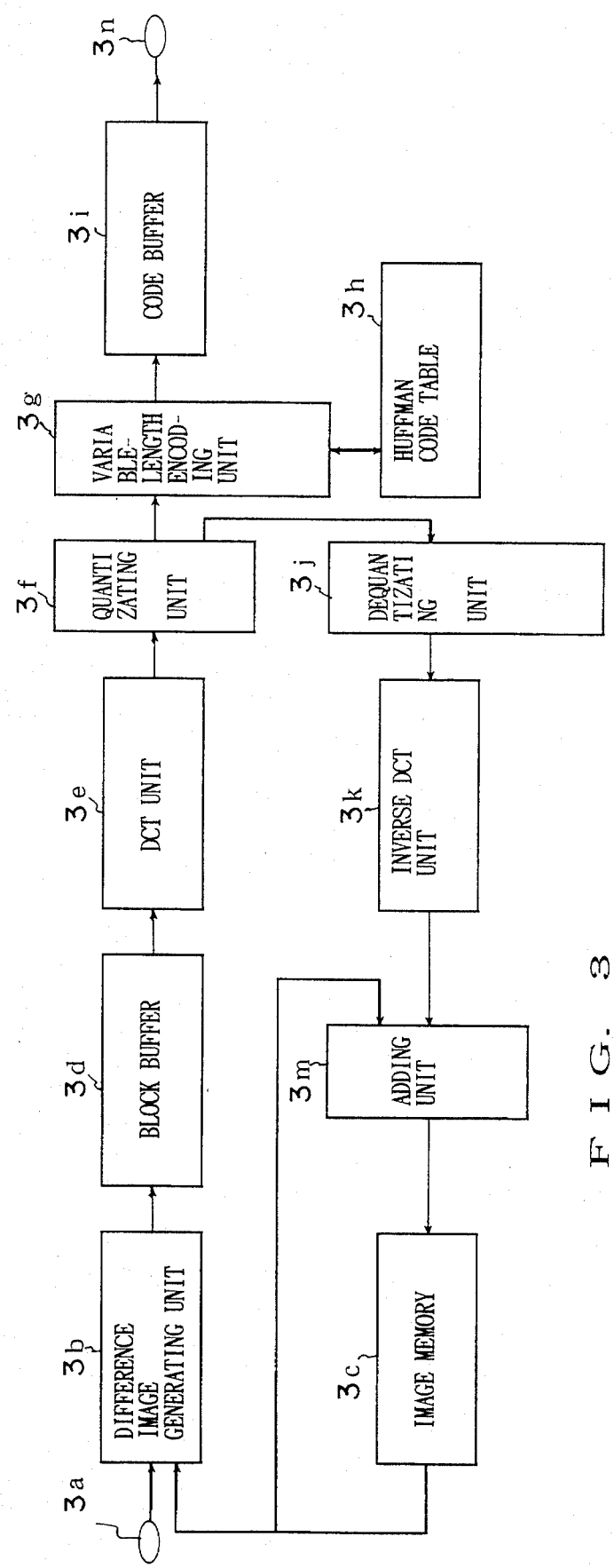
FIG. 3 is the block diagram showing the conventional image encoding device (only the basic portion)
Figure 4:
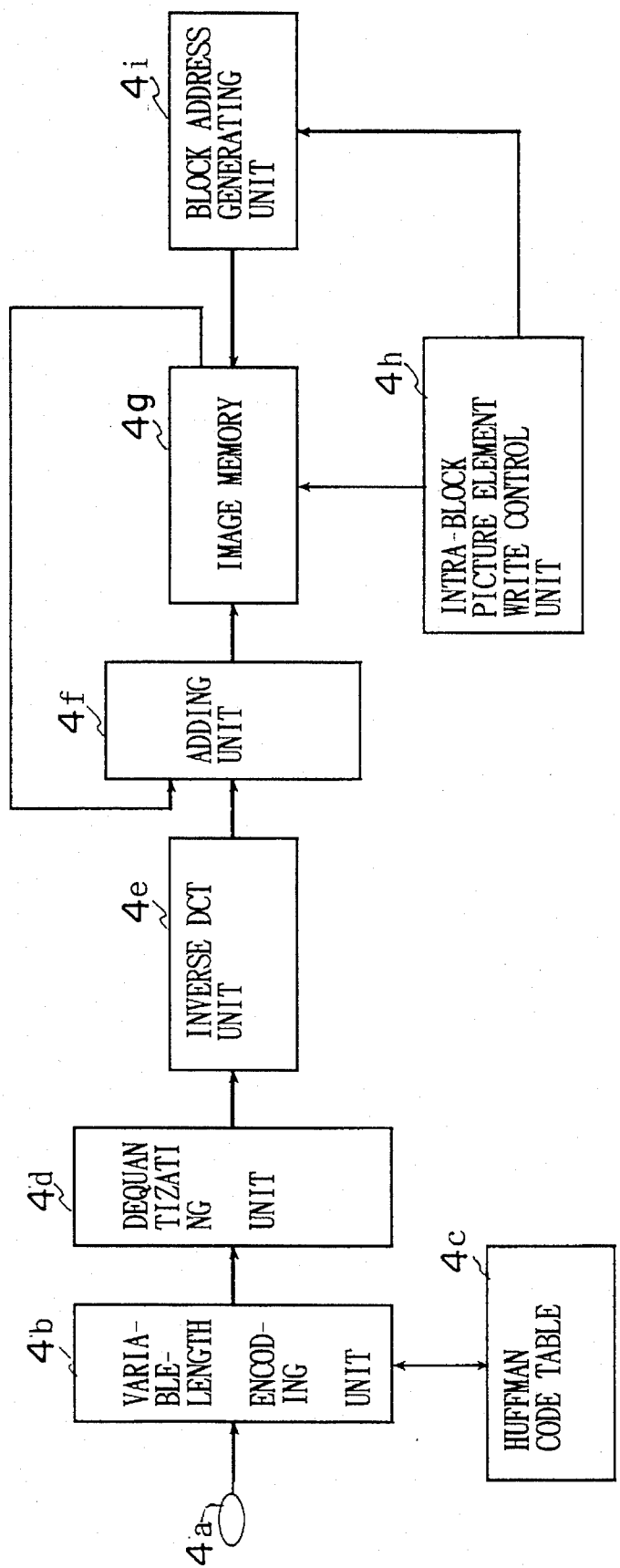
FIG. 4 is the block diagram showing the conventional image reconstructing device (only the basic portion).
Figure 5:
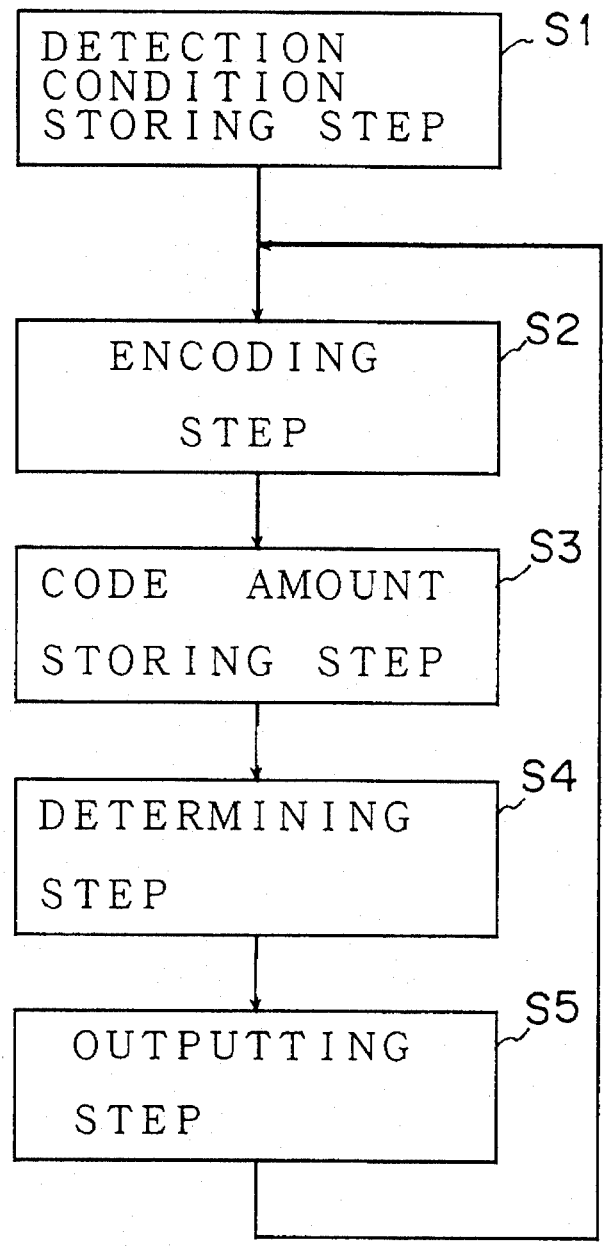
FIG. 5 is the flowchart showing the principle of the first image data encoding method.
Figure 6:
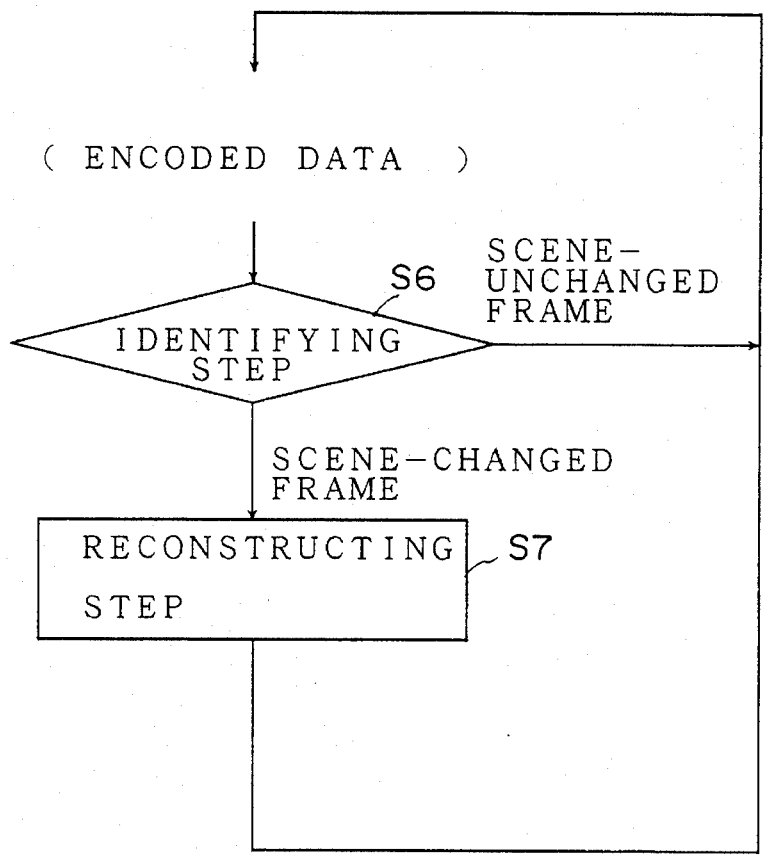
FIG. 6 is the flowchart indicating the principle of the first image data reconstructing method.

FIG. 6 is the flowchart indicating the principle of the method of reconstructing image data from encoded data obtained by the above described first image data encoding method. The reconstructing method comprises an identifying step 6 of identifying a scene-changed frame among the encoded data, and a reconstructing step of reconstructing only the codes of the scene-changed frames identified by the identifying step 6.

Figure 7:
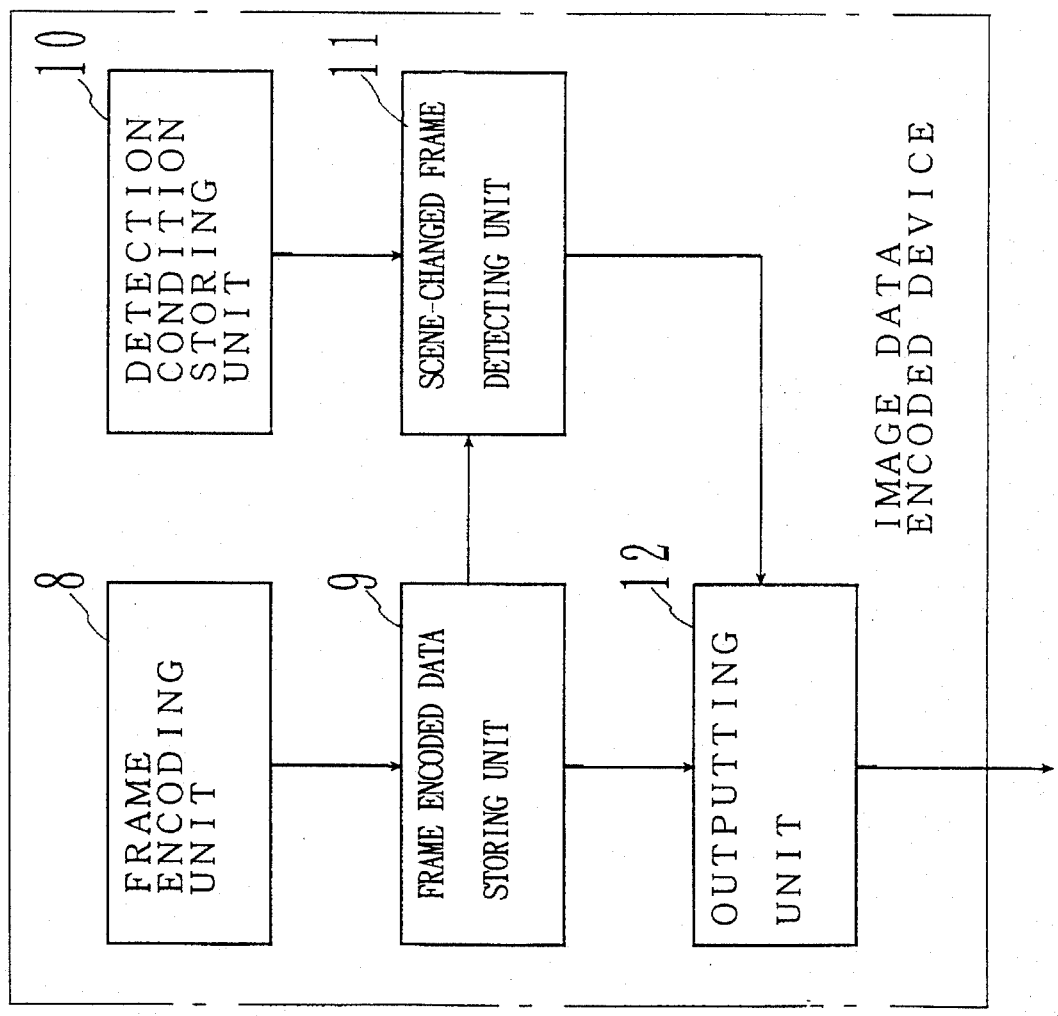
FIG. 7 is the block diagram indicating the principle of the first image data encoding device.

FIG. 7 is the block diagram indicating the principle of the first image data encoding device. The image data encoding device comprises a frame encoding unit 8 for sequentially encoding image data in an input frame, a frame encoded data storing unit 9 for storing encoded data of frames whose data are encoded by the frame encoding unit 8, a detection condition storing unit 10 for storing the condition set for detecting that a frame encoded by the frame encoding unit 8 is a scene-changed frame, a scene-changed frame detecting unit 11 for detecting a scene-changed frame according to the difference in the amount of codes between the encoded data in the previous frame stored in the frame code storing unit 9 and the data, encoded by the frame encoding unit 8, in the present frame, and to the detection condition stored by the detection condition storing unit 19, and an output unit 12 for outputting encoded data stored in the frame code storing unit 9 and encoded data indicating a scene-changed frame for a scene-changed frame detected by the scene-changed frame detecting unit 11, and outputting only the encoded data for a normal frame (scene-unchanged frame).

The above described detection condition storing unit 10 stores as the detection condition of a scene-changed frame a standard value of the difference in the amount of codes between adjacent frames, for example. It also stores as the detection condition of a scene-changed frame the standard value of the rate of difference in the amount of codes between adjacent frames, for example.

Figure 8:
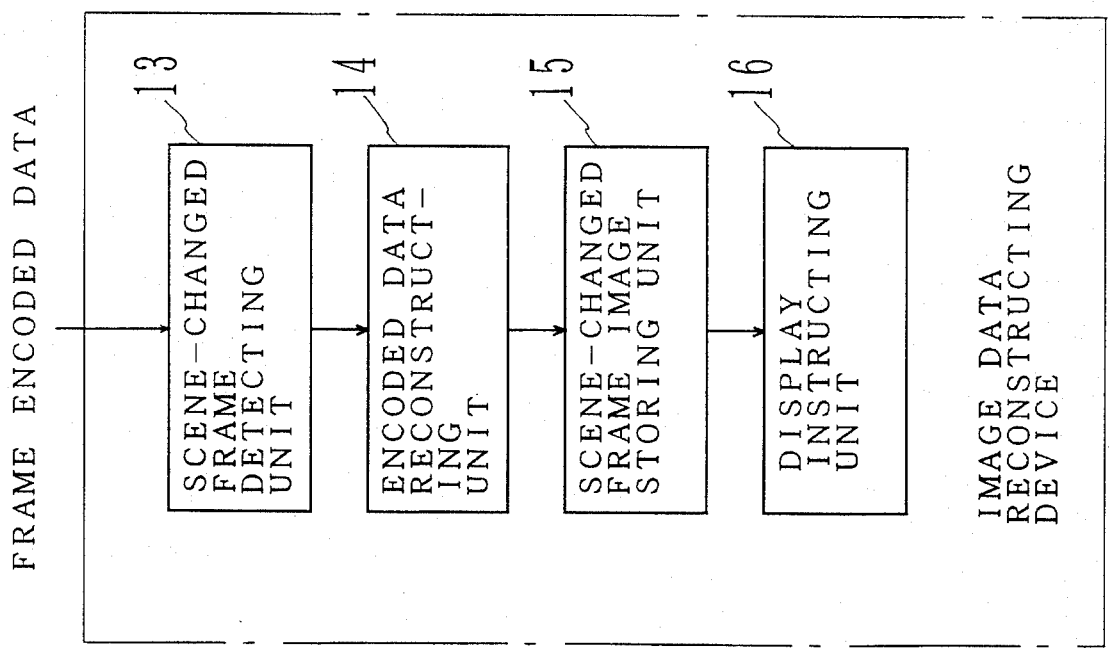
FIG. 8 is the block diagram indicating the principle of the first image data reconstructing device.

FIG. 8 is the block diagram indicating the principle of the first image data reconstructing device. The image data reconstructing device reconstructs image data from the data encoded by the first image data encoding device. It comprises a scene-changed frame detecting unit 13 for extracting encoded data of a scene-changed frame from all encoded data, an encoded data reconstructing unit 14 for reconstructing image data from the encoded data of a scene-changed frame extracted by the scene-changed frame detecting unit 13, a scene-changed frame image storing unit 15 for storing image data of a scene-changed frame reconstructed by the encoded data reconstructing unit 14, and a display instructing unit 16 for instructing a method of displaying image data in a scene-changed frame stored by the scene-changed frame image storing unit 15.

The above described display instructing unit 16 instructs such that scene-changed frames are displayed in sequence. Furthermore, it instructs such that images of a plurality of scene-changed frames are reduced to be displayed on one screen.

FIG. 9 is the block diagram indicating the principle of the second image data reconstructing device. The image data reconstructing device reconstructs image data from moving picture data encoded by an image data encoding device. It comprises a frame encoded data storing unit 17 for storing encoded data of frames, a detection condition storing unit 18 for storing the condition set for detecting that the present frame is a scene-changed frame, a scene-changed frame detecting unit 19 for extracting encoded data of scene-changed frames from the encoded data according to the detection condition stored in the detection condition storing unit 18 and to the difference in the amount of codes, between adjacent frames, inputted from the frame encoded data storing unit 17, an encoded data reconstructing unit 20 for reconstructing image data from encoded data of scene-changed frames extracted by the scene-changed frame detecting unit 19, a scene-changed frame image storing unit 21 for storing image data of the scene-changed frames reconstructed by the encoded data reconstructing unit 20, and a display instructing unit 22 for instructing a method of displaying image data in a scene-changed frame stored by the scene-changed frame image storing unit 21.

Figure 10:
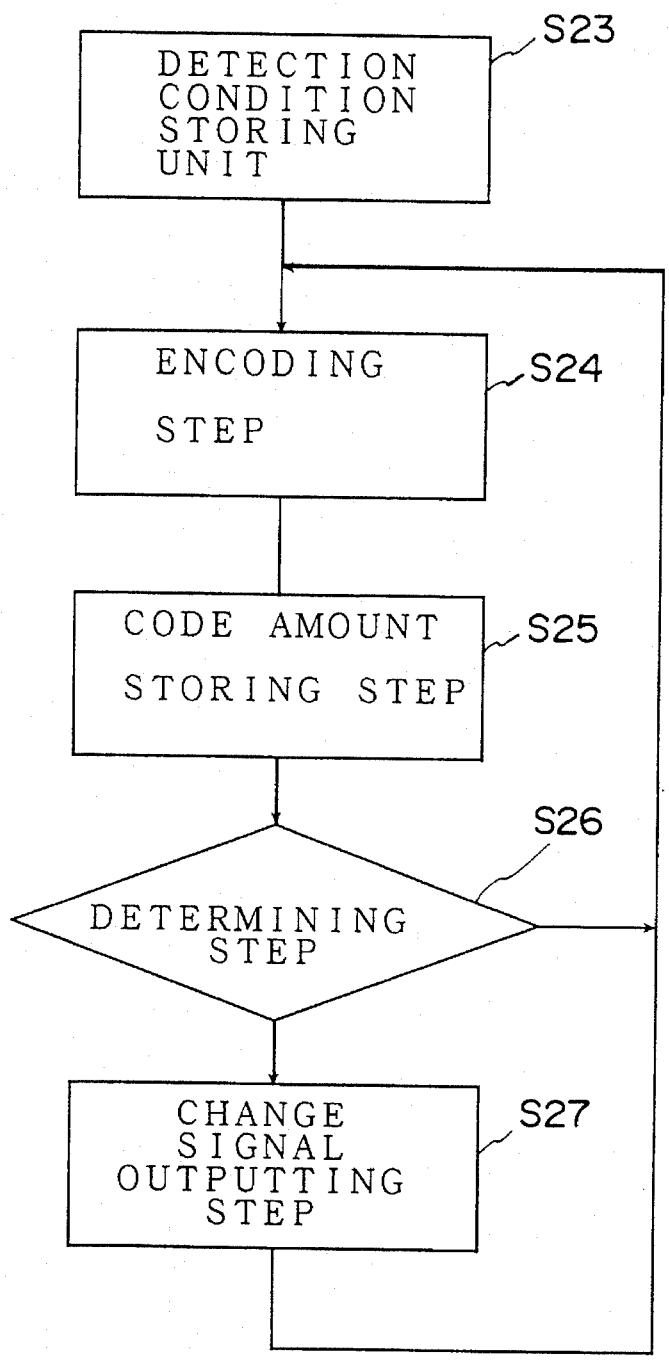
FIG. 10 is the flowchart indicating the principle of the first scene change detecting method.

FIG. 10 is the flowchart indicating the principle of the first scene change detecting method. The scene change detecting method comprises a detection condition storing step 23 of storing a detection condition set for detecting changes of scenes in moving picture data, an encoding step 24 of encoding image data in a frame, a code amount storing step 25 of storing the amount of codes, in a frame, encoded by the encoding step 24, a scene change determining step 26 of determining a change of scenes according to the amount of codes of the previous and present frames stored by the code amount storing step 25 and to the detection condition stored by the detection condition storing step 23, and a change signal outputting step of outputting a scene change detection signal according to the determination result of the scene change determining step 26.

The above described encoding step 24 reduces an original image and performs an encoding process on image data having the reduced amount of data.

Figure 11:
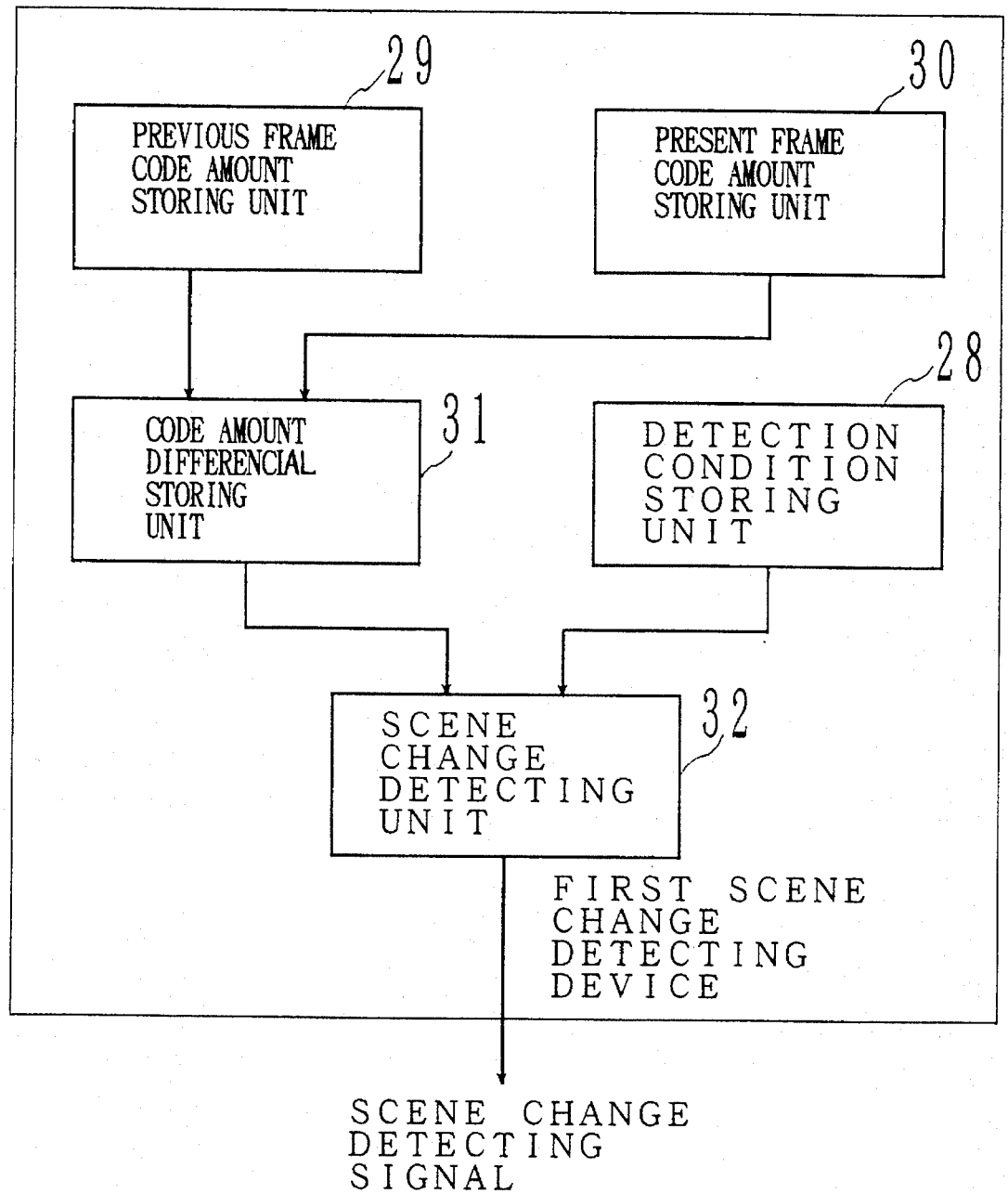
FIG. 11 is the block diagram indicating the principle of the first scene change detecting device.

FIG. 11 is the block diagram indicating the principle of the first scene change detecting device 1500.

The scene change detecting device comprises a detection condition storing unit 28 for storing the condition set for detecting changes of scenes in moving picture data, a previous frame code amount storing unit 29 for storing the amount of codes in image data in the previous frame, a present frame code amount storing unit 30 for storing the amount of codes in image data in the present frame, a code difference storing unit 31 for obtaining the difference between the amount of codes in the previous frame stored in the previous frame code amount storing unit 29 and the amount of codes in the present frame stored in the present frame code amount storing unit 30, and storing the difference, and a scene change detecting unit 32 for detecting changes of scenes according to the difference in the amount of codes stored in the code difference storing unit 31 and to the detection condition stored in the detection condition storing unit 28, and outputting a scene change detection signal when changes of scenes are detected.

FIG. 12 is the flowchart indicating the principle of the second image data encoding method.

The image data encoding method comprises a scene change detection condition storing step 41 of storing the condition set for detecting a change of scenes, an area dividing step 42 of dividing image data in an input frame to a plurality of small areas, an encoding step 43 of encoding the image data separately for each small area of the input frame obtained in the area dividing step 42, a code amount storing step 44 of calculating and storing the amount of codes of encoded data in each small area obtained in the encoding step 43, a code amount difference calculating step 45 for obtaining a predetermined difference in the amount of codes between the present frame and the previous frame in each small area according to the amount of codes of the present and previous frames in each small area stored in the code amount storing step 44, a determining step 46 for determining whether or not the present frame is a scene-changed frame according to the difference calculated in the code amount difference calculating step 45 in the amount of codes in each small area between the present frame and the previous frame, and to the detection condition stored in the scene change detection condition storing step 41, and an outputting step 47 of outputting data, encoded in the encoding step 43, of image data together with a code indicating that the present frame is a scene-changed frame if the present frame is determined to be a scene-changed frame in the determining step 46, and outputting only the data, encoded in the encoding step 43, of the image data if the present frame is determined not to be a scene-changed frame.

The second image data encoding method can also be designed as follows, for example. That is, a detection condition stored in the scene change detection condition storing step 41 refers to a standard value of the sum of absolute values of the differences between the present and previous frames for all small areas. The code amount difference calculating step 45 obtains the difference in the amount of codes between the present and previous frames for each small area. The determining step 46 obtains the sum of absolute values of the differences in the amount of codes between the present and previous frames, and the sum can be compared with the standard value to detect a scene-changed frame.

Likewise, the following configuration can be realized. That is, detection information stored in the scene change detection condition storing step refers to the standard value of the average rate of difference in the amount of codes between the present and previous frames for each small area. The code amount difference calculating step 45 obtains the rate of the difference between the present and previous frames for each small area. The determining step 46 can obtain the average rate of difference in the amount of codes between the present and previous frames for each small area to detect a scene-changed frame by comparing the average rate of difference with the above described standard value.

Furthermore, for example, the area dividing step 42 can divide an input frame to two small areas, that is, odd fields and even fields.

For example, the area dividing step 42 can divide an input frame to small areas each indicating a color component when the input frame refers to colored image data.

Furthermore, for example, the area dividing step 42 can equally divide an input frame to a plurality of blocks as small areas.

For example, image data in a small areas can be encoded in parallel in the encoding step 43.

Figure 13:
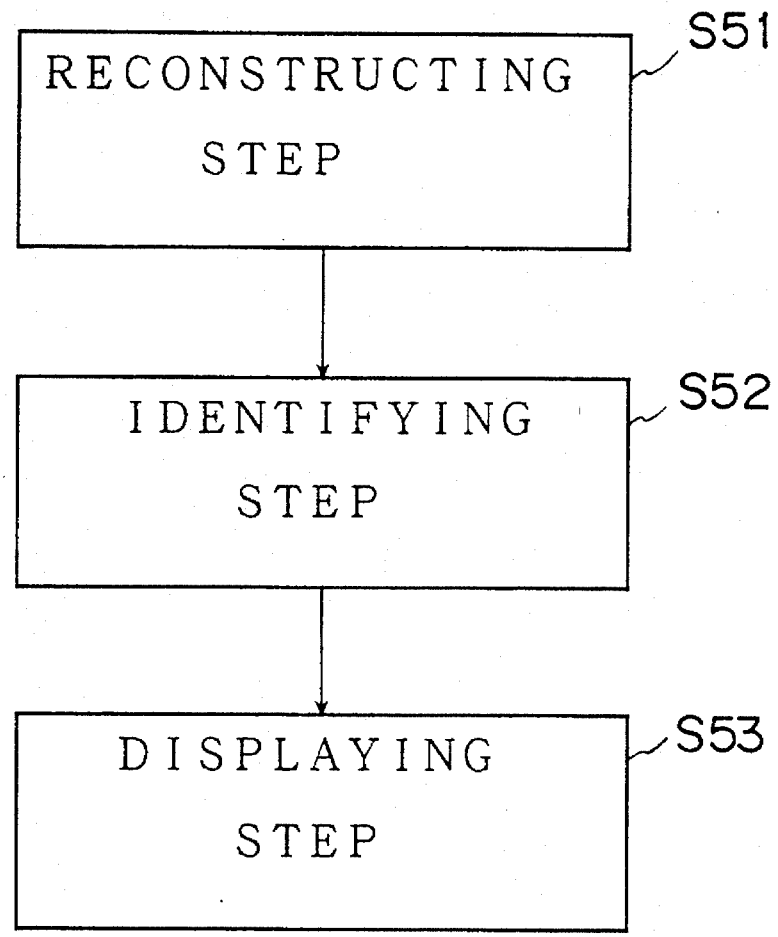
FIG. 13 is the flowchart indicating the principle of the second image data reconstructing method.

FIG. 13 is the flowchart indicating the principle of the second image data reconstructing method. The image data reconstructing method relates to an image data reconstructing method of reconstructing an original image from data encoded by the second image data encoding method. The method comprises a reconstructing step 51 of reconstructing image data from the encoded data, an identifying step 52 of identifying the encoded data of scene-changed frames from the above described encoded data, a displaying step 53 of displaying only image data of scene-changed frames identified in the identifying step 52 among image data in each frame reconstructed by the reconstructing step 51.

Figure 14:
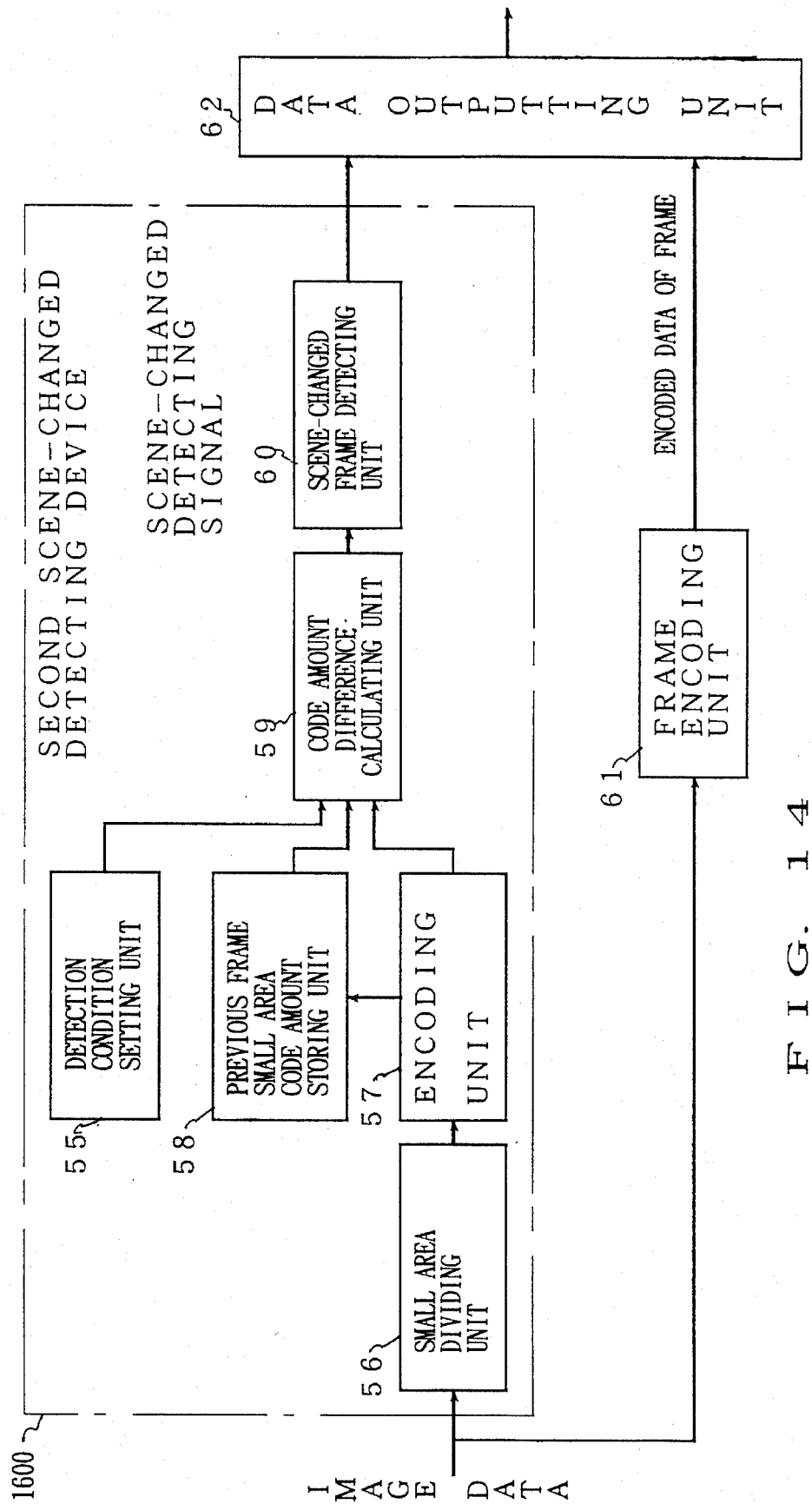
FIG. 14 is the block diagram indicating the principle of the second scene change detecting device and the second image data encoding device.

FIG. 14 is the block diagram indicating the principle of the second scene change detecting device 1600 and the second image data encoding device. The second scene change detecting device 1600 comprises a detection condition setting unit 55 for storing the condition set for detecting a scene-changed frame, a small area dividing unit 56 for dividing image data in an input frame to a plurality of small areas, an encoding unit 57 for individually encoding image data in the plurality of small areas obtained by the small area dividing unit 56, a previous frame small area code amount storing unit 58 for calculating and storing the amount of codes of data, encoded by the encoding unit 57, in all small areas in the previous frame, a code amount difference calculating unit 59 for calculating the amount of codes of data, encoded by the encoding unit 57, in all small areas in the present frame, and obtaining the difference in the amount of codes between the present and previous frames in each small area according to the obtained amount of codes in each of the small areas in the present frame and to the amount of codes in each of the small areas stored in the previous frame small area code amount storing unit 58, and a scene-changed frame detecting unit 60 for detecting a scene-changed frame according to the difference, calculated by the code amount difference calculating unit 59, in the amount of codes between the present frame and the previous frame for all small areas, and to the detection condition stored by the detection condition setting unit 55, and outputting a scene change signal indicating a scene-changed frame if a scene-changed frame has been detected.

The second scene change detecting device 1600 can also be designed as follows, for example. That is, the detection condition setting unit 55 stores as the detection condition the standard value of the sum of the absolute values of the differences in the amount of codes between the present frame and the previous frame for all small areas. The code amount difference calculating unit 59 obtains the difference in the amount of codes between the present frame and the previous frame for each of the small areas. The scene-changed frame detecting unit 60 obtains the sum of differences in the amount of codes between the present frame and the previous frame for all small areas, and detects a scene-changed frame by comparing the sum with the above described standard value.

For example, the detection condition setting unit 55 stores as the detection condition the standard value of the average rate of difference in the amount of codes between the present frame and the previous frame. The code amount difference calculating unit 59 obtains the rate of the difference in the amount of codes between the present frame and the previous frame for each of the small areas. The scene-changed frame detecting unit 60 obtains the average rate of difference in the amount of codes between the present frame and the previous frame for small areas, and compares the average rate of difference with the above described standard value.

The second image data encoding device comprises the second scene change detecting device, a frame encoding unit 61 for encoding image data applied to the scene change detecting device, and a data outputting unit 62 for outputting a code indicating a scene-changed frame together with the data, encoded by the frame encoding unit 61, of the image data if a frame is determined to be a scene-changed frame by the scene change detecting device, and for outputting only the data, encoded by the frame encoding unit 61, of the image data if a frame is determined not to be a scene-changed frame.

Figure 15:
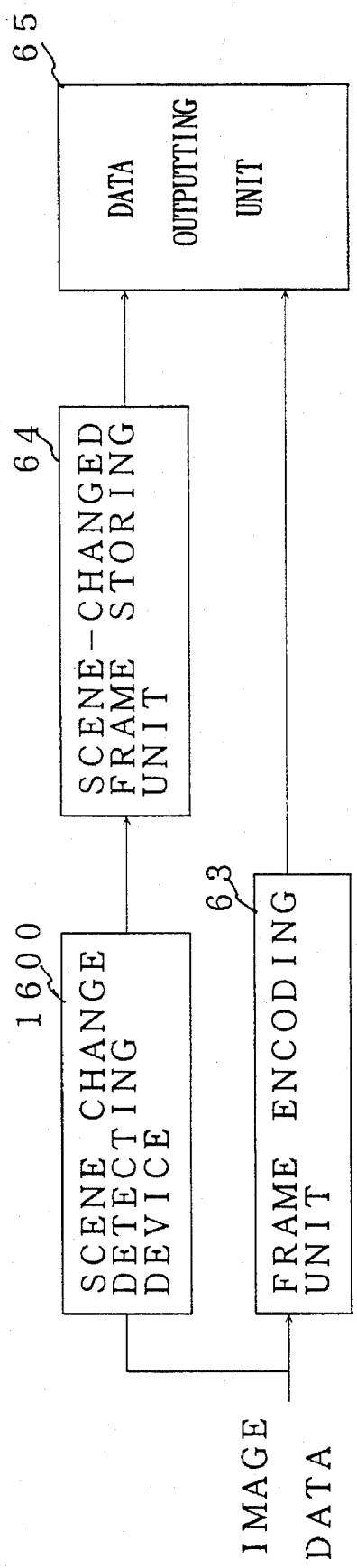
FIG. 15 shows the principle of the third image data encoding device.

FIG. 15 is the block diagram indicating the principle of the third image data encoding device.

The image data encoding device comprises the second scene change detecting device, a frame encoding unit 63 for encoding image data applied to the scene change detecting device, a change frame storing unit 64 for storing the identification information on the frame detected as being a scene-changed frame by the scene change detecting device, and a data output unit 65 for sequentially outputting image data encoded by the frame encoding unit 63 and for outputting the identification information on all scene-changed frames stored in the scene-changed frame storing unit after all encoded data have been outputted.

Figure 16:
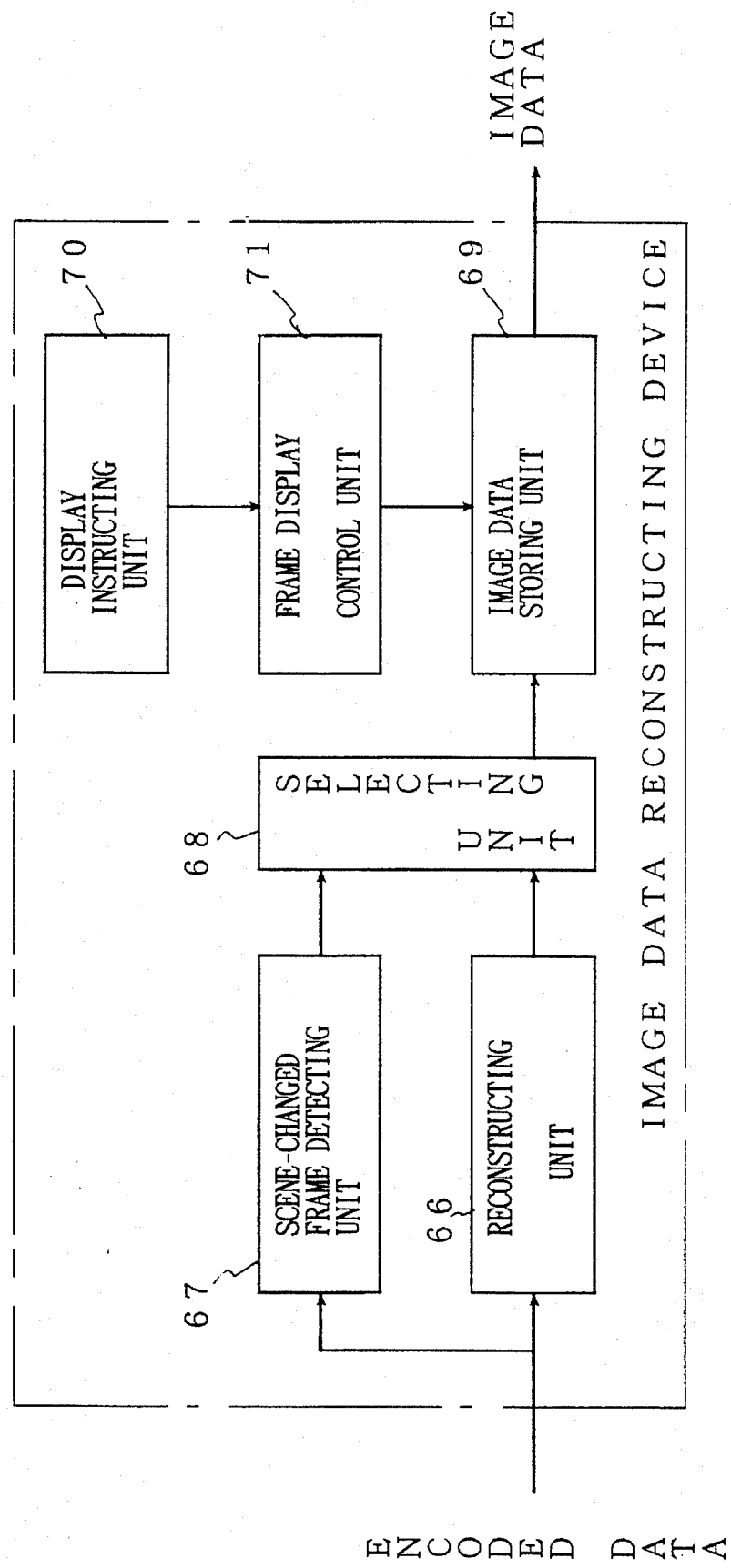
FIG. 16 is the block diagram indicating the principle of the third image data reconstructing device.

FIG. 16 is the block diagram indicating the principle of the third image data reconstructing device. The image data reconstructing device is an image data reconstructing device for reconstructing image data from the data encoded by the second image data encoding device. It comprises a reconstructing unit 66 for reconstructing image data in each frame from the encoded data, a scene-changed frame detecting unit 67 for detecting encoded data in a scene-changed frame in the encoded data, a selecting unit 68 for selecting and outputting only image data in a scene-changed frame detected by the scene-changed frame detecting unit 67 in image data in each frame reconstructed by the reconstructing unit 66, an image data storing unit 69 for storing image data in a scene-changed frame outputted by the selecting unit 68, a display instructing unit 70 for instructing a method of displaying image data in a scene-changed frame stored in the image data storing unit 69, and a frame display control unit 71 for controlling according to the displaying method instructed by the display instructing unit 70 the display of image data in a scene-changed frame stored in the image data storing unit 70.

Figure 17:
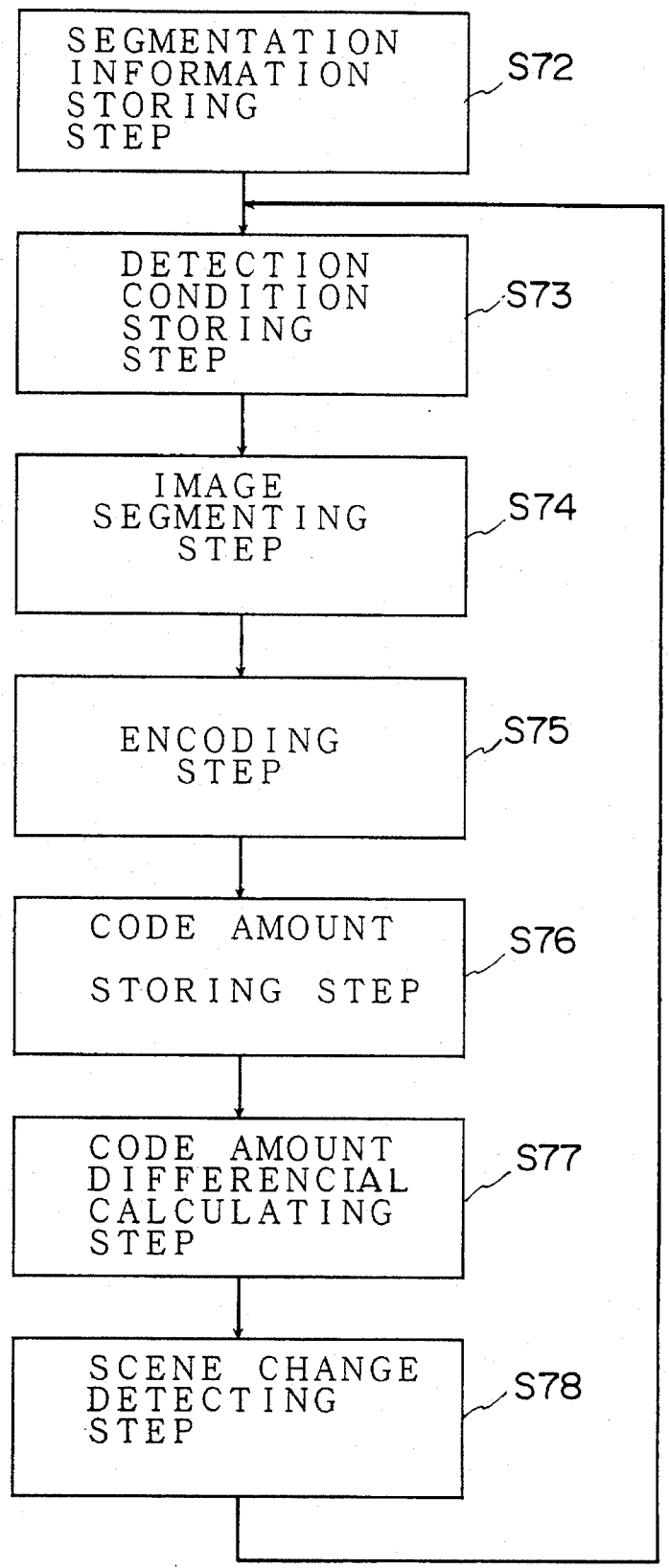
FIG. 17 is the flowchart indicating the principle of the second scene change detecting method.

FIG. 17 is the flowchart indicating the principle of the second scene change detecting method.

The scene change detecting method is a scene change detecting method for detecting a change of scenes in moving picture data. It comprises a segmentation information storing step 72 of storing segmentation information which indicates all areas to be extracted from image data in input frames, a detection condition storing step 73 of storing the condition set for detecting a scene-changed frame in which an image indicates the difference from that in the previous frame, an image segmenting step 74 of segmenting image data in all areas specified by the segmentation information from among image data in input frames according to the segmentation information stored in the segmentation information storing step 72, an encoding step 75 of encoding image data in all areas segmented in the image segmenting step 74, a code amount storing step 76 of storing the amount of codes of the data, encoded in the encoding step 75, in all areas in the previous frame, a code amount difference calculating step 77 of calculating a predetermined difference between the amount of codes in the data encoded by the encoding step 75 in all specified areas in the present frame and the amount of codes in the encoded data, stored in the code amount storing step 76, in the previous frame, and a scene change detecting step 78 of determining whether or not there is a change of scenes between the present frame and the previous frame in a specified area according to the difference calculated in the code amount difference calculating step 77 and to the detection condition stored in the detection condition storing step 76, and outputting a scene change signal if the determination indicates a scene-changed frame.

The second scene change detecting method can also be designed as follows. That is, the detection condition stored in the detection condition storing step 73 refers to the standard value of the sum of the absolute values of the differences in the amount of codes. The code amount difference calculating step 77 obtains the sum of the differences in the amount of codes between the present frame and the previous frame for all specified areas. The scene change detecting step 78 determines whether or not there is a change of scenes between the present frame and the previous frame in a specified area by comparing the sum of the absolute values of the differences in the amount of codes calculated in the code amount difference calculating step 77 with the above described standard value.

Likewise, the detection condition stored in the detection condition storing step 73 refers to the standard value of the average rate of difference in the amount of codes. The code amount difference calculating step 77 obtains the average rate of difference in the amount of codes between the present frame and the previous frame for all specified areas. The scene change detecting step 78 determines whether or not there is a change of scenes between the present frame and the previous frame in a specified area by comparing the average rate of difference in the amount of codes calculated in the code amount difference calculating step 77 with the above described standard value.

Furthermore, the image segmenting step 74 can be designed to segment image data of a specified area in compressed image data obtained by compressing original image data in a frame by a predetermined compressing method.

Figure 18:
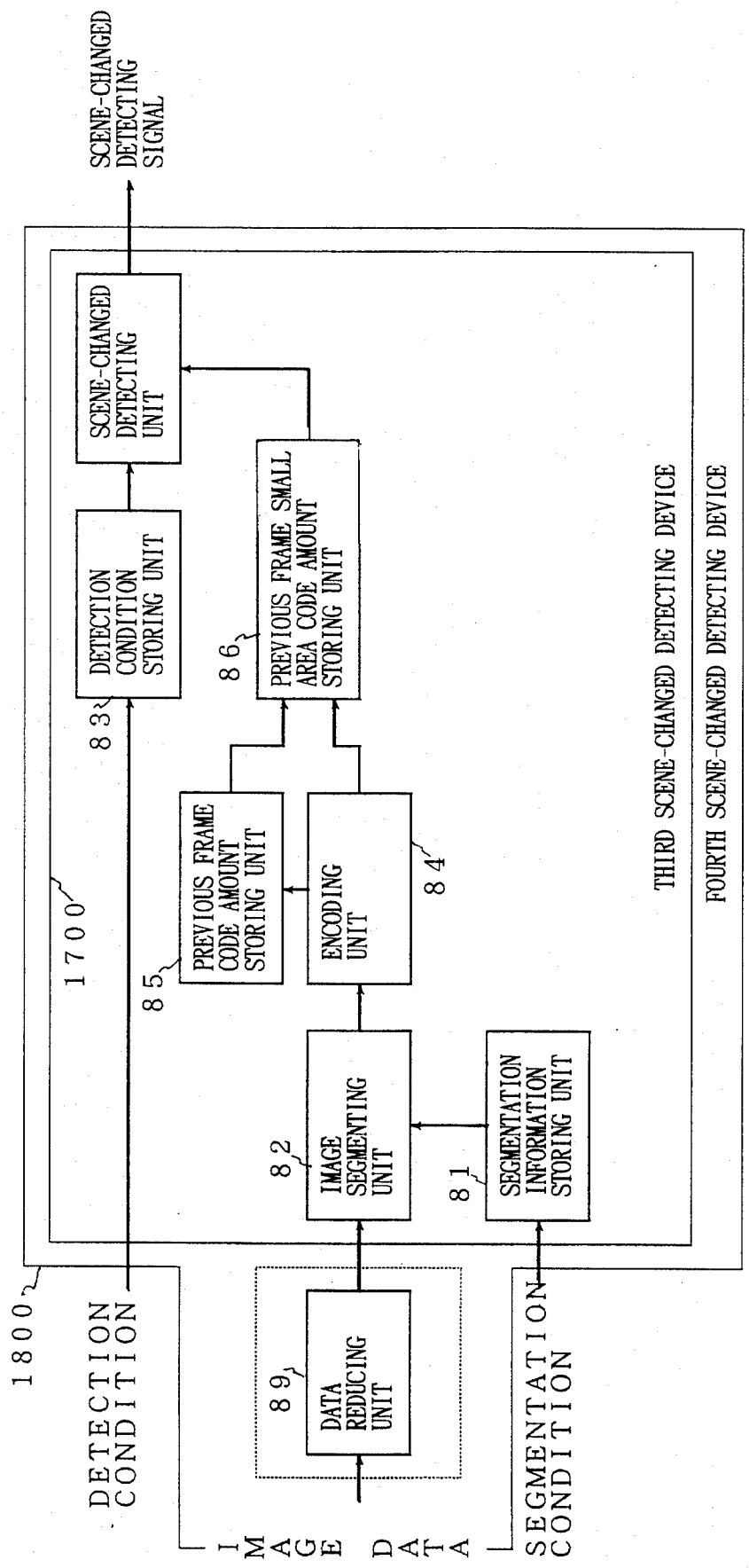
FIG. 18 is the block diagram indicating the principle of the third and fourth scene change detecting device.

FIG. 18 is the block diagram indicating the principle of the third scene change detecting device 1700 and the fourth scene change detecting device 1800. The third scene change detecting device 1700 detects a change of scenes in moving picture data. It comprises a segmentation information storing unit 81 for storing segmentation information which indicates all areas to be extracted from image data in input frames, a detection condition storing unit 82 for storing the condition set for detecting a scene-changed frame in which an image indicates the difference from that in the previous frame, an image segmenting unit 83 for segmenting image data in all areas specified by the segmentation information from among image data in input frames according to the segmentation information stored in the segmentation information storing unit 81, an encoding unit 84 for encoding image data in all areas segmented in the image segmenting unit 83, a code amount storing unit 85 for storing the amount of codes of the data, encoded in the encoding unit 84, in all areas in the previous frame, a code amount difference calculating unit 86 for calculating a predetermined difference between the amount of codes in the data encoded by the encoding unit 84 in all specified areas in the present frame and the amount of codes in the encoded data, stored in the code amount storing unit 85, in the previous frame, and a scene change detecting unit 87 for determining whether or not there is a change of scenes between the present frame and the previous frame in an area segmented by the image segmenting unit 83 according to the difference in the amount of codes calculated in the code amount difference calculating unit 86 and to the detection condition stored in the detection condition storing unit 83, and outputting a scene change signal if the determination indicates a scene-changed frame.

The third scene change detecting device 1700 can also be designed as follows, for example. That is, the detection condition refers to the standard value of the sum of the absolute values of the differences in the amount of codes. The code amount difference calculating unit 86 obtains the sum of the differences in the amount of codes between the present frame and the previous frame for all specified areas. The scene change detecting unit 87 determines whether or not there is a change of scenes between the present frame and the previous frame in a specified area by comparing the sum of the absolute values of the differences in the amount of codes calculated in the code amount difference calculating unit 86 with the above described standard value.

Furthermore, the detection condition can refer to the average rate of difference in the amount of codes. The code amount difference calculating unit 86 obtains the average rate of difference in the amount of codes between the present frame and the previous frame for all specified areas. The scene change detecting unit 87 determines whether or not there is a change of scenes between the present frame and the previous frame in a specified area by comparing the average rate of difference in the amount of codes calculated in the code amount difference calculating unit 86 with the above described standard value.

Additionally, for example, when there are a plurality of specified areas, the encoding unit 84 can encode image data simultaneously for these areas as if they were a single area.

Furthermore, the fourth scene change detecting device 1800 can be designed such that it further comprises, in addition to the third scene change detecting device, a data reducing unit 89 for reducing image data of input frames by a predetermined method. The image segmenting unit 82 segments image data of a specified area in the image data, compressed by the data reducing unit 89, in input frames.

Furthermore, the image segmenting unit 82 can be designed to mask the image data in input frames for the areas other than a specified area, and output to the encoding unit 84 the image data obtained by the masking process as image data to be encoded.

Figure 19:
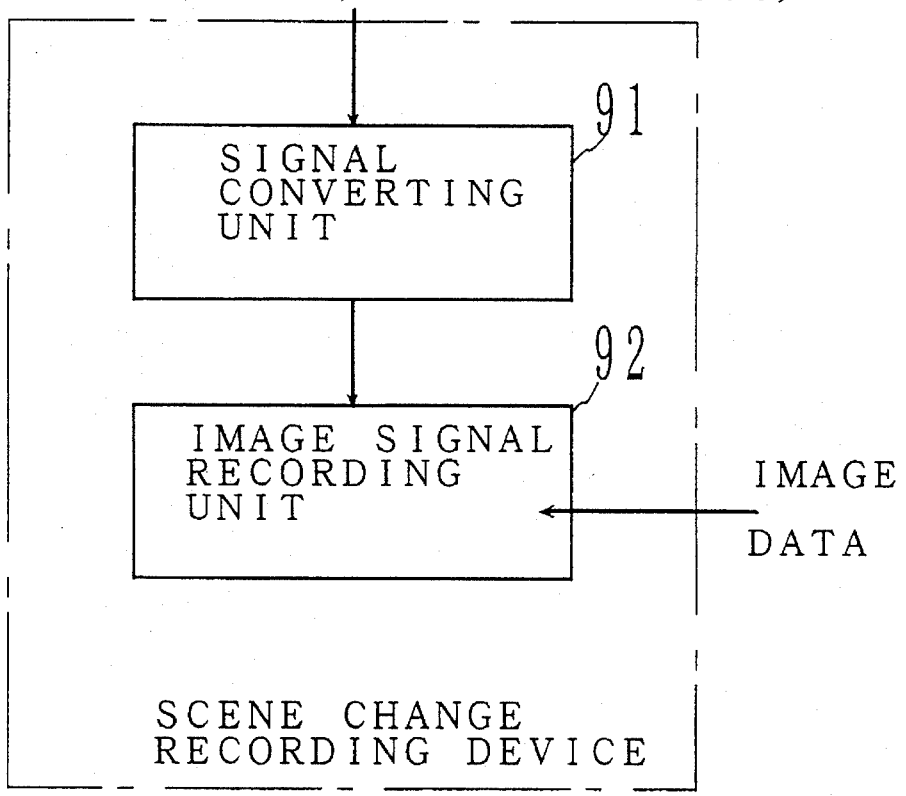
FIG. 19 is the block diagram indicating the principle of the scene change recording device.

FIG. 19 is the block diagram indicating the principle of the scene change recording device.

The scene change recording device further comprises a signal converting unit 91 for converting to a record instruction signal a scene change detection signal applied from the first, second, third, or fourth scene change detecting device 1500, 1600, 1700, or 1800 and outputting it, and an image signal storing unit 92 for recording image data according to the recording instruction signal applied from the signal converting unit 91, wherein only a scene-changed frame can be recorded among moving picture data.

For example, the signal converting unit 91 consecutively outputs record instruction signals within a predetermined period each time the scene change detection signal is inputted. Furthermore, for example, record instruction signals are consecutively outputted during a period from a predetermined scene change detection signal to the next scene change detection signal. Additionally, for example, record instruction signals are consecutively outputted during a predetermined period if scene change detection signals are consecutively inputted for a predetermined number of times.

Figure 20:
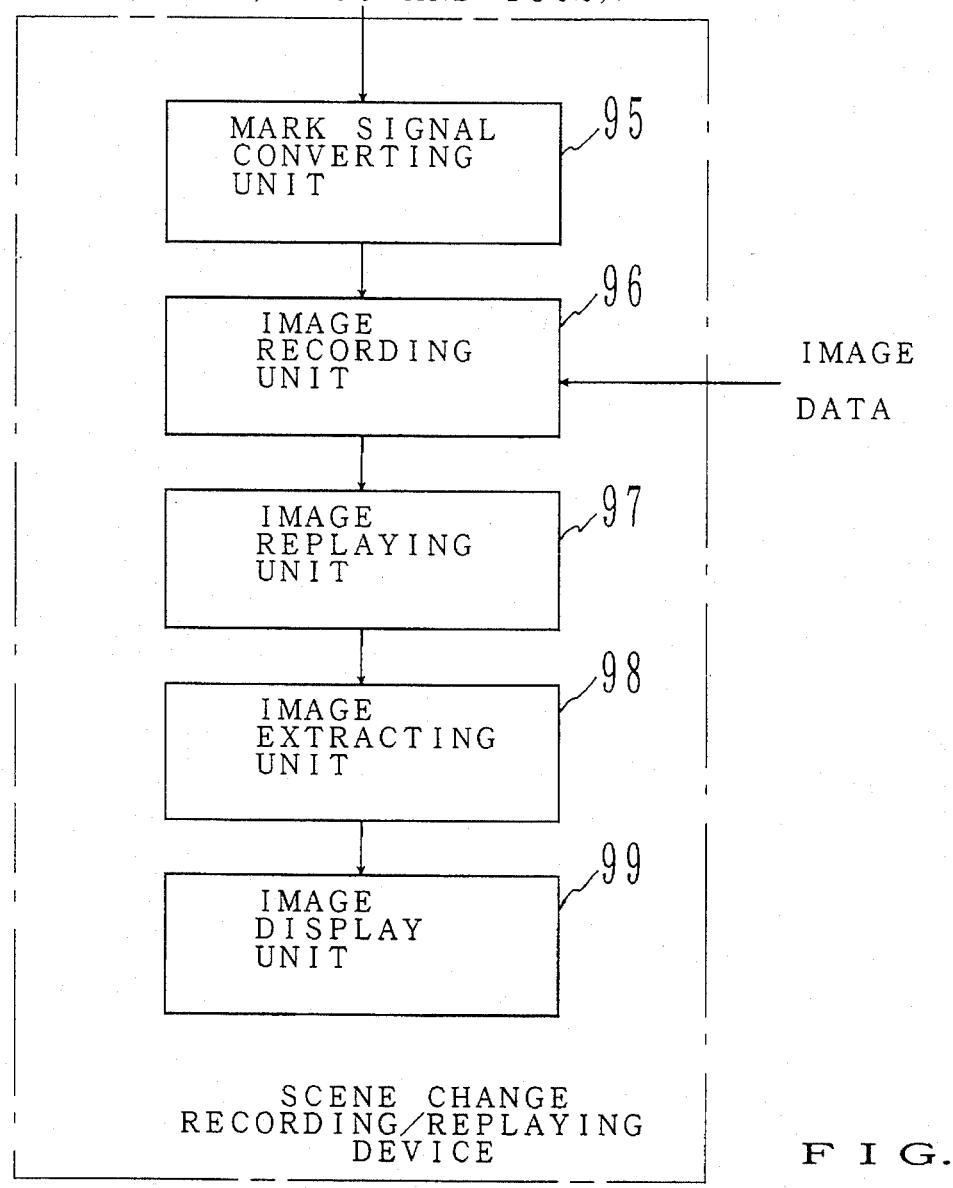
FIG. 20 is the block diagram indicating the principle of the first scene change recording/regenerating device.

FIG. 20 is the block diagram indicating the principle of the scene change recording/regenerating device.

The scene change recording/regenerating device comprises a mark signal converting unit 95 for converting a scene change detection signal outputted by the first, second, third, or fourth scene change detecting device 1500, 1600, 1700, or 1800 to a mark signal indicating a change of scenes and outputting it, an image recording unit 96 for, when recording image data, adding a mark signal outputted by the mark signal converting unit 95 to a corresponding image data, an image regenerating unit 97 for regenerating the image data recorded by the image recording unit 96, an image extracting unit 98 for extracting only the image data provided with a mark signal from the image data regenerated by the image data replying unit 97, and an image display unit 99 for displaying image data extracted by the image extracting unit 98.

Figure 21:
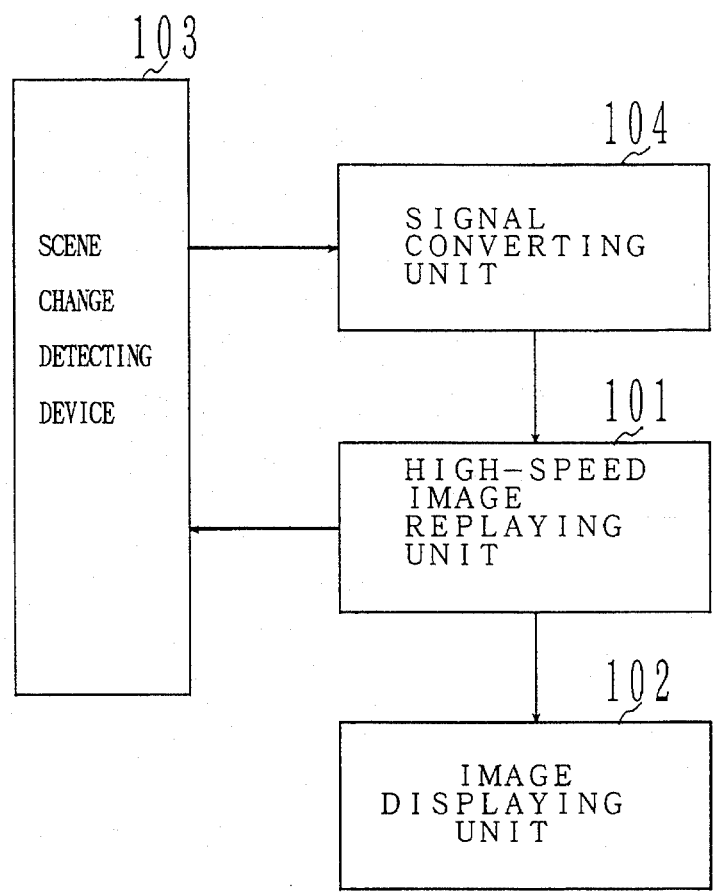
FIG. 21 is the block diagram indicating the principle of the second scene change recording/regenerating device present invention.

FIG. 21 is the block diagram indicating the principle of another scene change recording/regenerating device.

The scene change recording/regenerating device comprises a high-speed image regenerating unit 101 for regenerating image data to be regenerated after extracting frames at a predetermined rate, an image display unit 102 for displaying image data regenerated by the high-speed image regenerating unit 101, a scene change detecting unit 103 for detecting a change of scenes in the image data after being frame-extracted and regenerated by the high-speed image regenerating unit 101, and a signal converting unit 104 for converting a detection signal outputted by the scene change detecting unit 42 to a regeneration stop signal to be outputted to the high-speed image regenerating unit 101.

Next, each of the above described methods and devices is explained below.

First, the first image data encoding method and the first image data encoding device detects a scene-changed frame (a frame indicating a change of scenes) based on the difference in the amount of codes between adjacent frames, and outputs a code indicating a scene-changed frame at the detection of a scene-changed frame. Accordingly, moving picture data are encoded such that encoded data indicating a scene-changed frame can be easily discriminated against those of a normal frame (a frame containing no change of scenes).

Furthermore, according to the first image data encoding method and the first image data encoding device, only the encoded data indicating a scene-changed frame are extracted to reconstruct original image data from moving picture data encoded according to the first image data encoding method and the first image data encoding device. Accordingly, only the encoded data indicating a scene-changed frame can be extracted from encoded moving picture data and the images for the scene-changed frame can be displayed on a screen in a predetermined format.

According to the second image data reconstructing device, image data are reconstructed by extracting encoded data indicating a scene-changed frame containing moving picture data from data strings, encoded by the JPEG method, in consecutive frames. Therefore, only encoded data indicating a scene-changed frame is extracted from the data encoded by a standard encoding device according to the JPEG method, etc. so as to reconstruct an original image indicating a scene-changed frame from among the encoded data. Additionally, the image indicating a scene-changed frame can be controlled to be displayed in a predetermined format.

According to the first scene change detecting method and the first scene change detecting device 1500, a change of scenes in moving picture data can be detected according to the difference in the amount of codes between the present frame and the previous frame and to a predetermined detection condition (standard value), and a scene change detection signal can be outputted to an external device at the detection of a change of scenes.

According to the second image data encoding method and the second scene change detecting device 1600, a frame is divided into a plurality of small areas, and a difference (an absolute value of the difference in the amount of codes or a rate of the difference in the amount of codes). Then, the total difference in the amount of codes between the present frame and the previous frame (the sum of the absolute values of the differences in the amount of codes for all small areas, or an average rate of difference in the amount of codes for all small areas) is obtained. Then, the difference is compared with a predetermined detection condition (standard value) to detect a scene-changed frame in which a scene is different from that in the previous frame. At the detection of a scene-changed frame, an external scene change signal is outputted. Thus, a scene-changed frame can be detected with high precision.

According to the second image data encoding method and the second and third image data encoding devices, moving picture data can be encoded such that encoded data of a detected scene-changed frame can be easily extracted from normal frames (scene-unchanged frames).

According to the second image data reconstructing method and the third image data reconstructing device, the construction and display of image data are controlled as follows. That is, the encoded data in scene-changed frames exclusively are extracted from the moving picture data encoded by the second image data encoding method and the second image data encoding device, image data in scene-changed frames exclusively can be reconstructed from the extracted encoded data, and the scene-changed frames can be displayed in a predetermined format.

According to the second scene change detecting method and the third and fourth scene change detecting devices 1700 and 1800, a change of images (change of scenes) in a specific area can be detected based on the difference in the amount of codes in the specific area in adjacent frames.

According to the above described scene change recording device, a plurality of frames including a scene-changed frame indicating a change of scenes in moving picture data and its succeeding frames can be automatically recorded in various formats.

According to the scene change recording/regenerating device shown in FIG. 20, a scene-changed frame indicating a change of scenes can be automatically extracted from moving picture data for display.

According to the scene change recording/regenerating device shown in FIG. 21, scene-changed frames can be exclusively stopped and displayed for a predetermined time while image data are skipped at a predetermined rate for high-speed regeneration.

More practical embodiments of the present invention are explained as follows by referring to the attached drawings.

Figure 22:
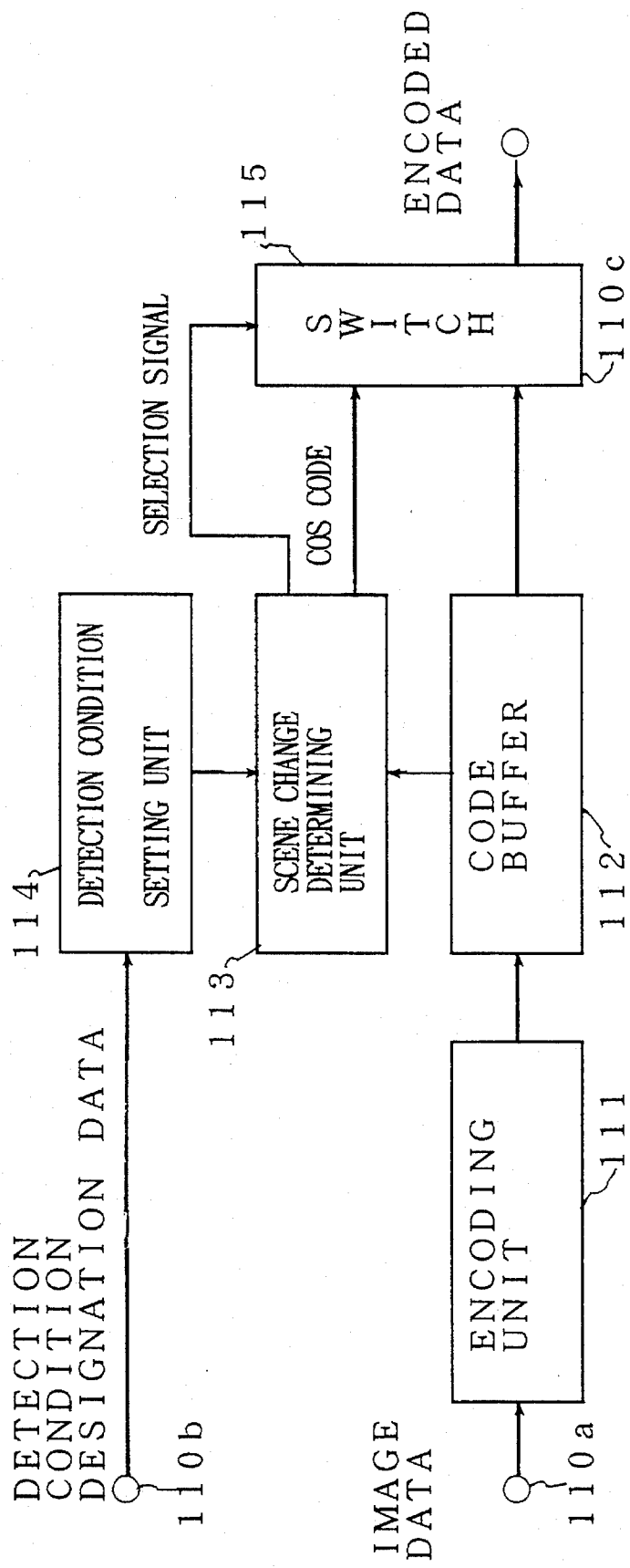
FIG. 22 is the block diagram showing the image encoding device according to the first embodiment of the present invention.

FIG. 22 is the block diagram showing the moving picture encoding device according to the first embodiment.

In FIG. 22, moving picture data to be externally encoded in a series of frames are applied to input terminal 110a. An encoding unit 111 sequentially encodes image data applied to input terminal 110a in frame units. A code buffer 112 stores encoded data in a frame generated by the encoding unit 111, calculates the amount of codes in the encoded data, and outputs the encoded data and the amount of codes respectively to a switch 115 and a scene change determining unit 113. Detection condition designation data are used to detect a change of scenes in moving picture and designate the difference in the amount of codes (absolute value of the difference in the amount of codes) between adjacent frames. These data are applied to input terminal 110b. On receiving the detection condition designation data, a detection condition setting unit 114 sets a detection condition. The scene change determining unit 115 detects a change of scenes according to the detection condition set by the detection condition setting unit 114.

The scene change determining unit 113 calculates the difference between the amount of codes in a frame applied from the code buffer 112 (the amount of codes in the present frame) and the amount of codes in the previous frame. If the difference indicates a value larger than that determined as the detection condition (difference in the amount of codes) by the detection condition setting unit 114, the scene change determining unit 113 outputs to the switch 115 a COS (change of scene) code indicating a change of scenes together with an active selection signal. The switch 115 outputs encoded data in the present frame applied from the code buffer 112 when a selection signal is not active. When a selection signal is active, the switch 115 adds to the encoded data the COS code applied together with the selection signal, thus generating encoded data indicating a change of scenes. Then, the encoded data replace the above described normal encoded data (encoded data in a frame containing no change of scenes), and are outputted externally through output terminal 110c.

Figure 23:
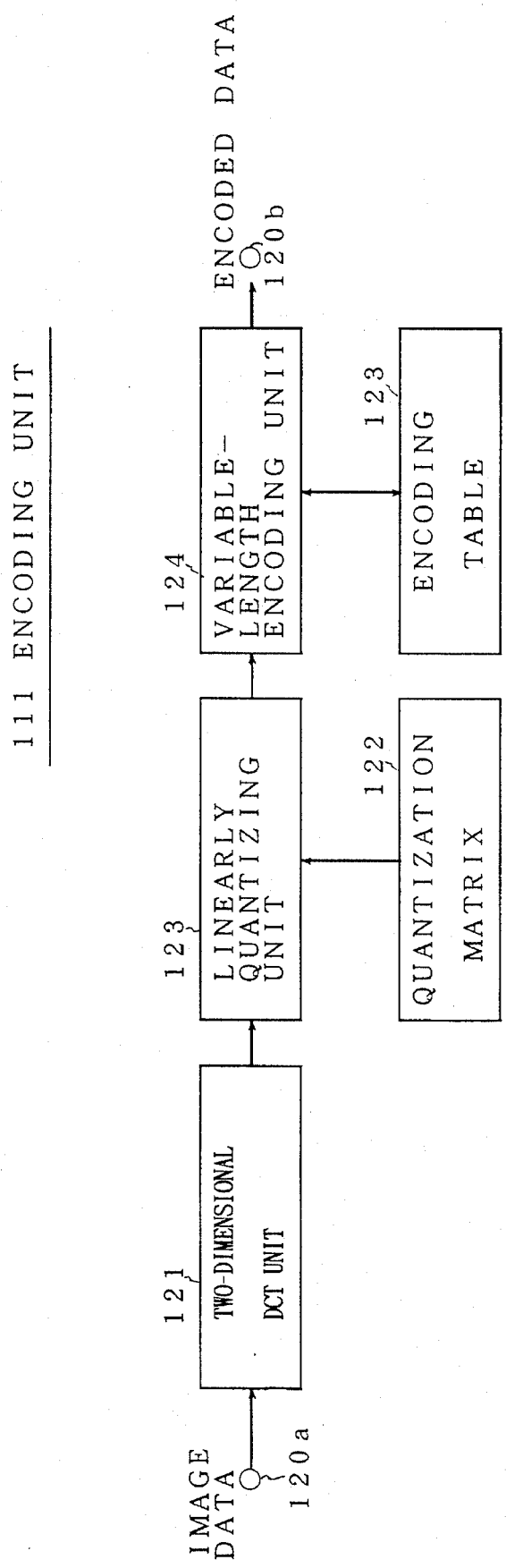
FIG. 23 shows an example of a configuration of the encoding unit of the moving picture encoding device according to the first embodiment.

FIG. 23 is the block diagram showing an example of the configuration of the encoding unit 111 of the moving picture encoding device. An encoding unit for static images is used in the example.

In FIG. 23, the encoding unit 111 comprises image data input terminal 120a for applying, in block units, multivalue image data divided into a plurality of blocks each comprising 8×8 picture elements, a two-dimensional DCT unit for orthogonally transforming by a two-dimensional DCT an image signal for the applied 8×8 picture elements to 8×8 two-dimensional DCT coefficients distributed as spatial frequencies and outputting the result, a linearly quantizing unit 123 for linearly quantizing each of the two-dimensional DCT coefficients according to a corresponding quantization threshold in a quantization matrix 122, a variable-length encoding unit 124 for receiving quantized coefficients obtained by the linear-quantization performed by the linearly quantizing unit 123 and encoding a string of the quantized coefficients to variable-length codes by referring to a code table 123 containing a Huffman code list provided separately for DC components and AC components, and encoded data output terminal 120b for outputting the data encoded by the encoding unit.

The data encoded by the encoding unit 111 meet the JPEG Standard. Since the JPEG Standard originally applies to encoded data for static images, it contains no rules on encoded data for moving picture. That is, it has no description of a frame (refer to Chapter 1 of the "International Standards on Multimedia Encoding" by YASUDA, Hiroshi published by Maruzen in 1991).

Figure 24:
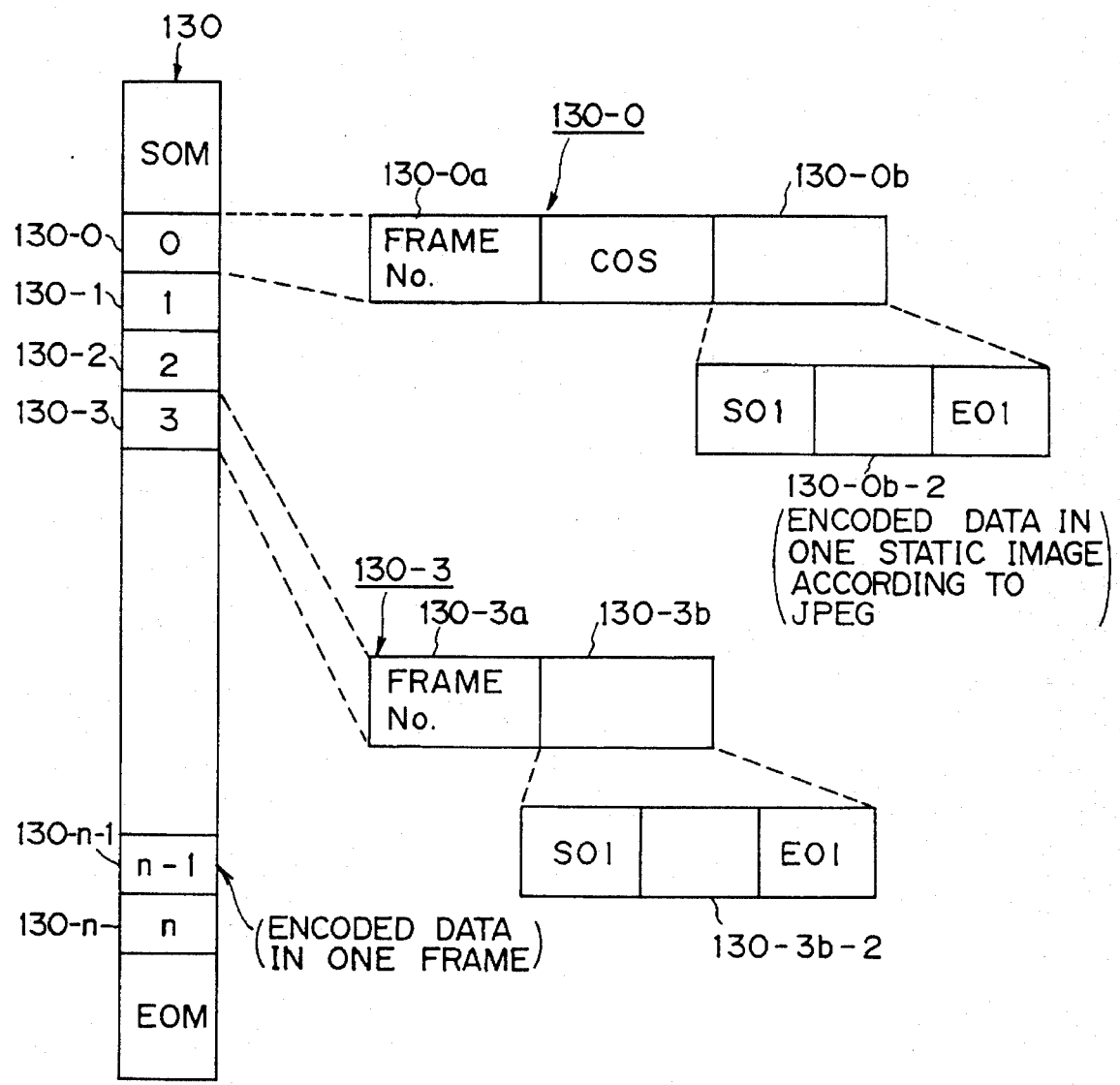
FIG. 24 shows the configuration (1) of encoded moving picture data groups.

In the present embodiment, the encoded data in accordance with the JPEG Standard is edited by the encoding unit shown in FIG. 22 into a plurality of encoded data groups corresponding to moving picture data. FIG. 24 shows the configuration of the encoded data groups.

Encoded data groups 130 shown in FIG. 24 show a sequence of data (data in a series of frames). The sequence starts with a SOM (start of motion) code indicating the header of encoded data groups 130 of moving picture, and ends with an EOM (end of motion) code indicating the end of the groups. The groups comprise encoded data areas of each frame 130-0, 130-1, 130-2, 130-3, . . . , 130-n between the header and the end of the groups. Encoded data 130-$ib$-2 in each encoded data area 130-$i$ (i=0, 1, 2, 3, . . . , n) (in FIG. 24, only 130-0$b$-2 and 130-3$b$-2 are shown as examples) are those for one static image in accordance with the JPEG Standard headed by an SOI (start of image) code and ended with an EOI (end of image) code.

If a change of scenes is detected in a frame (hereinafter referred to as a scene-changed frame), corresponding encoded data area 130-$i$ comprises, as indicated for encoded data area 130-0, frame number 130-0$a$, encoded data area 130-0$b$ for one static image, and a COS code indicating a scene-changed frame between these areas.

On the other hand, if no scene-changed frames are detected, encoded data area 130-$i$ can be configured by frame number 130-3$a$ and encoded data area 130-3$b$ for one static image only.

Thus, encoded data groups 130 are designed such that a reconstructing unit can easily extract encoded data 130-$i$ in a scene-changed frame according to the existence of a COS code.

Figure 25:
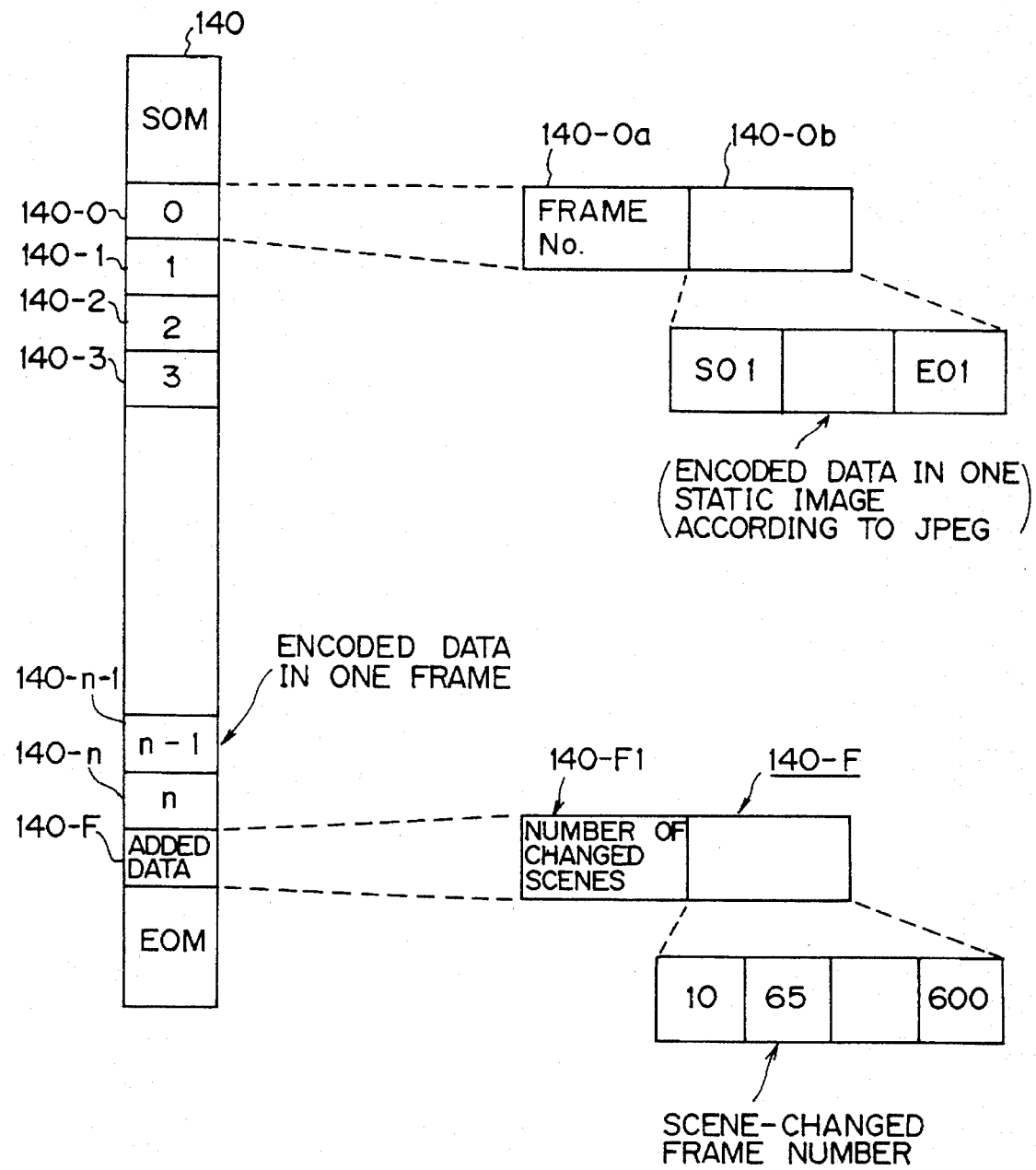
FIG. 25 shows the configuration (2) of encoded moving picture data groups.

FIG. 25 shows another example of the configuration of the encoded moving picture data groups.

Likewise, encoded data groups 140 starts with an SOM code added to the header of the sequence, and ends with an SOM code. However, each encoded data area 140-i to be embedded between the header and the end comprises frame number 140-$ia$ (i=0, 1, . . . , n) and encoded data area 140-$ib$ (i=0, 1, . . . , n) only. Additional data 140-F is added between the last encoded data area 140-$n$ and an EOM code. The additional data 140-F stores data 140-F1 indicating the number of detected changes of scenes (the number of scene-changed frame), and scene-changed frame numbers 10, 65, . . . 600, for example, for the number of scene-changed frames.

When these encoded data groups 140 are generated, the switch 115 of the encoding device shown in FIG. 22 is set such that encoded data applied from the code buffer 112 are outputted to encoded data output terminal 110c. Thus, the number of the COS code inputting operations performed by the scene change determining unit 113 is counted, and the frame number at this moment is stored in an internal buffer (not shown in FIG. 22) to generate added data 140-F. Thus, when an EOM code is entered after the last code data area 140-n, the generated added data 140-F are inserted before the EOM code.

When encoded data are temporarily stored in a storing unit, scene-changed frames can be easily extracted from the above described encoded data groups 140 if all the encoded data groups 140 are referred to as an index file, and the added data 140-F, that is, the last portion of all data, containing scene-changed frame information are referred to as a pointer.

Next, the encoding operation performed by the encoding unit shown in FIG. 22 is explained as follows.

Figure 26:
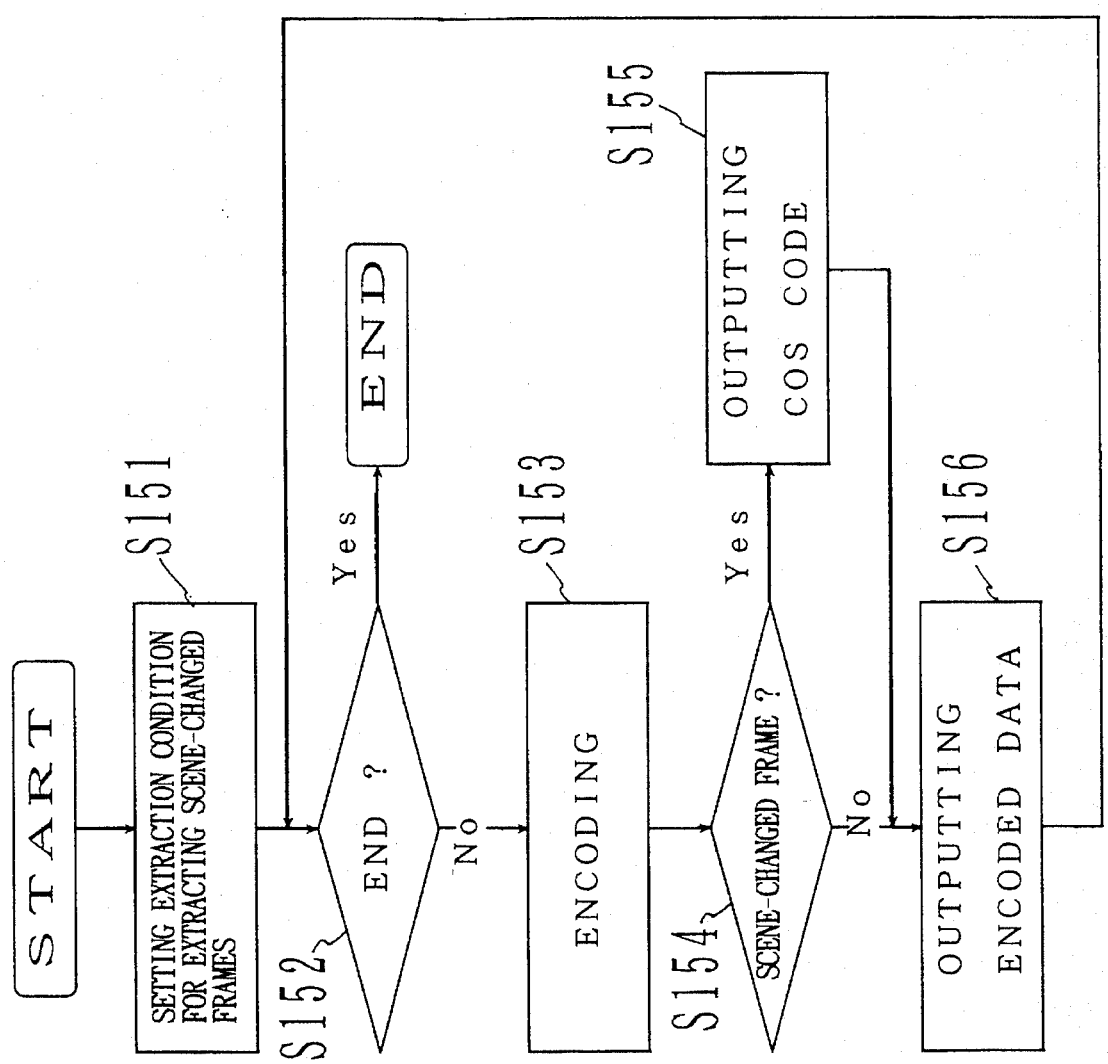
FIG. 26 is the flowchart indicating the basic operation of the image encoding device according to the first embodiment of the present invention.

FIG. 26 is a flowchart showing the basic operation. The operation can be performed with each of the circuit blocks shown in FIG. 22 controlled by the control unit (not shown in FIG. 22) in the encoding unit.

In the flowchart shown in FIG. 26, a condition for extracting a scene-changed frame (detection condition designation data) is set by the detection condition setting unit 114 (S151). Thus, a standard value indicating the difference in the amount of codes between adjacent frames is determined to detect a scene-changed frame. Normally, TV images, for example, are sequentially encoded in series at a rate of 30 pieces of static images per second. At this time, the amount of codes is outputted in megabyte units for each static image. The amount of codes does not vary very much with a little movement of a character in a scene. However, when a scene is changed from a character to a building, etc. of a background, it indicates a large difference. The process in step S151 detects a change of scenes (scene-changed frame) according to the feature that the amount of codes fluctuates if a different scene has appeared. Then, the detection condition setting unit 114 sets as a condition for extracting a scene-changed frame the difference in the amount of codes between two frames to be compared.

Next, it is determined whether or not the encoding operation is completed, that is, an encoding process is performed on all images (all frames) (S152). That is, the encoding unit 111 determines it after receiving through input terminal 110a the data indicating the end of images (EOM code). Thus, it is determined whether the encoding process is to be continued or to terminate.

If the determination in S152 indicates that the encoding process is not over ("No" in S152), then the encoding unit 111 encodes the image data in the next frame applied through input terminal 110a (S153), and the scene change determining unit 113 determines whether or not the frame is a scene-changed frame (S154). In this process, the scene determining unit 113 calculates the difference between the amount of codes in the present frame inputted from the code buffer 112 and the amount of codes of image data in the previous frame inputted previously and stored internally, and determines the present frame to be a scene-changed frame when the absolute value of the calculated difference is larger than that of the difference set in the detection condition setting unit 114.

If the determination in S154 does not indicate a scene-changed frame, the scene change determining unit 113 does not turn a selection signal outputted for the switch 115 active, but outputs only the encoded data applied from the code buffer 112 (S156). That is, the switch 115 outputs to output terminal 110c the encoded data "as is" applied from the code buffer 112 according to the instruction of a selection signal entered from the change-scene determining unit 113.

On the other hand, when the change scene determining unit 113 determines a scene-changed frame, it turns a selection signal active to inform the switch 115 of a change of scenes, and simultaneously outputs a COS code (S155). Thus, the switch 115 outputs the number of the scene-changed frame followed by the above described COS code and the encoded data in the scene-changed frame when encoded data groups 130 shown in FIG. 24 are generated. If encoded data groups 140 shown in FIG. 25 are generated, the switch 115 counts the number of the COS code inputting operations, and internally stores the number of the scene-changed frame, and then outputs through output terminal 110c the number of the scene-changed frame followed by the encoded data in the scene-changed frame.

Thus, the processes in S152 through S156 are repeated until it is determined that moving picture data in all frames have been encoded in S152, and encoded data groups 130 or 140 in the format shown in FIGS. 24 and 25, for example, are generated and outputted.

Figure 27:
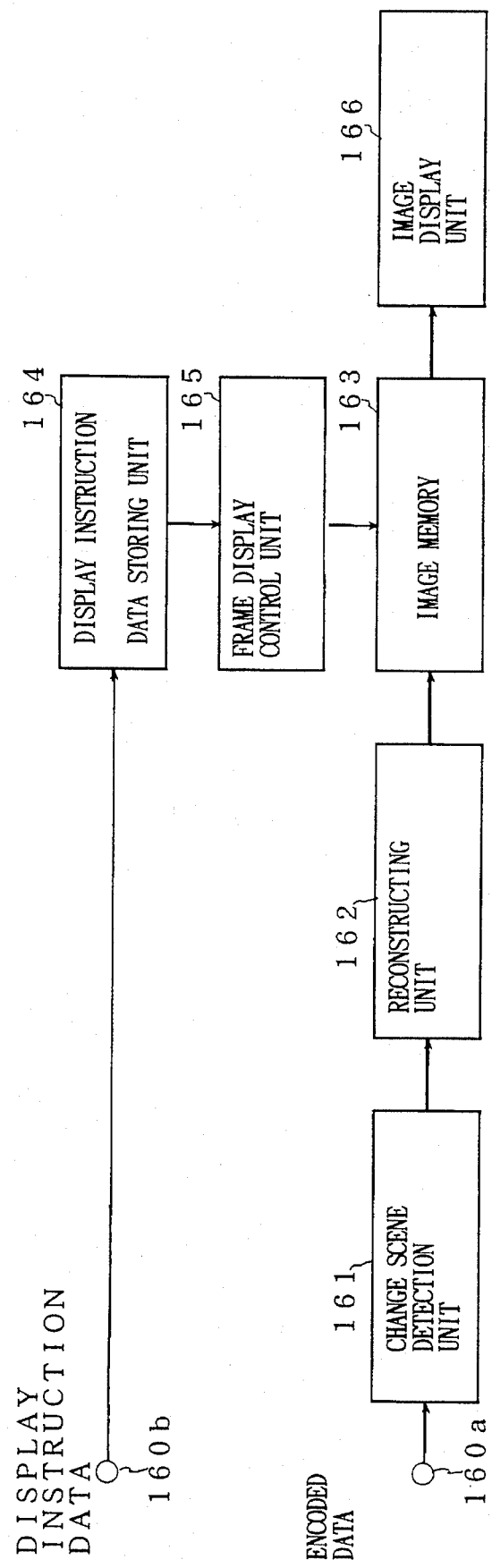
FIG. 27 is the block diagram showing the image reconstructing device according to the second embodiment of the present invention.

Next, FIG. 27 is the block diagram showing the circuit configuration of the reconstructing unit for reconstructing image data in scene-changed frames from encoded data groups (130 or 140) generated by the image encoding unit shown in FIG. 22 which is the second embodiment of the present invention.

In FIG. 27, the above described data groups (130 or 140) are applied to input terminal 160a.

A scene change detecting unit 161 sequentially analyzes encoded data groups (130 or 140) applied through terminal 160a, and detects (extracts) scene-changed frames from them.

A reconstructing unit 162 reconstructs image data from the encoded data in a scene-changed frame applied from the scene change detecting unit 161.

An image memory 163 sequentially stores image data in a scene-changed frame reconstructed by the reconstructing unit 162.

Furthermore, to input terminal 160b, inputted are display instruction data for the designation of a display format of images in a scene-changed frame reconstructed by the reconstructing unit 162.

A display instruction data storing unit 164 stores the display instruction data applied through terminal 160a.

A frame display control unit 165 reads display instruction data from the display instruction data storing unit 163, and controls the image memory 163 such that a reconstruction image in a scene-switch frame stored in the image memory 163 can be displayed in the format designated by the display instruction data.

An image display unit 166 displays the images in scene-changed frames outputted from the image memory under the control of the frame display control unit 165 in the format designated by the display instruction data.

Figure 28:
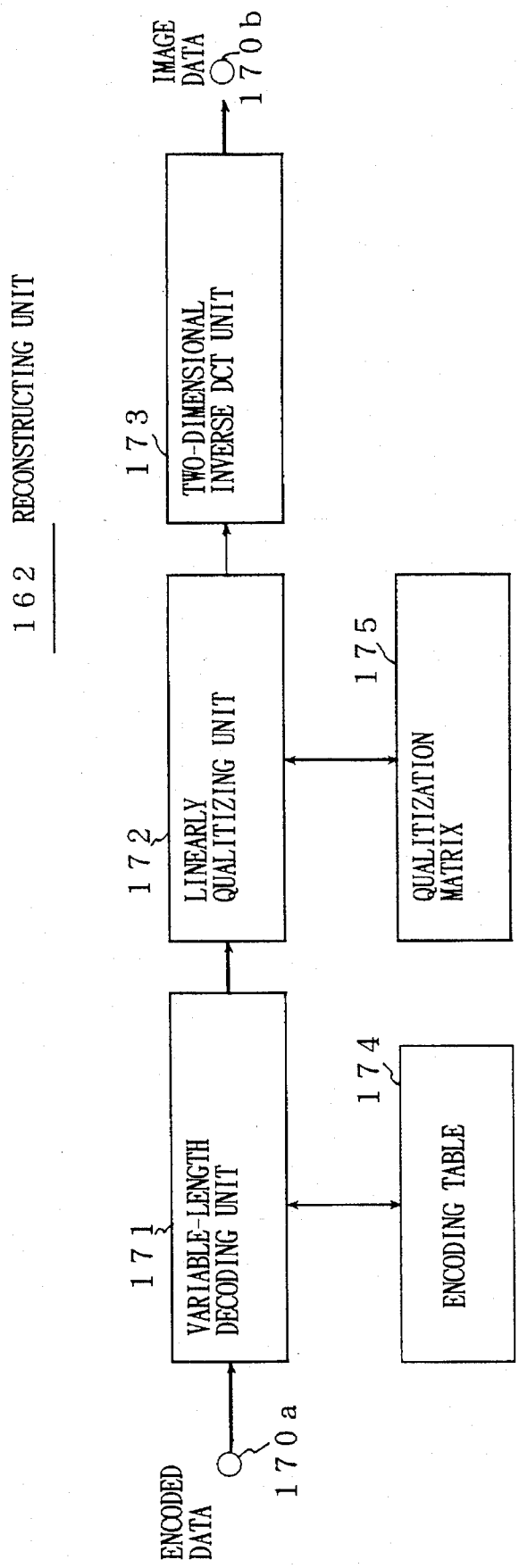
FIG. 28 shows an example of a reconstructing unit of the image reconstructing device shown in FIG. 26.

FIG. 28 shows the configuration of the reconstructing unit 162. In FIG. 28, the reconstructing unit 162 reconstructs image data from the encoded data applied through terminal 170a by a variable-length decoding unit 171, a linearly dequantizing unit 172, and a two-dimensional inverse DCT unit 173 in the order reverse to that of the encoding unit 111 shown in FIG. 27, and outputs the reconstructed image data to the image memory 163 shown in FIG. 27 through terminal 170b.

Then, the process of reconstructing image data is explained furthermore in detail. First, encoded data in each frame encoded by the image encoding unit shown in FIG. 22 are applied to the variable-length decoding unit 171 in block units through input terminal 170a.

The variable-length decoding unit 171 decodes a quantized coefficient having DC and AC components in each block according to a code table 174 comprising a Huffman code table, etc. used to encode data to variable-length codes.

The linearly dequantizing unit 172 decodes a quantized coefficient, decoded as described above and having DC and AC components in each block, to a two-dimensional DCT coefficient using a quantization matrix used in the above described variable-length encoding process.

The two-dimensional inverse DCT unit 173 performs a two-dimensional inverse DCT using a decoded two-dimensional DCT coefficient in each block, and reconstructs an image signal of each picture element in each block. Thus, encoded data in scene-changed frames are decoded in units of blocks each comprising 8×8 picture elements, and sequentially written to corresponding positions in the image memory 162 under the control of the frame display control unit 164.

Figure 29B:
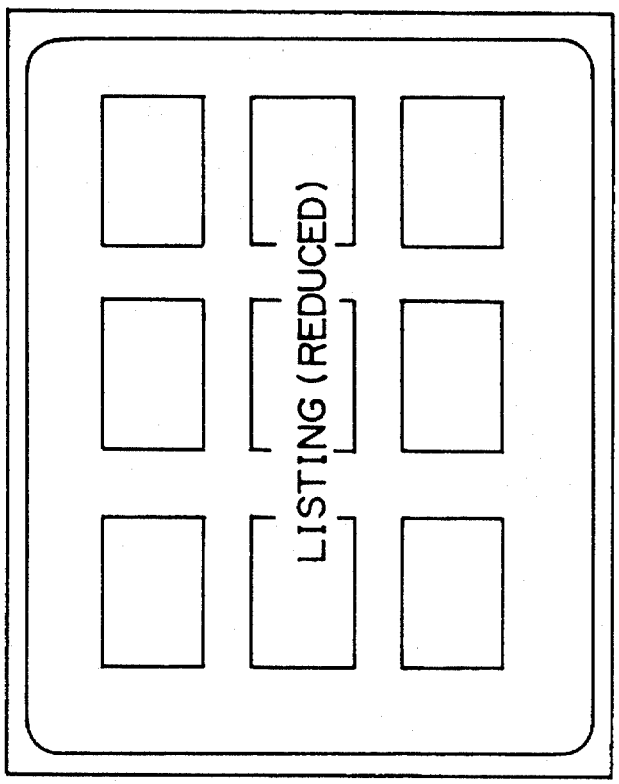
FIGS. 29A and 29B shows an example of a display format of images reconstructed by the image reconstructing device according to the second embodiment.
Figure 29A:
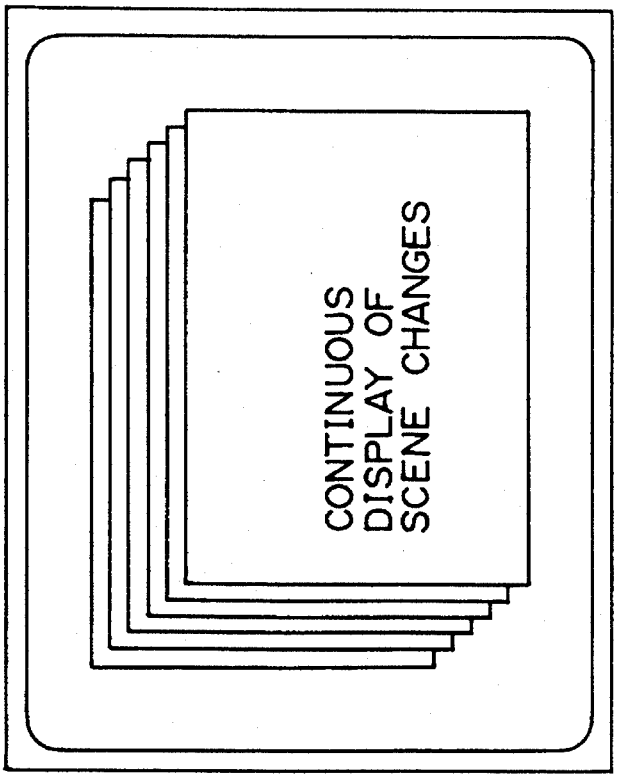

FIGS. 29A and 29B show two examples of display formats for displaying an image in a scene-changed frame on the image display unit 166 under the control of the frame display control unit 165.

In FIG. 29A, only scene-changed frames are sequentially displayed in series as being overlapped, and the display time for one image can be optionally determined. In FIG. 29B, scene-changed frames are reduced and a plurality of reduced scene-changed frames are displayed simultaneously on a screen. The number of pieces of frames displayed on one screen can be optionally determined by changing the rate of reduction.

Figure 30:
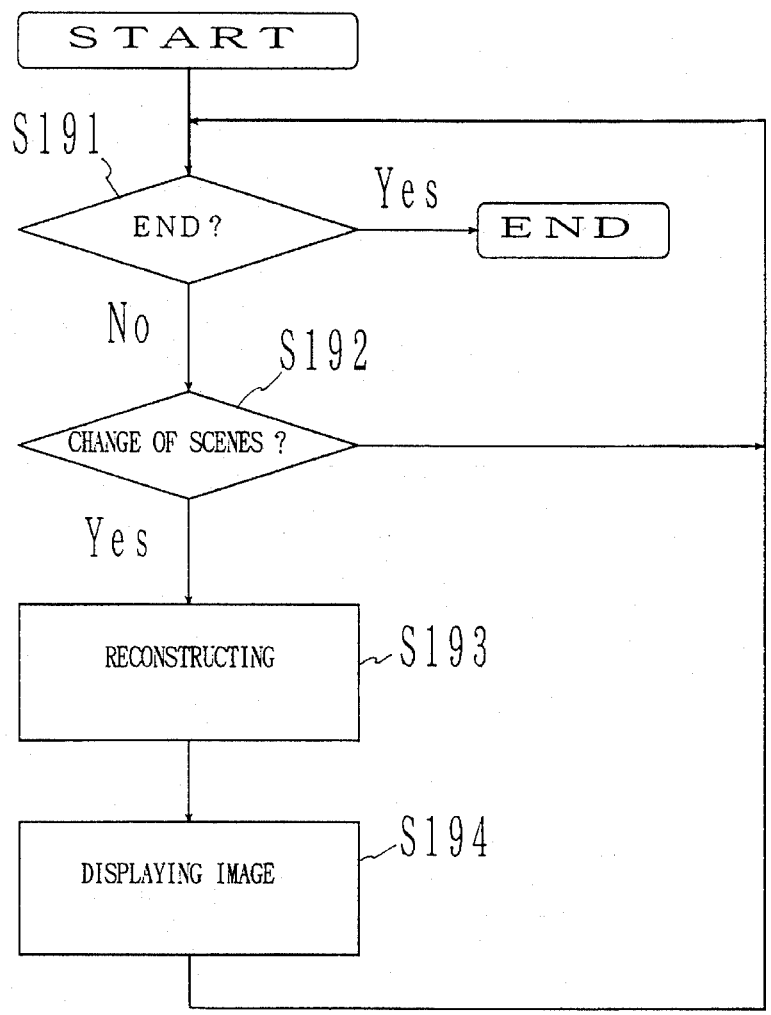
FIG. 30 is the flowchart indicating the basic operation of the image reconstructing device according to the second embodiment of the present invention.

Next, the operation of reconstructing image data from encoded data performed by the reconstructing device shown in FIG. 27 is explained. FIG. 30 is a flowchart for a basic operation. The process can be performed by a control unit not shown in FIG. 27 by controlling each of the circuit blocks shown in FIG. 27.

According to the flowchart shown in FIG. 30, the scene-change detecting unit 161 determines whether or not the reconstructing process has been completed (S191). That is, the scene-change detecting unit 161 determines that the above described process has been completed if an EOM code is detected at the last data portion when encoded data groups to be decoded and entered through terminal 160a are displayed in the format shown in FIG. 24, and if no scene-changed frame numbers can be read from the added data 140-F when the data groups are displayed in the format shown in FIG. 25.

If the reconstructing process has not been completed yet ("No" in S191), the scene change detecting unit 161 determines whether or not the inputted encoded data are those indicating a scene-changed frame (S192). That is, the scene-change detecting unit 161 regards encoded data as those in a scene-changed frame depending on whether or not a COS code is added immediately before encoded data 130-ib (i=1, 2, ..., n) if encoded data are displayed in the format shown in FIG. 24, and depending on whether or not encoded data are those in a frame with its frame number entered in added data 140-F if encoded data are displayed in the format shown in FIG. 25.

According to the determination in S192, the scene change detecting unit 161 immediately performs a determining process on the encoded data in the next frame if the encoded data do not indicate a scene-changed frame. If they indicate a scene-changed frame, the scene change detecting unit 161 outputs the encoded data in the scene-changed frame to the reconstructing unit 162 shown in FIG. 27. Thus, the reconstructing unit 162 reconstructs image data from the encoded data in the scene-changed frame, and writes the reconstructed image data in the image memory 166. Reconstructed image data in scene-changed frames are sequentially stored in the image memory 163.

Then, the frame display control unit 165 controls the image display unit 166 to output image data in scene-changed frames stored in the image memory 163 so that reconstructed images in scene-changed frames can be displayed in the display format designated by the display instruction data inputted from the display instruction data storing unit 163. Thus, the image display unit 166 displays reconstructed images in scene-changed frames in the display format shown in FIGS. 29A and 29B, for example.

In the above described embodiment, a scene-changed frame (a change of scenes) is detected while moving picture data are encoded by the moving picture encoding unit shown in FIG. 22. However, the encoding process can be performed separately, and a scene-changed frame can be detected when image data are reconstructed from encoded data. This is explained as the third embodiment as follows.

Figure 31:
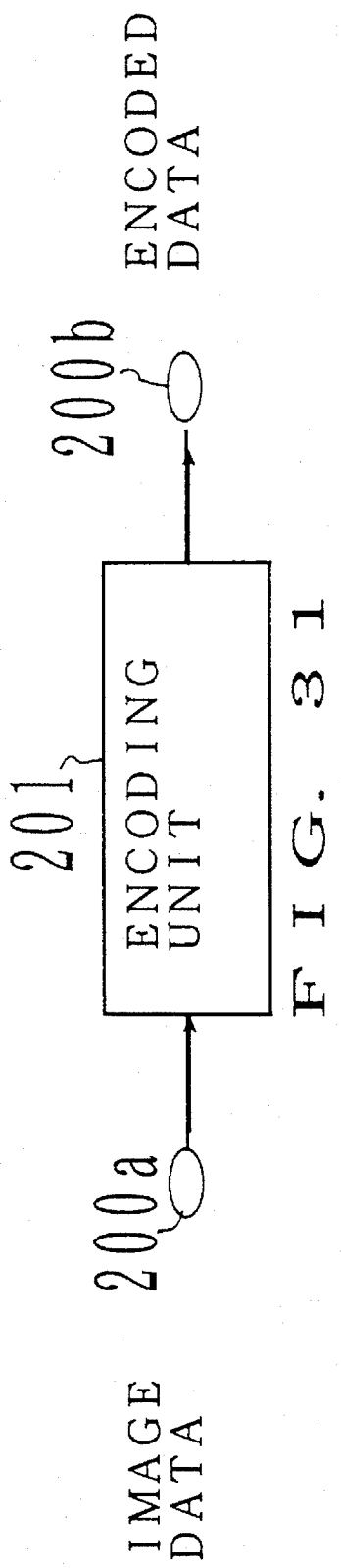
FIG. 31 is the block diagram showing the image encoding device according to the third embodiment of the present invention.

FIG. 31 is the block diagram of the circuit of a moving picture image encoding unit according to the third embodiment.

In FIG. 31, the encoding unit comprises terminal 200a for applying image data, an encoding unit 201 for efficiently encoding image data inputted from terminal 200a according to the above described ADCT, etc., and output terminal 20b for externally outputting the data encoded by the encoding unit 201.

The encoding unit 201 is designed similarly to the encoding unit 111 of the moving picture encoding device according to the first embodiment shown in FIG. 22. Thus, the moving picture encoding unit according to the third embodiment only efficiently encodes image data, and does not detect a scene-changed frame during the encoding process.

Figure 32:
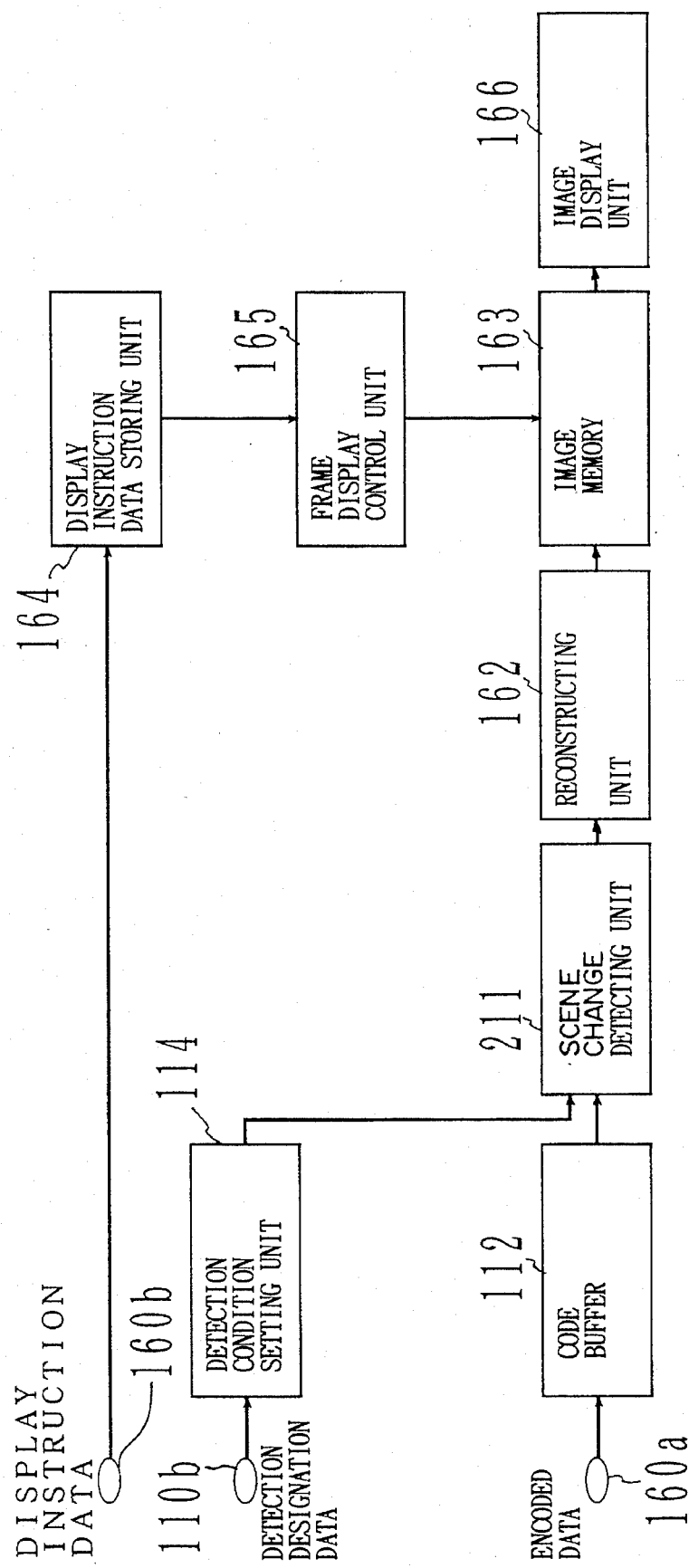
FIG. 32 is the block diagram showing the image reconstructing device according to the fourth embodiment of the present invention.

Next, FIG. 32 is the block diagram showing the circuit of a moving picture reconstructing device according to the fourth embodiment for reconstructing image data in scene-changed frames of moving picture from the data encoded by the moving picture encoding device shown in FIG. 22 or 31. In FIG. 32, functions identical to those in the moving picture encoding device shown in FIG. 22 and the moving picture reconstructing device shown in FIG. 27 share the same block numbers with them.

In FIG. 32, like the moving picture encoding device according to the first embodiment shown in FIG. 22, the moving picture reconstructing device comprises the code buffer 112 for storing 1-frame encoded data, detection designation data input terminal 110b for entering detection designation data used to designate the detection condition for a scene-changed frame, and the detection condition setting unit 114 for setting the detection condition after receiving the detection designation data. A scene change detecting unit 211 detects a change of scenes in the encoded data received from the code buffer 112 based on the detection condition set by the detection condition setting unit 114 by the method similar to that of the scene change determining unit 113 of the moving picture encoding device shown in FIG. 22, and then it outputs the encoded data in a scene-changed frame only.

Furthermore, like the moving picture reconstructing device shown in FIG. 27, the moving picture reconstructing device comprises the reconstructing unit 162 for reconstructing image data from the encoded data in the scene-changed frames received from the scene change detecting unit 211, the image memory 163 for storing image data in scene-changed frames reconstructed by the reconstructing unit 162, the input terminal 160b for receiving display instruction data used to instruct the display format in which reconstructed images in scene-changed frames are displayed, the display instruction data storing unit 164 for storing the display instruction data received through input terminal 160b, the frame display control unit 165 for controlling the display of the images in the scene-changed frames stored in the image memory 166 after reading the display instruction data from the display instruction data storing unit 164, and the image display unit 166 for displaying images outputted from the image memory 163 under the control of the frame display control unit 165.

With the above described configuration, the moving picture reconstructing device extracts through the scene-changed frame detecting unit 211 the encoded data only in scene-changed frames from the encoded input data, and displays on the image display unit 166 the images of scene-changed frames in the display format shown in FIGS. 29A and 29B, for example, as in the image reconstructing device according to the first embodiment shown in FIG. 27.

Thus, according to the moving picture reconstructing device shown in FIGS. 27 and 32, the device displays images of scene-changed frame in a format designated according to the display instruction data after detecting the scene-changed frame using encoded data of image data and reconstructing the original image data from the encoded data of the detected scene-changed frame.

However, original image data are not necessarily reconstructed from encoded data. That is, the encoded data can be used such that only scene-changed frames are detected in encoded data (only scene changes are detected), and the detection results are effectively used to control normal image recording and regenerating units for other devices such as video tape recorders, etc.

The device described above is explained as follows as the fifth embodiment.

Figure 33:
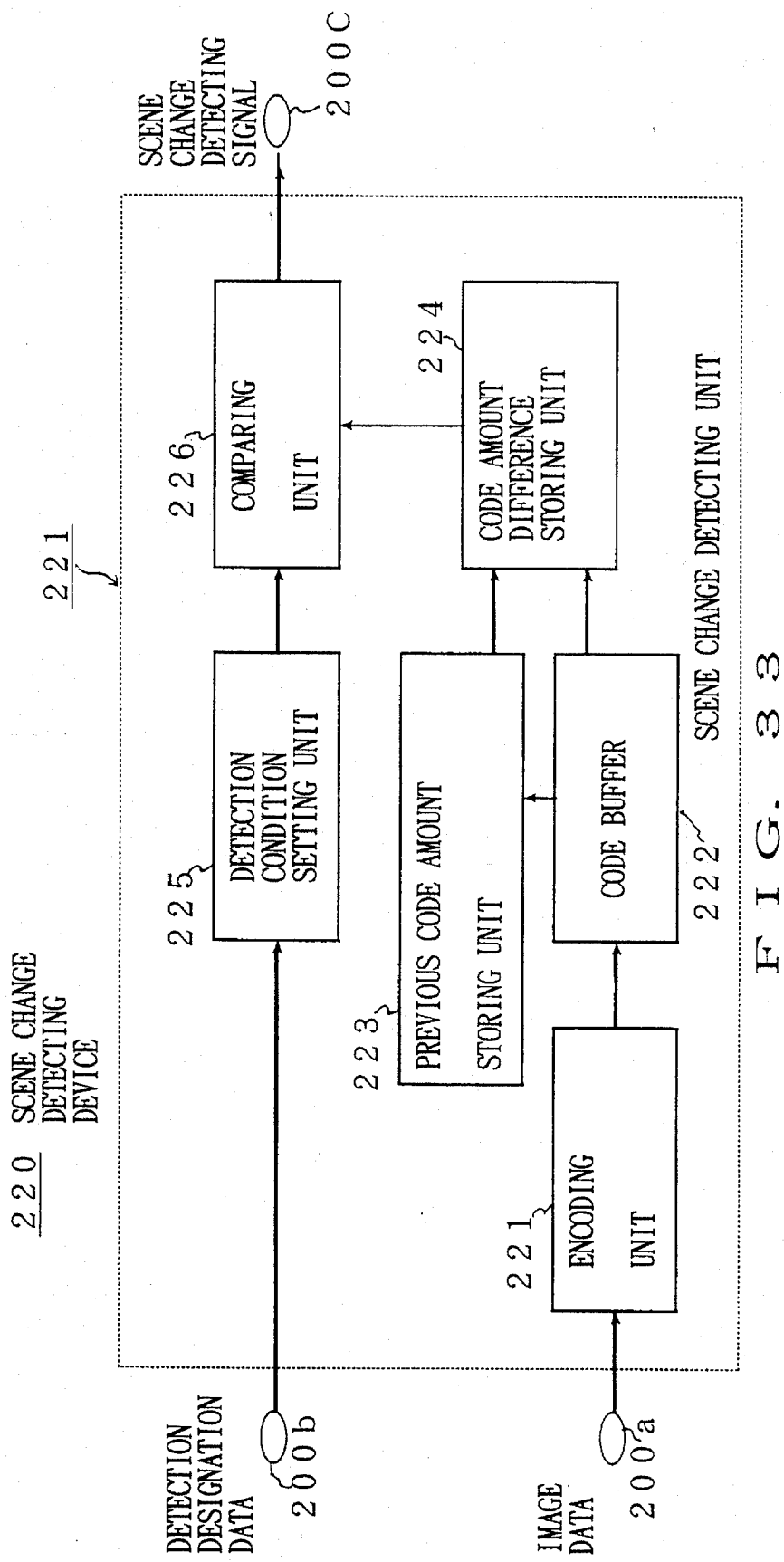
FIG. 33 is the block diagram showing the scene change detecting device according to the fifth embodiment of the present invention.

FIG. 33 is the block diagram showing a scene change detecting device 220 for detecting a change of scenes in a series of recorded moving picture data.

In FIG. 33, the scene change detecting device 220, indicated as being enclosed by dotted lines, comprises a scene change detecting unit 221 for detecting a scene change in the moving picture data, terminal 200a through which framed image data of moving picture are provided for the scene change detecting unit 221, terminal 200b through which detection designation data are provided for the scene change detecting unit 221, and terminal 200c through which a scene change detection signal indicating that a change of scenes has been detected is externally outputted.

Then, each block forming part of the scene change detecting unit 221 is explained below.

The encoding unit 221 efficiently encodes through the ADCT, etc. the framed image data inputted through input terminal 200a.

A code buffer 222 receives and stores 1-frame encoded data generated by the encoding unit 221, and calculates the encoded data.

A previous frame code amount storing unit 223 stores the amount of codes of the image data in the previous frame after receiving them from the code buffer 222.

A code amount difference storing unit 224 calculates and stores the difference between the amount of codes in the previous frame received from the previous frame code amount storing unit 223 and the amount of codes in the present frame received from the code buffer 222.

A detection condition setting unit 225 sets a detection condition (a standard value indicating the difference in the amount of codes) for a change of scenes designated according to the detection designation data received through input terminal 200b. A comparing unit 226 compares the detection condition (a standard value indicating the difference in the amount of codes) set by the detection condition setting unit 223 with the absolute value of the difference in the amount of codes received from the code amount difference storing unit 224, generates a scene change detection signal if it has detected a change of scenes (a scene-changed frame), and outputs it through output terminal 200c.

The comparing unit 226 compares the two code amount differences and determines that a different scene has appeared if the absolute value of the code amount difference received from the code amount difference storing unit 224 is larger than a standard value for the code amount difference set by the detection condition setting unit 225.

The scene change detecting device 220 shown in FIG. 33 detects a change of scenes while encoding 1-frame image data as is. It realizes a small size simple-circuit device by reducing the amount of data processed by the scene change detecting unit 221 after reducing the amount of input image data.

Figure 34:
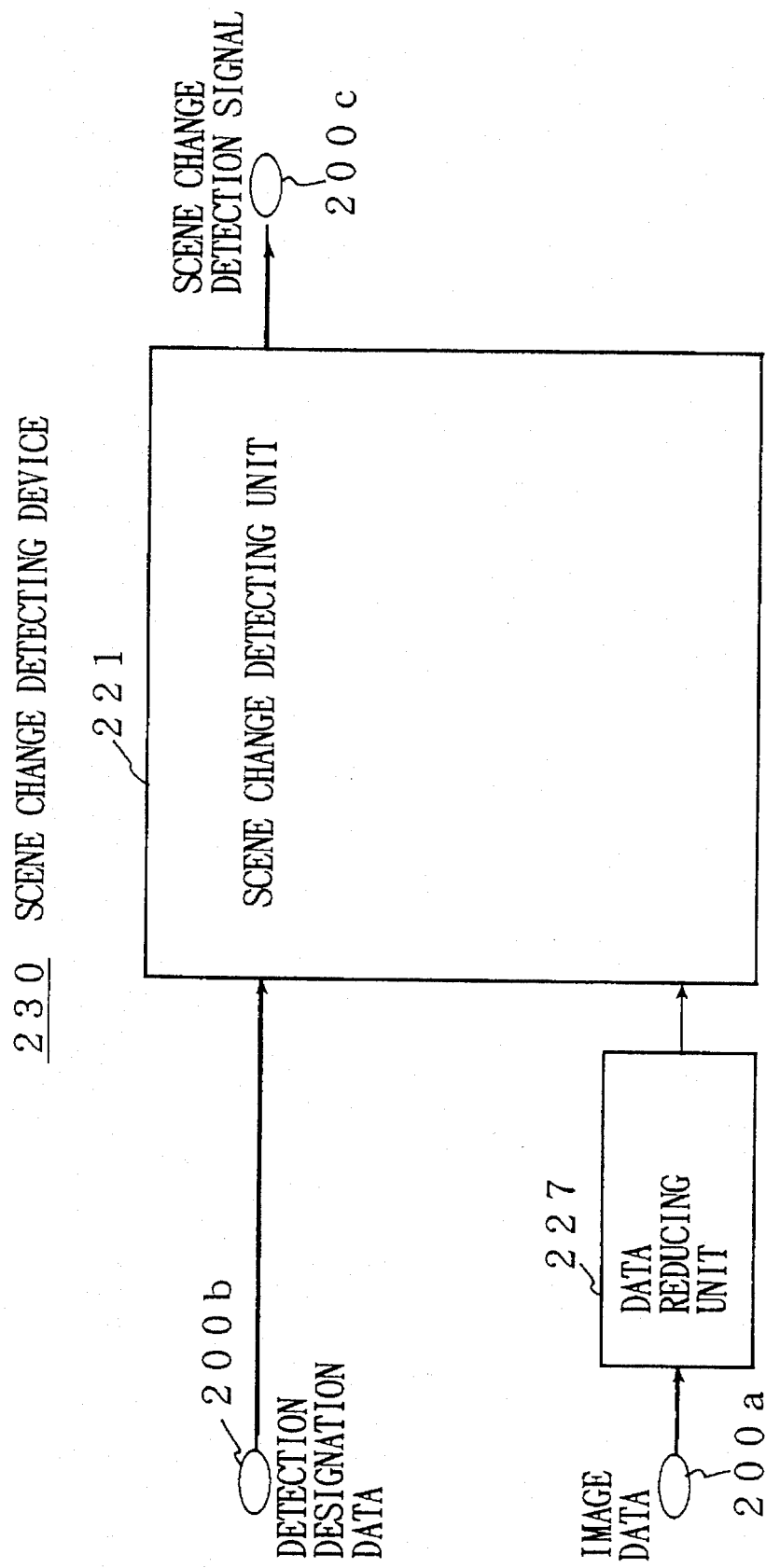
FIG. 34 is the block diagram showing the scene change detecting device according to the sixth embodiment of the present invention.

This is explained as the sixth embodiment. FIG. 34 is the block diagram showing a scene change detecting unit 230 as the sixth embodiment. As shown in FIG. 34, the scene change detecting unit 230 is designed such that a data reducing unit 227 is provided between the scene change detecting unit 221 shown in FIG. 33 and the image data inputting terminal 200a.

The data reducing unit 227 reduces the amount of framed image data at a predetermined compression rate. Data compression is realized by representing colored image data by monochrome data, by representing framed image data by image data in either odd or even number fields, by omitting picture elements at a predetermined rate, combining two or more of the above described methods, etc. It is obvious that original data are retained if a compression rate is "0".

FIGS. 35 through 38 show practical examples of reducing framed image data.

Figures 35A, 35B:
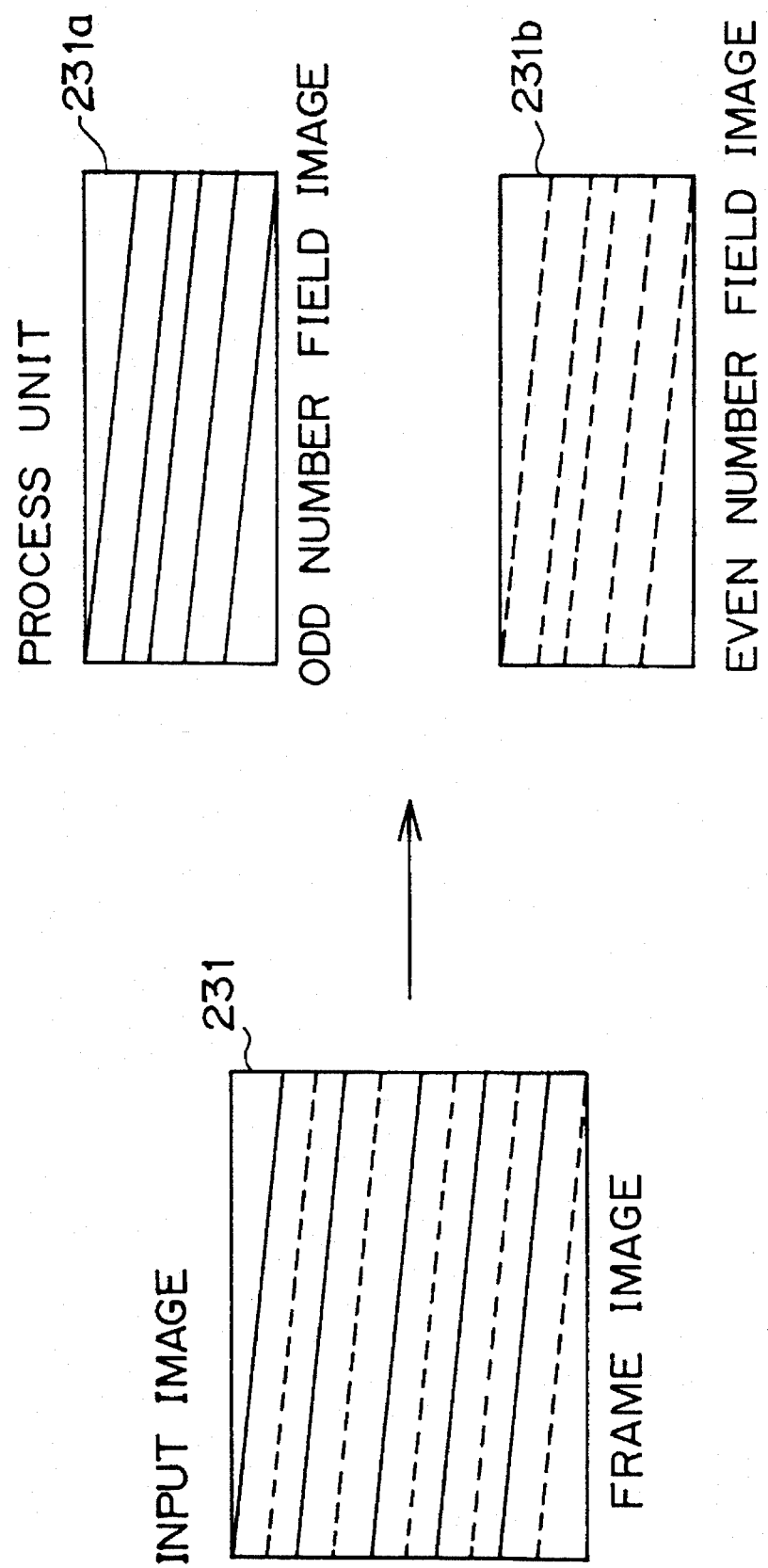
FIGS. 35A–B show the method (1) of reducing the amount of framed image data.

FIG. 35 shows a method of extracting and outputting either image data 231a in odd number fields or image data 231b in even number fields shown in FIG. 35B from framed image data 231 shown in FIG. 35A. In this case, the data compression rate is "½".

FIG. 36 shows a method of processing monochrome data by extracting, for example, G data from colored image data in a frame represented by three primary color signals R (red), G (green), and B (blue). That is, as shown in FIG. 36A, for example, the contents of G memory 232G are extracted and outputted when each of R, G, and B signals is stored in R memory 232R, G memory 232G, and B memory 232B respectively. It is not limited to G data, but R or B data can be extracted for output.

FIG. 37 shows a method of obtaining compressed image data 233s as shown in FIG. 37B by omitting at a predetermined rate (subsampling) picture elements in the framed image data 233 shown in FIG. 37A. Data can be omitted by one of the following methods, for example:

1. degrading the resolution in the horizontal direction (FIG. 38A)

2. degrading the resolution in the vertical direction (FIG. 38B)

3. degrading the resolution in the diagonal direction (FIG. 38C)

Among them, method 3 excels in visibility.

Data can be omitted adaptively, not fixedly as described above.

Thus, image data are compressed by the data reducing unit 227, and processed by the scene change detecting unit 220 to detect a change of scenes. Then, a scene change signal is outputted from the scene change detecting unit 220 if a change of scenes has been detected.

Figure 39:
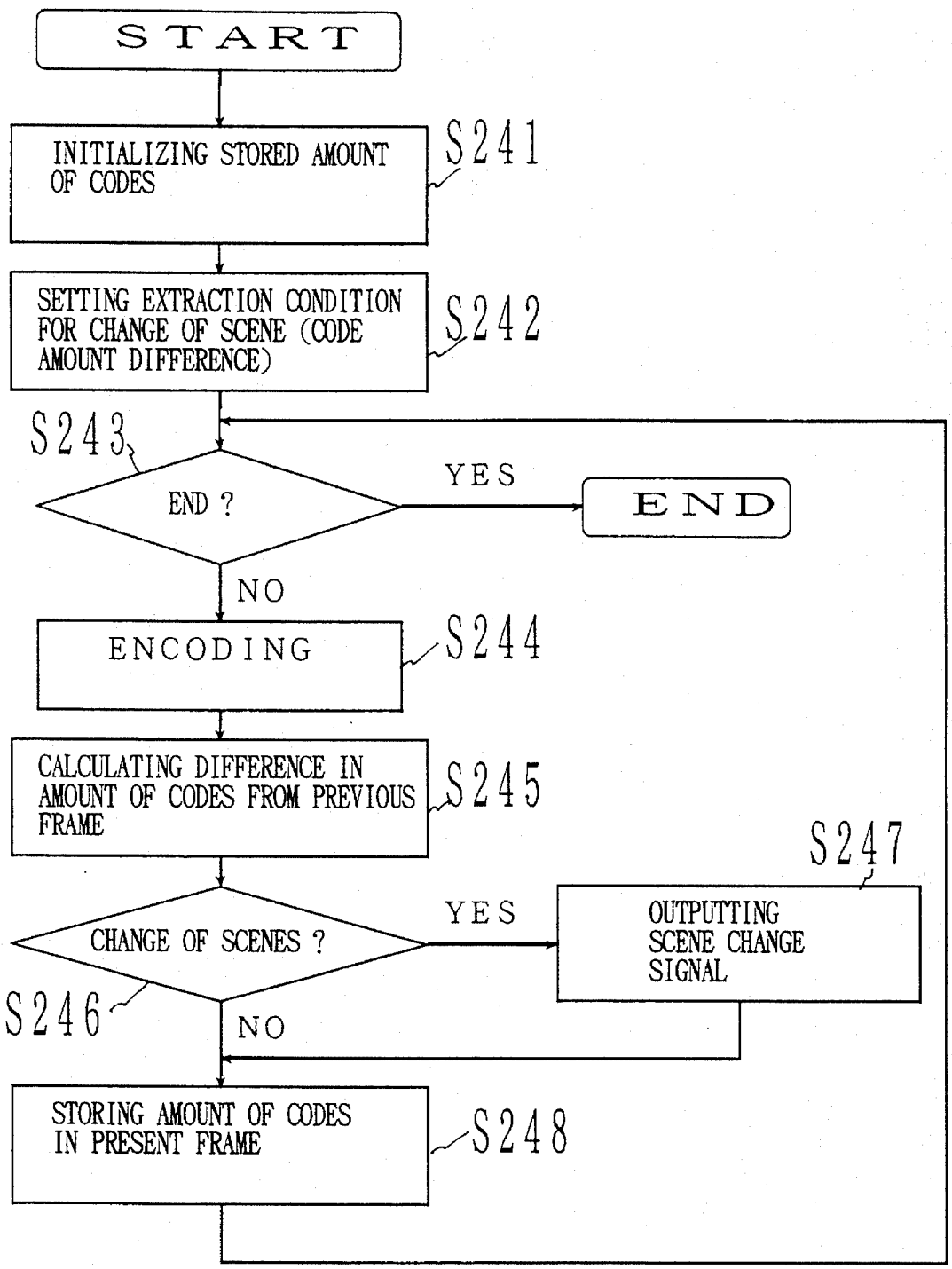
FIG. 39 is the flowchart indicating the basic operation of the scene change detecting device according to the fifth and sixth embodiments.

FIG. 39 shows the operation of detecting a change of scenes performed by the scene change detecting devices 220 and 230.

FIG. 39 is a flowchart for explaining the basic operation of the scene change detecting devices 220 and 230. The operation is executed such that each block shown in FIG. 33 is controlled by a control unit not shown in FIG. 39 provided in the scene change detecting unit 221.

First, the amount of codes is initialized in FIG. 39 (S241). That is, the amount of codes stored in each of the code buffer 222, the previous frame code amount storing unit 223, and the code amount difference storing unit 224 shown in FIG. 33 is cleared and initialized.

Then, the extraction condition for a change of scenes (difference in the amount of codes) is set (S242). That is, detection designation data are entered through terminal 200b, and the detection condition setting unit 225 is set to the standard value of the absolute value of the difference in the amount of codes to detect a change of scenes according to the designation data.

Next, it is determined whether or not the scene change detecting process should be completed, that is, whether or not the scene change detecting process has been performed on all frames (S243).

In the determination in S243, if it is determined that the scene change detecting process has been performed on all frames ("Yes" in S243), the process is immediately terminated. If not ("No" in S243), the image data in the next frame are encoded (S244). That is, the encoding unit 221 encodes image data in the frames next entered through terminal 200a, and stores in the code buffer 222 the encoded data in the entered frame (the present frame). The code buffer 222 calculates and stores the amount of codes in the encoded data inputted to the buffer.

Then, the code amount difference storing unit 224 receives the amounts of codes in the previous and present frames from the previous frame code amount storing unit 223 and the code buffer 222 respectively, and calculates and stores the difference between them (S245)

Next, it is determined whether or not a change of scenes has been detected (S246). That is, the scene change detecting device compares the detection condition (a standard value of the absolute value of the code amount difference) set in the detection condition setting unit 223 with the absolute value of the code amount difference stored by the code amount difference storing unit 224, and determines that a change of scenes has been detected if the absolute value of the code amount difference stored in the code amount difference storing unit 224 is larger than the standard value of the absolute value of the code amount difference stored in the detection condition setting unit 223.

The comparing unit 225 externally outputs a scene change detection signal through terminal 200c if it has detected a change of scenes as a result of the determination (S247). Then, a succeeding process is performed as described later.

Next, the code buffer 222 transfers the amount of codes of the encoded data in the present frame to the previous frame code amount storing unit 223, and the previous frame code amount storing unit 223 internally stores the amount (S248). The amount of codes is used as the "amount of data in the previous frame" in the similar calculation performed in the succeeding process.

If no scene-changed frames can be detected in the determination in S246, the process in S248 is immediately performed. That is, in this case, the amount of codes stored by the previous frame code amount storing unit 223 is stored as is.

Thus, the processes from S243 through S248 are repeated until the end of the scene changes is detected in S243, and a scene change detection signal is externally outputted each time a change of scenes is detected.

As described above, the moving picture encoding device shown in FIG. 22 and the scene change detecting devices 220 and 230 shown in FIGS. 33 and 34 detect a change of scenes (scene-changed frame) based on an image in an entire frame. That is, a change of scenes is detected based on the difference in the amount of codes in the image data in the entire frame between adjacent frames.

However, in an actual moving picture, there can be a case in which a scene-changed frame indicates almost the same amount of codes for the entire frame as that indicated by the previous frame. Unfortunately, it is possible, though very rare, that the amounts of codes in the present and previous frames are exactly equal to each other. In such a case, each of the devices fail to detect a change of scenes at all.

However, in the embodiment explained below, even the unfortunate case described above can be detected without fail, and framed image data can be efficiently encoded.

Figure 40:
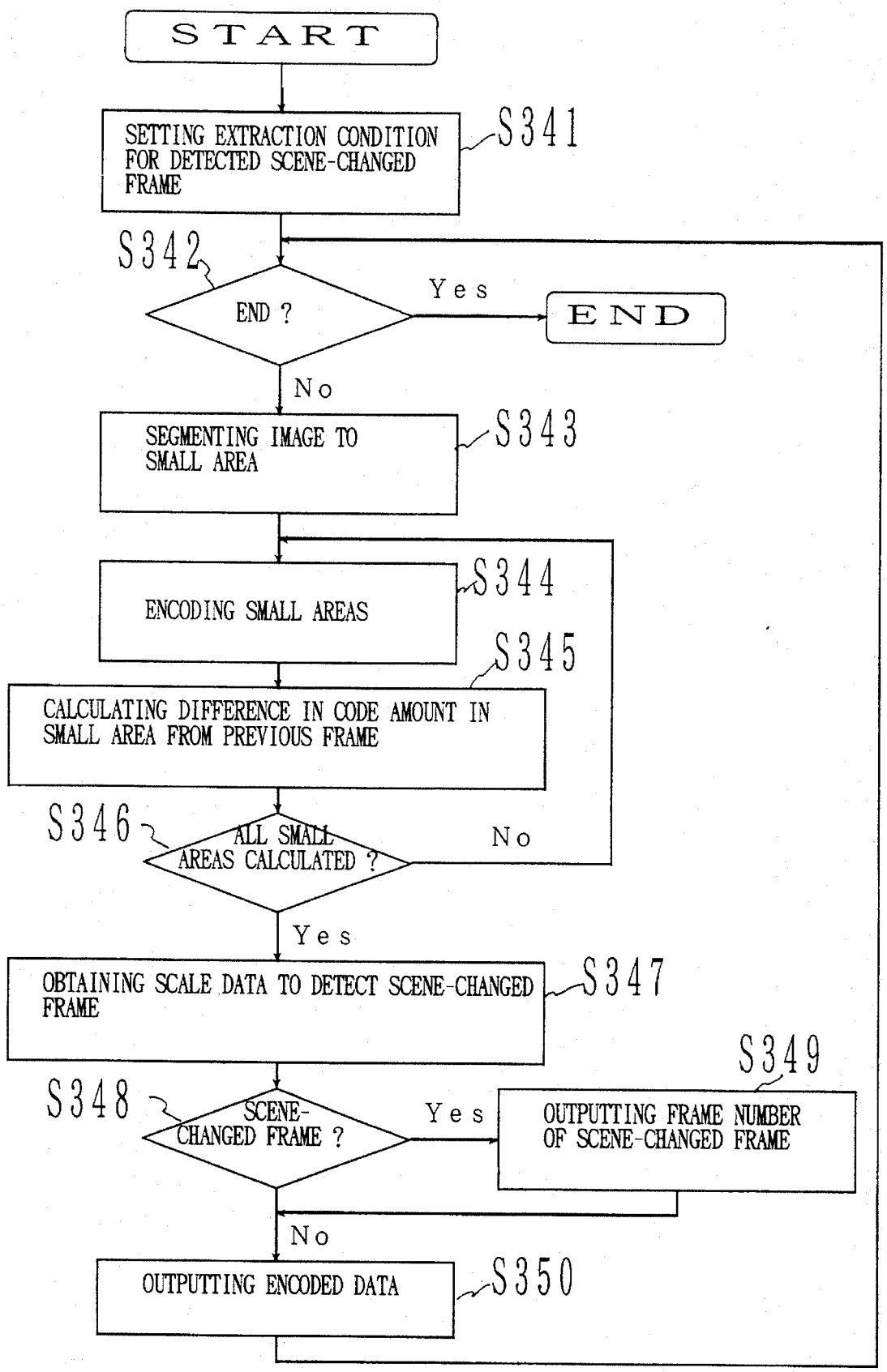
FIG. 40 is the flowchart indicating the image data encoding method according to the seventh embodiment of the present invention.

FIG. 40 is a flowchart for explaining the seventh embodiment of the present invention for encoding image data.

First, an extraction condition to detect a scene-changed frame (a frame whose image has been changed from the one in the previous frame, that is, a change of scenes) (341). The extraction condition refers to, for example, a standard value of the sum of the absolute values of the code amount differences, or the standard value of the average rate of difference in the amount of codes, etc.

Then, it is determined whether or not the encoding process has been performed on all frames (S342). If there are still some frames to be processed ("No" in S342), then the image data of the next frame are inputted and divided into a plurality of small areas (S343).

Figure 41:
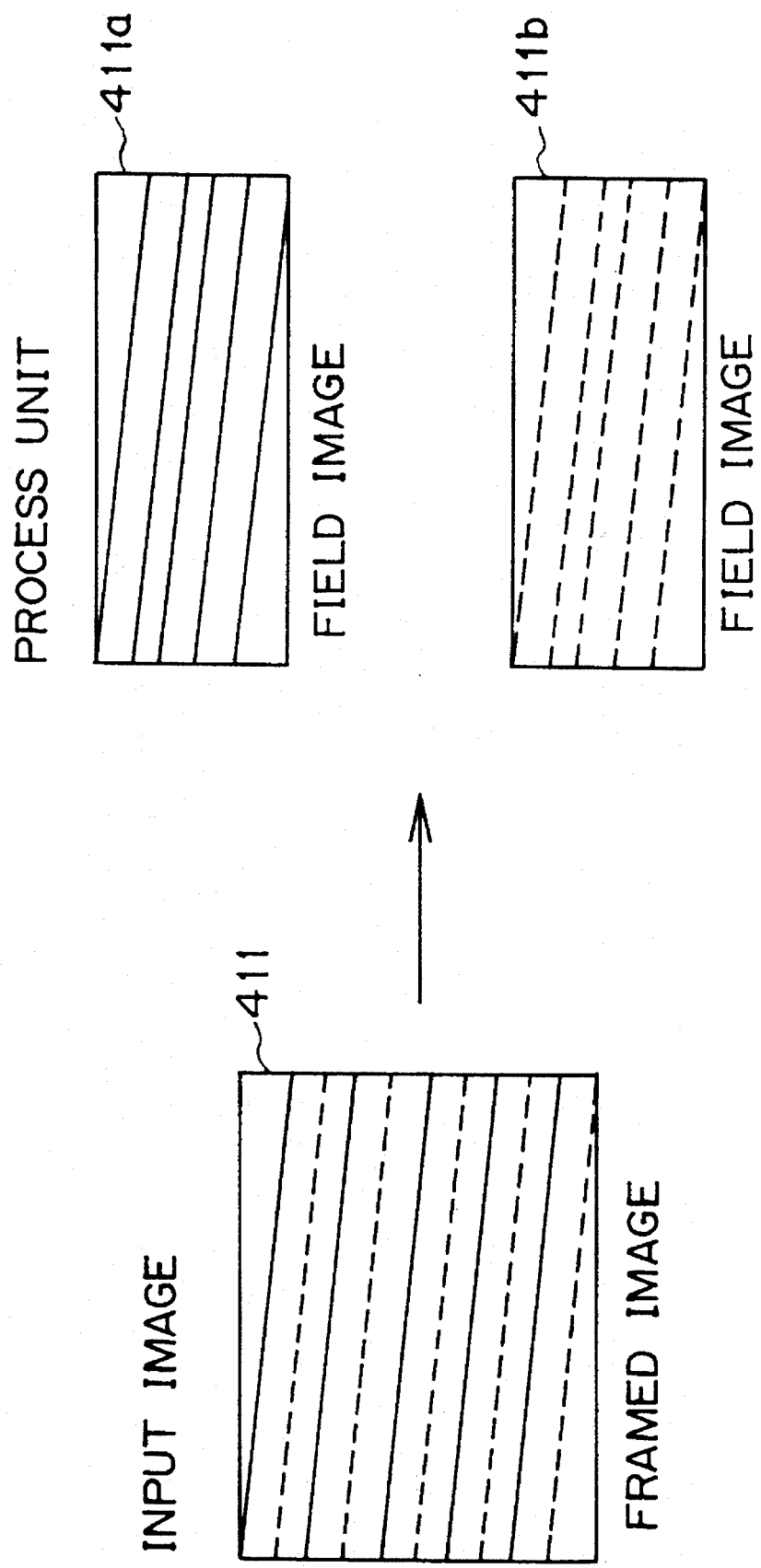
FIGS. 41A–B shows the method (1) of dividing an image to a plurality of small areas.

Image data can be divided to small areas as follows according to the method shown in FIG. 41 through 39.

1. As shown in FIG. 41, framed image data 411 (refer to FIG. 41A) are divided to area 411a comprising the image data in odd number fields and the area 411b comprising the image data in even number fields (refer to FIG. 41B).

Figure 42:
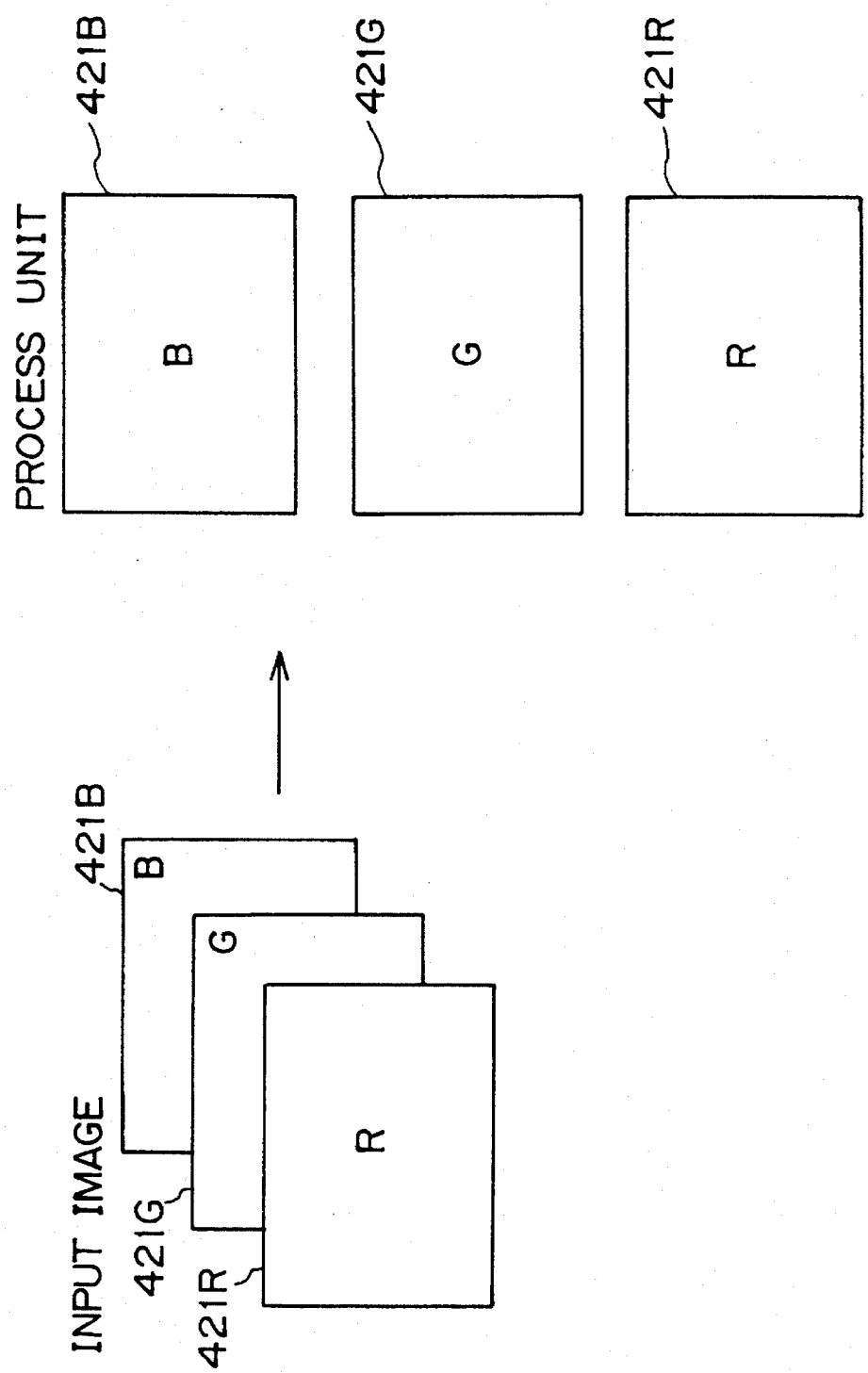
FIG. 42 shows the method (2) of dividing an image to a plurality of small areas.

2. As shown in FIG. 42A, if frame image data are colored image data comprising R (red), G (green), and B (blue) signals, and these three primary color signals are stored in R memory 421R, G memory 421G, and B memory 421B respectively, then each of these memories 421R, 421G, and 421B is processed as a small area. The data are not limited to R, G, and B data, but can be Y, U, and V data or Y, M, C, and K data. They can also be divided as described above (for example, in the case of Y, U, and V data, only Y data are extracted).

Figure 43:
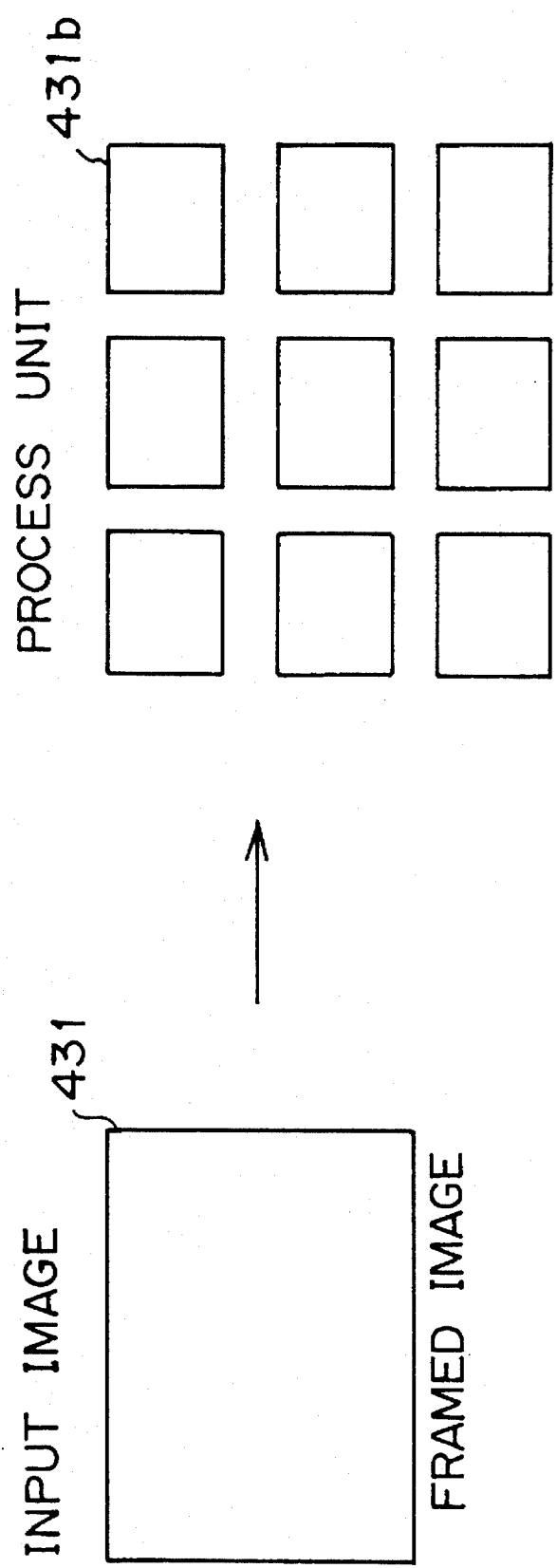
FIG. 43 shows the method (3) of dividing an image to a plurality of small areas.

3. As shown in FIG. 43, framed image data 431 (refer to FIG. 43A) are equally divided to a plurality of small areas 431b (refer to FIG. 43B), that is, in predetermined process units (for example, encoding process units).

Figure 44:
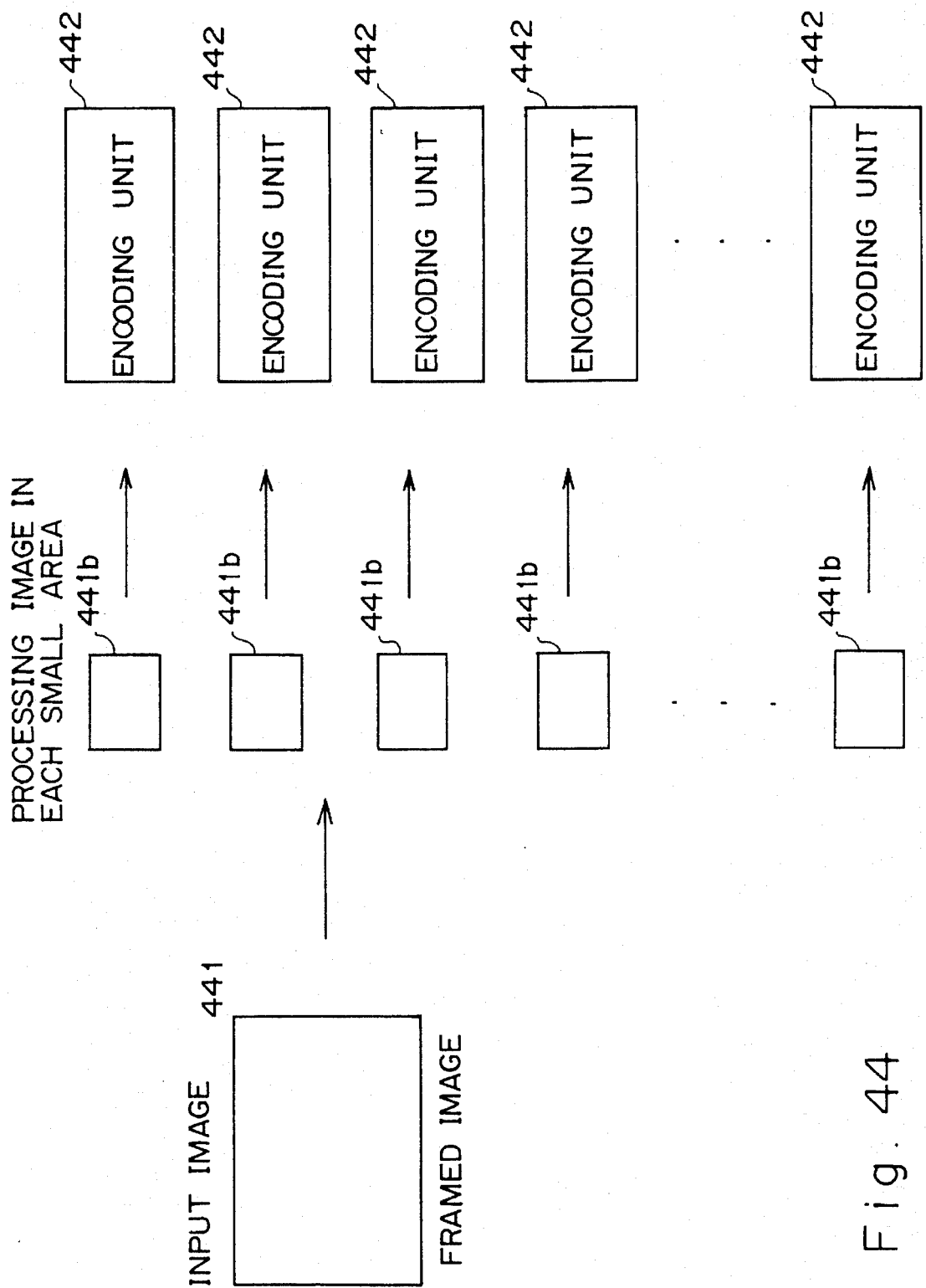
FIG. 44 shows the method (4) of dividing an image to a plurality of small areas.

4. As shown in FIG. 44, after 1-frame input image 441 are divided into a plurality of small areas 441b according to one of the above listed methods 1, 2, or 3, etc., these small areas 441b are encoded in parallel by individual encoding units 442 separately. That is, a plurality of small areas 441b can be performed in parallel.

In the process in S343, after framed image data are divided to a plurality of small areas according to one of the methods listed above, the image data are encoded in small-area units (S344).

Then, a difference in the amount of codes, obtained by the encoding process, in a corresponding small area is calculated between the previous and present frames.

When the processes in S344 and S345 have been performed on all small areas in the present frame ("Yes" in S346), scale data necessary for detecting a change of scenes are obtained based on the difference in the amount of codes of all small areas as being calculated in the above described process S345 (S347). The scale data are, for example, the sum of the absolute values of the code amount differences of all small areas, an average rate of difference in the amount of codes in a small area between the previous and present frames, etc.

Thus, after the scale data are obtained, they are compared with the extraction condition (standard value) set in the process S341, and it is determined whether or not the present frame refers to a scene-changed frame (a change of scenes) (S348).

That is, if the sum of the absolute values of the code amount differences in the small areas in the present frame, or an average rate of difference in the amount of codes in a small area between the present and previous frames is greater than the detection condition (the standard value), then the present frame is considered to refers to a scene-changed frame (a change of scenes). If it is smaller than the standard value, then it is considered to refer to a scene-unchanged frame.

If the present frame refers to a scene-changed frame (a change of scenes) ("Yes" in S348), then the number of the present scene-changed frame is outputted (S349) and the encoded data in the present frame are outputted (S350).

If the present frame is determined to be scene-unchanged frame (no change of scenes) in S348, then only the encoded data in the present frame are outputted (S350).

The above described processes in S343 through S350 are performed on all frames of moving picture. If it is determined that the processes have been performed on the last frame, the encoding process terminates.

Thus, according to the encoding method, framed image data are divided to a plurality of small areas. After a code amount difference is calculated for each small area, the sum of the absolute values of the differences or an average rate of difference can be obtained. If the sum or the average rate of difference is larger than an experimentally obtained standard value, the present frame is determined to refer to a scene-changed frame (a change of scenes). In moving picture, it is rare that an entire image in a frame is changed completely. In most cases, only a part of a frame is changed. Thus, checking the difference in the amount of codes in a small area between the previous and present frames successfully detects a partial difference in a frame. Furthermore, the sum of the absolute values of the code amount differences in all small areas between the present and previous frames or an average rate of difference between the present and previous frames in small areas enables exact detection of a scene-changed frame.

Figure 45:
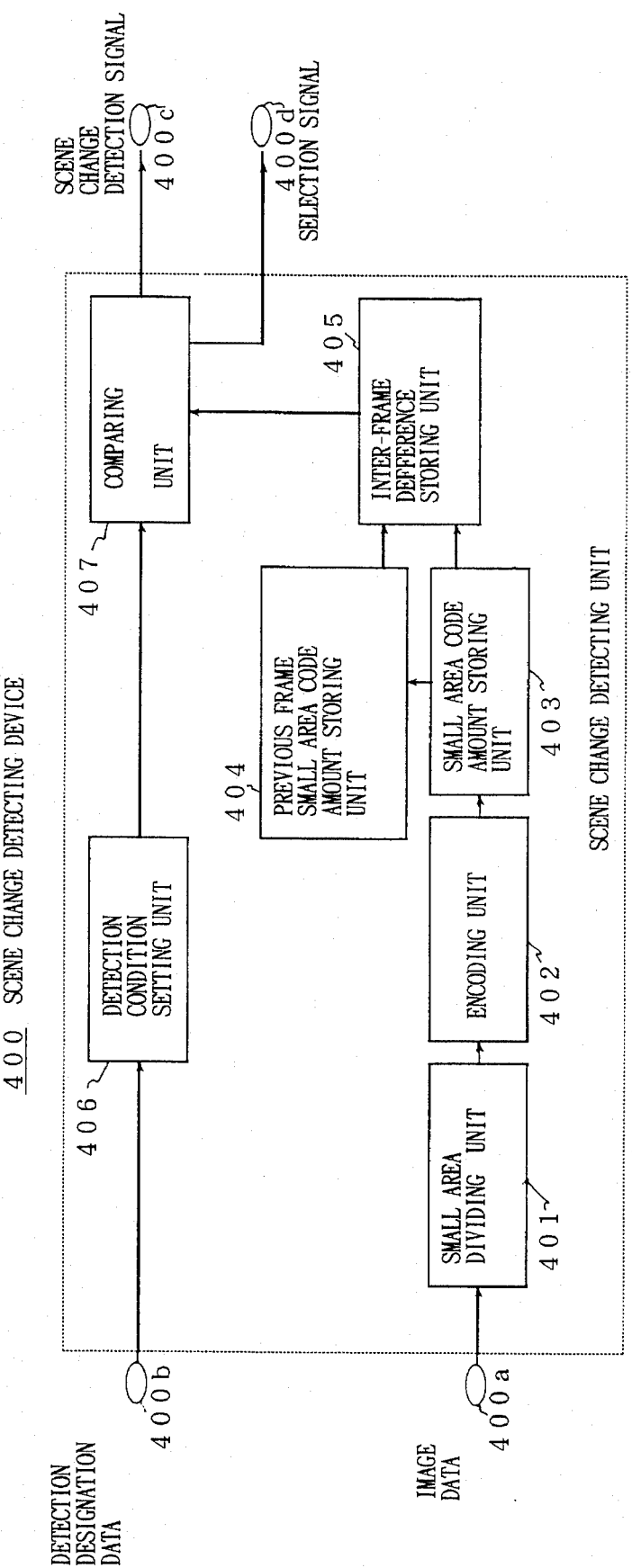
FIG. 45 is the block diagram showing the scene change detecting device according to the eighth embodiment of the present invention.

Next, FIG. 45 shows as the eighth embodiment of the present invention an example of the configuration of a scene change detecting device 400 for detecting a change of scenes according to the above described method.

With the scene change detecting device 400 in FIG. 45, a small area dividing unit 401 divides 1-frame image data applied through input terminal 400a to a plurality of small areas. The dividing operation is performed by one of the above described methods shown in FIGS. 41 through 44.

An encoding unit 402 sequentially receives image data in small areas in a predetermine order from the small area dividing unit 401, encodes the image data in each of the small areas separately according to the ADCT, etc., and outputs to a small area code amount storing unit 403 the data, encoded by the encoding unit, in each of the small areas.

The small area code amount storing unit 403 calculates the amounts of codes of the encoded data in small areas after receiving them from the encoding unit 402, and stores the amounts of codes in small areas.

A previous frame small area code amount storing unit 404 stores the amount of codes in each of the small areas in the previous frame calculated by the small area code amount storing unit 403.

An inter-frame difference storing unit 405 receives the amounts of codes in the small areas in the present and previous frames from the small area code amount storing unit 403 and the previous frame small area code amount storing unit 404 respectively, calculates the difference between the present and previous frames in the amount of codes in the small areas, and obtains the sum of the absolute values of the differences calculated as described above for all small areas. The sum is outputted to a comparing unit 407.

Thus, when the inter-frame difference storing unit 405 outputs to the comparing unit 407 the sum of the differences in the amount of codes, the small area code amount storing unit 403 outputs to the previous frame small area code amount storing unit 404 the total code amount in all small areas in the present frame, while the present frame small area code amount storing unit 404 updates the presently stored code amount to the amount of codes in the small areas of the present frame applied from the small area code amount storing unit 403. The last stored code amount is used as the code amount of the previous frame to obtain the difference in the amount of codes in the small areas of the image data next applied through input terminal 400a.

A detection condition setting unit 406 receives detection designation data through input terminal 400b, and sets and internally stores the code amount difference designated by the detection designation data. The code amount difference refers to a standard value of the sum of the absolute values of the code amount differences which is used to detect a scene-changed frame.

When the comparing unit 407 receives from the inter-frame difference storing unit 405 the sum of the absolute values of the differences in the amount of codes in a small area of the present frame, it compares the sum with the code amount difference set by the detection condition setting unit 406. If the sum is larger than the preliminarily set code amount difference, then the present frame is considered to be a scene-changed frame (a change of scenes). At this time, the comparing unit 407 outputs a scene change detection signal (COS signal) through output terminal 400c, and outputs through output terminal 400d a selection signal active while the scene change detection signal (COS code) is effective. When the sum is smaller than the preliminarily set difference, none of the signals are outputted.

Next, FIG. 46 is the block diagram showing another example of a configuration of the scene change detecting unit. A scene change detecting device 450 is the ninth embodiment of the present invention, and detects a change of scenes according to a varied rate of difference in the amount of code in a small area between the present and previous frames.

In FIG. 46, a small area dividing unit 451, an encoding unit 452, a small area code amount storing unit 453, and a previous small area code amount storing unit 454 are designed similarly to each of the blocks shown in FIG. 45, that is, the small area dividing unit 401, the encoding unit 402, the small area code amount storing unit 403, and the previous frame small area code amount storing unit 404. Accordingly, the explanation of these blocks is omitted.

A detection condition setting unit 456 sets and stores a rate of difference specified according to the detection designation data applied through input terminal 450b. The rate of difference is a standard value of the rate of difference in the amount of codes which can be used as a determination standard according to which a change of scenes can be determined.

The rate-of-difference counting unit 455 receives the amounts of codes in all small areas in the previous and present frames from the previous small area code amount storing unit 454 and the small area code amount storing unit 453 respectively when the small area code amount storing unit 453 stores the amount of codes of encoded data in all small areas in the present frame. Then, it counts the rate of difference in the amount of codes for each of the small areas, and outputs to an average rate-of-difference counting unit 456 the rate of difference in the amount of codes of all small areas in the present frame.

The average rate-of-difference counting unit 456 obtains an average value of the rates of differences in the amount of codes in all small areas in the present frame (an average rate of difference), and outputs it to a comparing unit.

The comparing unit 457 compares the average value of the rate of difference in the amount of codes in small areas of the applied present frame with the standard average rate of difference applied from the detection condition setting unit 456, recognizes that the present frame is a scene-changed frame (a change of scenes) only when the average rate of difference is greater than the standard average rate of difference, and externally outputs a scene change detection signal (COS code) and an active selection signal through output terminal 450c and 450d respectively.

FIG. 47 shows an example of a configuration of the moving picture encoding device as the tenth embodiment of the present invention. In the embodiment, the scene change detecting unit of the scene change detecting devices 400 or 450 is incorporated as a scene change detecting unit 510. The encoding device generates and outputs encoded data groups 130 in the format shown in FIG. 24.

Figure 49:
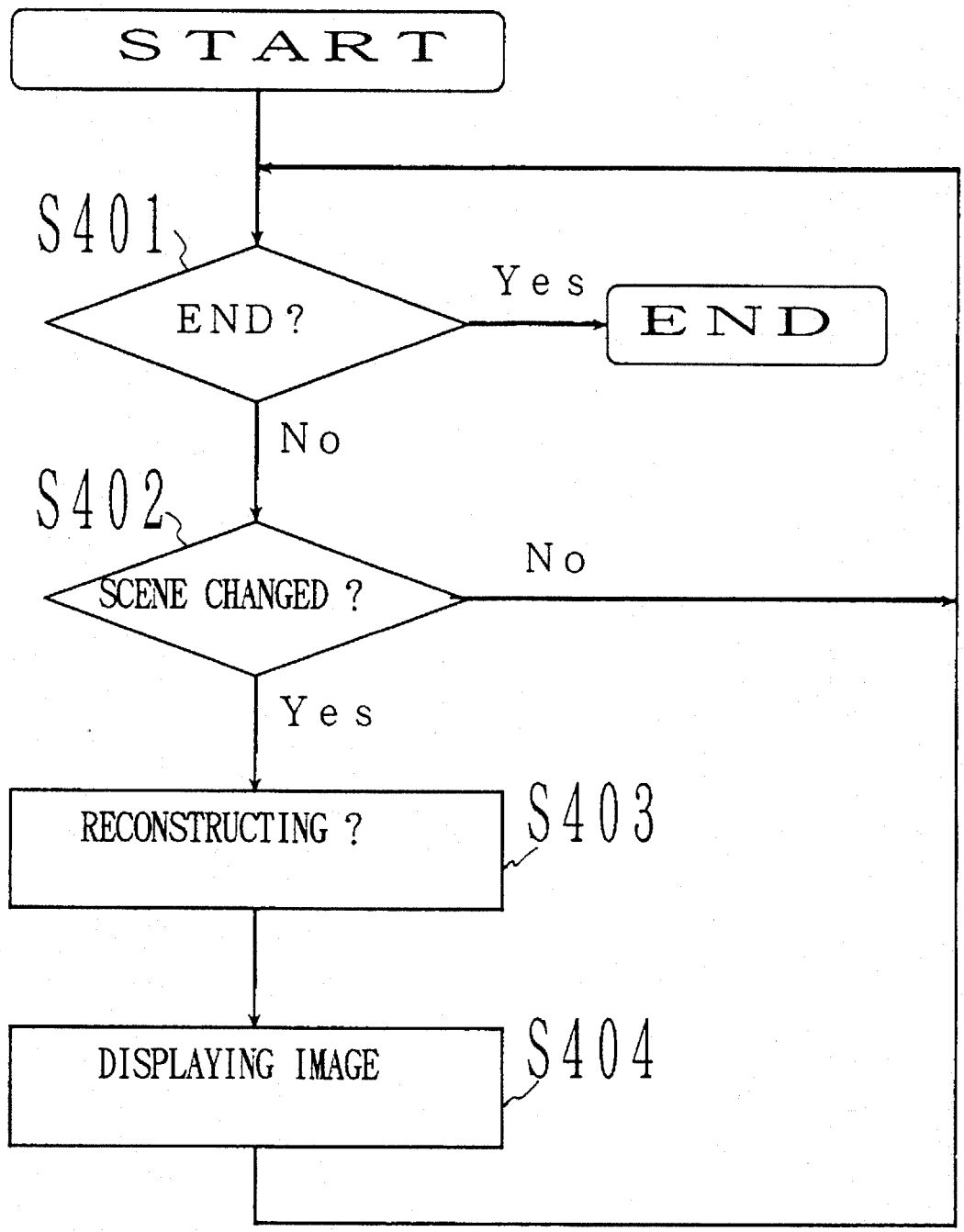
FIG. 49 is the flowchart indicating the method of reconstructing image data according to the 12th embodiment of the present invention.

In FIG. 47, 1-frame image data are applied through input terminal 500a like input terminal 400a or 450a as shown in FIGS. 45 and 49. Likewise, detection designation data indicating the difference used as a standard value at the detection of a change of scenes are applied through input terminal 500b like input terminal 400b or 450b shown in FIG. 45 or 46.

The scene change detecting unit 510 has the same configuration as that of the scene change detecting device 400 or 450 shown in FIG. 45 or 46 respectively. It divides 1-frame image into a plurality of small areas, encodes image data in each of the small areas, and detects a scene-changed frame (a change of scenes). If a scene-changed frame has been detected, a scene change signal and an active selection signal are outputted to a switch 530.

An encoding unit 520 efficiently encodes moving picture data applied through input terminal 500a, and outputs to the switch 530 one-frame encoded data obtained by the encoding process. The configuration of the encoding unit 520 is the same as that of the encoding unit 111 for encoding data to variable-length codes according to, for example, the ADCT shown in FIG. 22. That is, it encodes 1-frame image data applied through input terminal 500a to variable-length codes according to the ADCT, and generates and outputs the encoded data in accordance with the JPEG standard.

The switch 530 outputs through output terminal 500c 1-frame encoded data applied by the encoding unit 520 when no active selection signals are applied from the scene change detecting unit 510. When an active selection signal is applied, a scene change detection signal (COS code) applied from the scene change detecting unit 510 is outputted through output terminal 500c as being added to the head of the encoded data meeting the JPEG standard and entered from the encoding unit 520.

According to a series of processes described above, the moving picture encoding device generates and outputs encoded data groups 130 in the format shown in FIG. 24.

Figure 48:
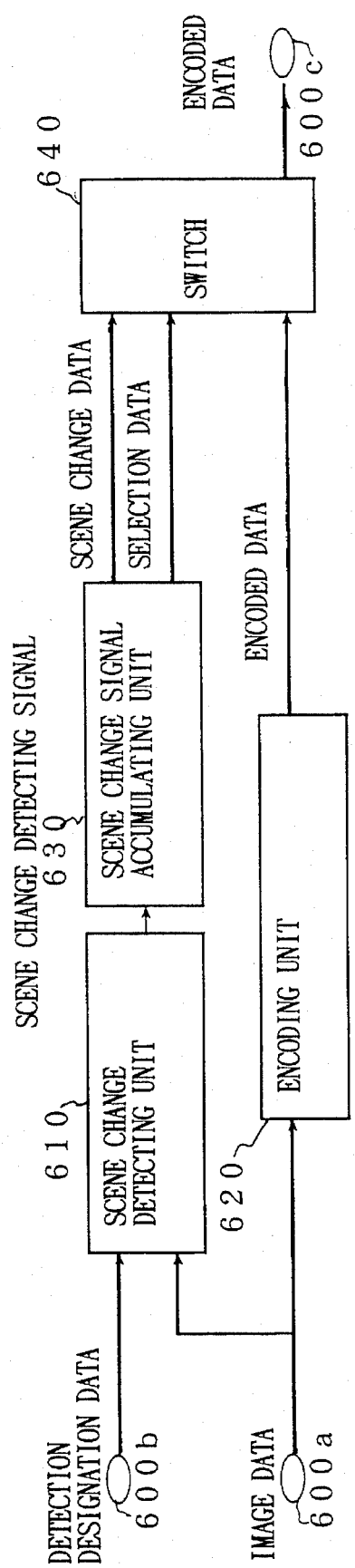
FIG. 48 is the block diagram showing the image encoding device according to the 11th embodiment of the present invention.

Next, FIG. 48 is the block diagram showing the moving picture encoding device according to the 11th embodiment of the present invention for generating and outputting encoded data groups 140 shown in FIG. 25.

In FIG. 48, input terminals 600a and 600b and output terminal 600c have the same function as that of input terminals 500a and 500b and output terminal 500c shown in FIG. 47. A scene change detecting unit 610 and an encoding unit 620 also have the similar configuration to that of the scene change detecting unit 510 and the encoding unit 510 shown in FIG. 47. Accordingly, the detailed explanation of these blocks are omitted here.

A scene change signal accumulating unit 630 counts each time a scene change detection signal is applied from the scene change detecting unit 610, and counts the number of the input of the scene change detection signal. Together with the input of the scene change detection signal, the frame number of a scene-changed frame is entered and accumulated internally. When a signal indicating the termination of the detection of a change of scenes (scene change detection completion signal) is entered from the scene change detecting unit 630, an active selection signal is outputted to a switch 640 together with scene change data comprising the accumulated number of scene changes and the scene-changed frame numbers. Since the scene change detecting unit 610 and the encoding unit 620 operate in parallel to encode image data, the scene change detection signal is outputted immediately after the encoding unit 620 has outputted the encoded data of the last n-th frame moving picture data to the switch 640.

The switch 640 outputs through output terminal 600c only the encoded data outputted from the encoding unit 620 while the active selection signal is not entered. Thus, the encoded data from an SOM code followed by the 0-th frame to the n-th (last) frame are sequentially outputted through output terminal 600c.

If the scene change signal accumulating unit 630 enters an active selection signal immediately after the encoded data on the n-th frame are entered through output terminal 600c, then the switch 640 enters scene change data inputted from the scene change signal accumulating unit 630 (the data having the same configuration as that of the added data 140-F shown in FIG. 25) before the EOM code outputted by the encoding unit 620, and outputs it through output terminal 600c.

According to a series of processes described above, moving picture can be encoded to encoded data groups 140 in the format shown in FIG. 25 and then outputted.

Then, FIG. 49 is a flowchart for explaining a method of reconstructing and displaying image data from the data encoded by the encoding method shown in FIG. 40 as the 12th embodiment of the present invention.

According to the image data reconstructing method, encoded data are entered first. Then, by checking whether or not the data indicate the end of the encoded data string (an EOM code shown in FIG. 24 or 25), it is determined whether or not image data are completely reconstructed from the encoded data (S401).

Unless the reconstruction of image data from encoded data has been completed ("No" in S401), the encoded data in the last entered frame are analyzed, and it is determined whether or not the encoded data refer to those in a scene-changed frame (S402). The determination is made by searching the encoded data in the frame for a COS code.

If it is determined that the encoded data refers to a scene-changed frame ("Yes" in S402), then image data are reconstructed from the encoded data (S403), and the image in the scene-changed frame is displayed according to the reconstructed image data (S404).

On the other hand, in S402, if it is determined that the encoded data do not refer to a scene-changed frame ("No" in S402), then control is returned to the process in S401, and the encoded data in the next frame are entered.

The processes in S401 through S404 are repeated until all encoded data have been processed (until an EOM code is entered).

Thus, image data are reconstructed from only the encoded data indicating a scene-changed frame, and images indicating changes of scenes are reconstructed and displayed.

Figure 50:
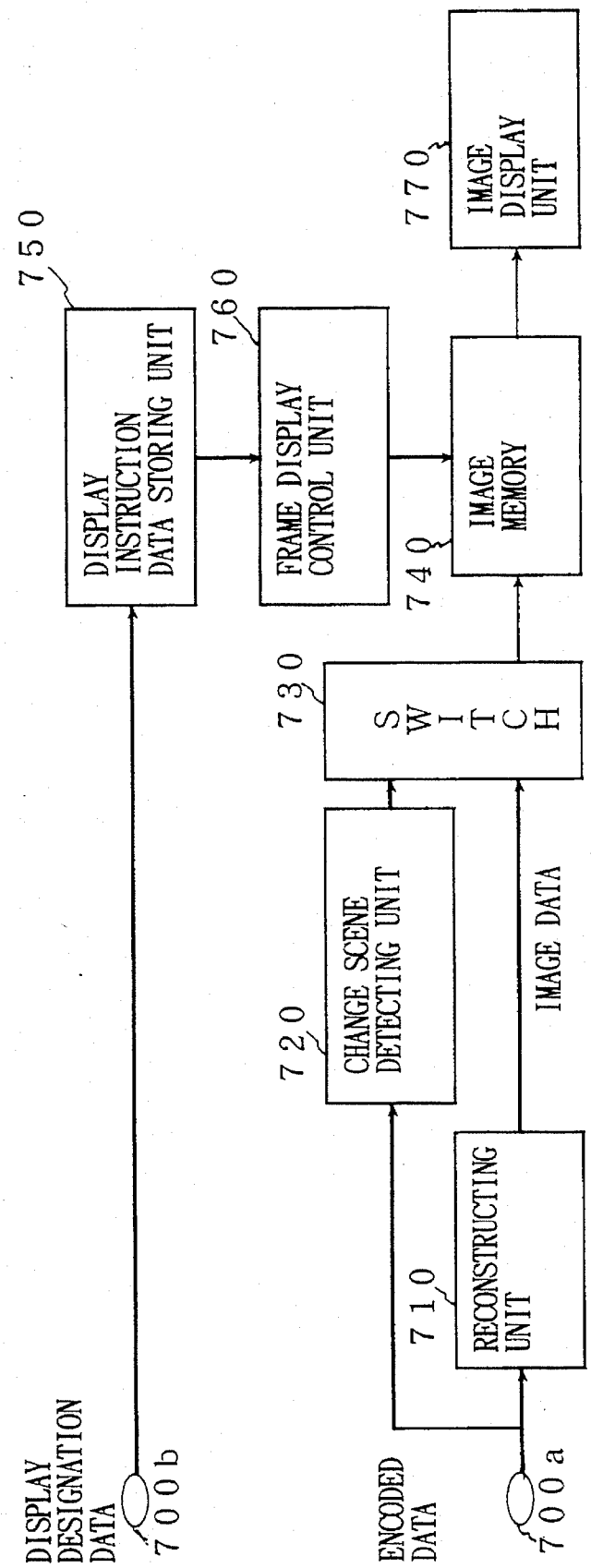
FIG. 50 is the block diagram showing the image reconstructing device according to the 13th embodiment of the present invention.

FIG. 50 shows the 13th embodiment of the present invention. It shows an example of a configuration of the moving picture reconstructing device for displaying only the images indicating scene-changed frames according to the above described reconstructing method.

In FIG. 50, a reconstructing unit 710 reconstructs image data in frame units from encoded data groups 130 or 140 shown in FIG. 24 or 25 and entered through input terminal 700a, and outputs the reconstructed image data to a switch 730. The reconstructing unit 710 has the same configuration as that of, for example, the reconstructing unit 162 shown in FIG. 28.

Encoded data groups 130 or 140 entered through input terminal 700a are also entered to a scene change detecting unit 720.

The scene change detecting unit 720 sequentially enters code tables of the frames containing encoded data groups 130 starting with the 0-th frame, and detects a change of scenes, that is, a scene-changed frame, by searching encoded data in each frame for a COS code. If a scene-changed frame has been detected, the detecting unit outputs a scene change detection signal to the switch 730.

For encoded data groups 140, a change of scenes can be detected by reading the contents of added data 140-F, and a scene change detection signal is outputted to the switch 730 when image data indicating each change of scenes are outputted to the switch 730.

The switch 730 outputs to an image memory 740 the image data received from the reconstructing unit 710 only when it receives a scene change detection signal from the scene change detecting unit 720.

The image memory 740 sequentially stores image data indicating change of scenes (scene-changed frames) received through the switch 730.

A display instruction data storing unit 750 receives display instruction data through input terminal 700b, and sets and stores information in a display format designated according to the display instruction data.

A frame display control unit 760 has an image display unit 770 receive image data indicating changes of scenes stored in the image memory 740 according to the display format information set and stored in the display instruction data storing unit 750 so that the image display unit 770 can display the images indicating changes of frames in the display format designated according to the display instruction data.

As a result of the above described series of processes, the image display unit 770 displays, for example, images indicating changes of scenes in the format shown in FIG. 29A or 29B.

The above described scene change detecting method and device enable a change of scenes to be detected by encoding the image of an entire frame. However, for example, when the method and device are applied to a monitoring device, etc. only a part, that is, a specific portion, of an image received by a camera should be checked and analyzed for a change of images. This effectively applies to the monitoring service in museums and art galleries, at the service windows of financial organizations such as banks, etc., and as an automatic guard over a cash office, etc.

The following embodiment is an example of a scene change detecting method and device applicable to such a monitoring device.

FIG. 51 is a flowchart showing a method of detecting a change of scenes at a specific area (detection area) in a frame using moving picture data according to the 14th embodiment of the present invention.

First, in this method, the amount of codes in image data (amount of contained codes) in the detection area in the previous frame is initialized to a predetermined value (S501).

Figure 59A:
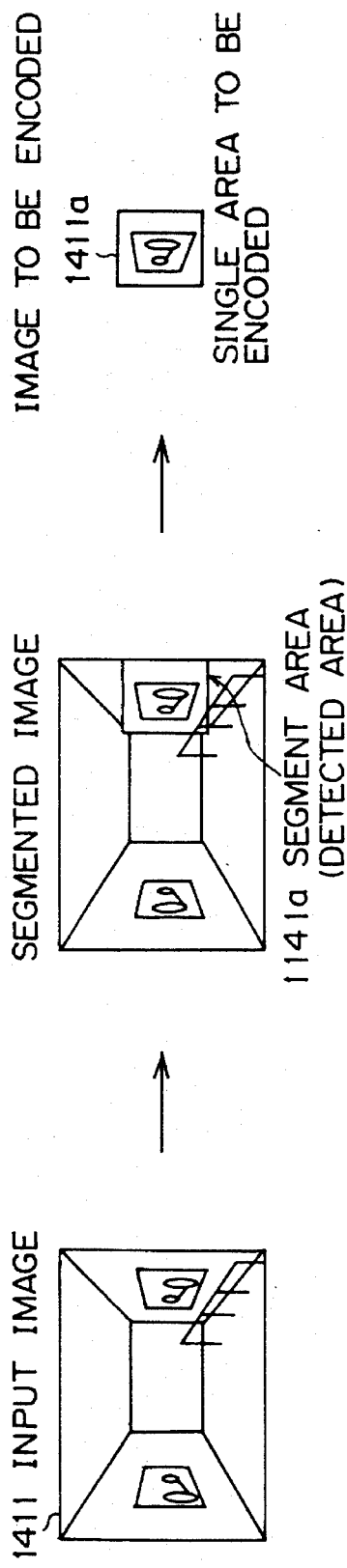
Figure 59B:
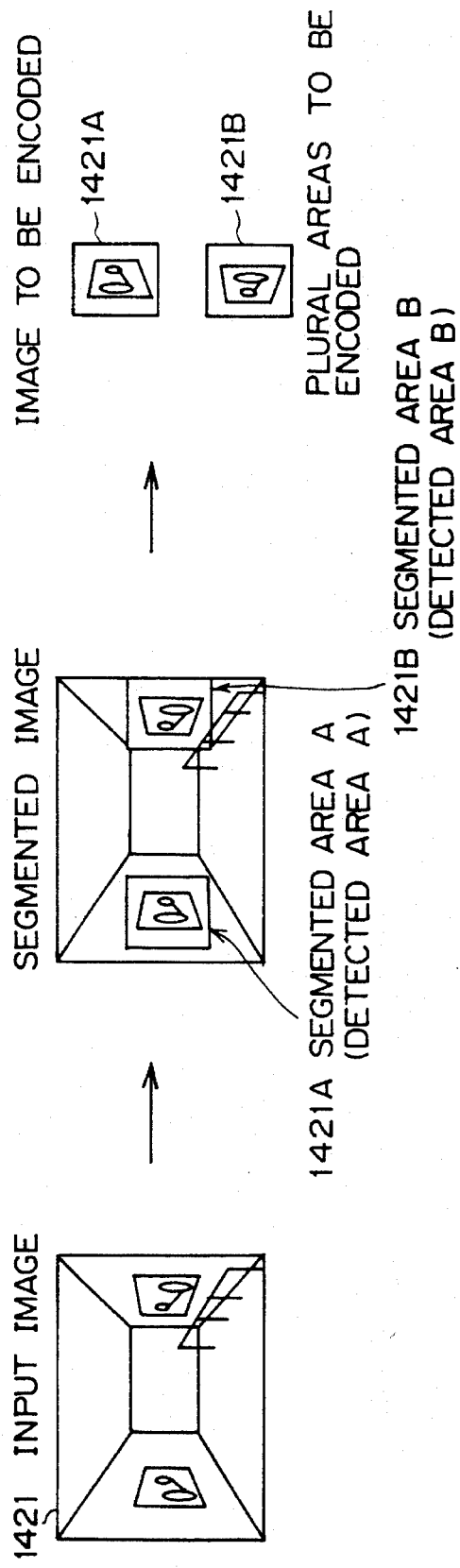

Then, a detection area in which a change of scenes (a change of images) should be detected in image data in a frame is set (S502). A detection area can be either a single area or a plurality of areas. FIG. 59 shows an example. In FIGS. 59A and 59D, a single area is specified, while a plurality of areas (segmented areas A and B) are specified in FIGS. 59B and 59C.

Then, a condition (detection condition) for extracting (detecting) a change of scenes at the detection area is set (S503). The extraction condition refers to an absolute value of a code amount difference (the sum of the absolute values of code amount differences if there are a plurality of detection areas) or a standard value (a threshold) of a rate of difference in the amount of codes (an average rate of code amount difference if there are a plurality of detection areas).

Next, it is determined whether or not the encoding process has been performed on the image data in all frames (S504). If not ("No" in S504), the image data in the next frame are entered and the image data in all the specified detection areas are segmented in the image data (S505).

Then, the image data in all the segmented detection areas are encoded (S506), and obtained is scale information for detecting a scene-changed frame such as an absolute value of the difference or a rate of difference in the amount of codes in encoded data in the corresponding detection areas between the previous and the present frames. At this time, if a plurality of detection areas are specified, the sum of absolute values of code amount differences or an average rate of code amount difference in the plurality of areas is obtained (S347).

Then, the absolute value of the difference in the amount of codes (or the sum of the absolute values of the differences in the amount of codes) or the rate of difference in the amount of codes (or an average rate of difference in the amount of codes) is compared with the extraction condition (standard value) to determine whether or not a change of scenes has arisen in the detection area in the present frame (S508). It is determined that a change of scenes has arisen if the absolute value of the difference in the amount of codes (or the sum of the absolute values of the differences in the amount of codes) or the rate of difference in the amount of codes (or an average rate of difference in the amount of codes) is larger than the value of the extraction condition.

If a change of scenes has been detected ("Yes" in S508), then a scene change detection signal (for example, a COS code) is outputted (S509), and the amounts of codes of all the detection areas in the present frame are stored (S510). The amounts of codes are used as the amount of codes of the detection areas in the present frame when the image data of the next frame are entered.

The processes in S504 through S510 are performed on the moving picture data in all frames until no framed image data are entered ("Yes" in S504).

In the above described method, only the frames indicating changes of images (changes of scenes) at specific area(s) (a single area or a plurality of areas) can be extracted (detected) from a series of images taken by, for example, the camera of a monitor device.

In the flowchart shown in FIG. 50, the process in S10 can be performed immediately after the process in S506.

Figure 52:
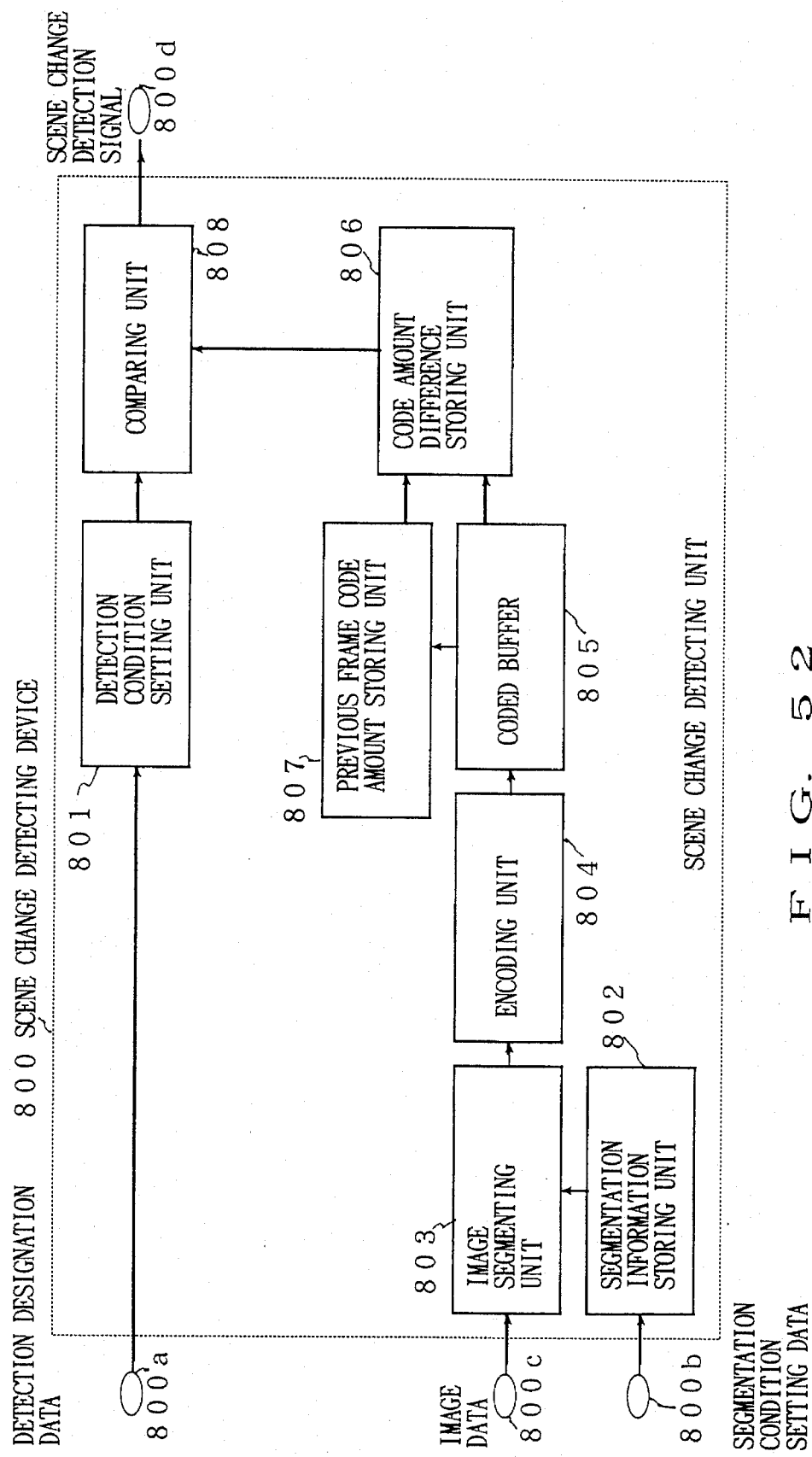
FIG. 52 is the block diagram showing the scene change detecting device according to the 15th embodiment of the present invention.

Then, FIG. 52 is the block diagram showing the circuit configuration of a scene change detecting device 800 as the 15th embodiment of the present invention for detecting only scene-changed frames indicating a change of scenes in only specific areas according to the scene change detecting method.

In FIG. 52, a detection condition setting unit 801 sets and stores the detection condition (a standard value of the sum of the absolute values of the differences in the amount of codes) specified according to the detection designation data applied through input terminal 800a. The standard value is determined depending on the number of segmented areas. If a single area is segmented, the standard value refers to an absolute value of the difference in the amount of codes in the area.

A segmentation information storing unit 802 sets and stores segmentation information (information designating a segmented area) designated according to segmentation condition setting data applied through input terminal 800b.

An image segmenting unit 803 segments image data in all the areas (a single area or a plurality of areas) designated according to the segmentation information stored in the segmentation information storing unit 802 from image data in each frame which contains moving picture data and is sequentially applied through input terminal 800c, and then outputs the image data to an encoding unit 804.

The encoding unit 804 has the circuit shown in FIG. 23, and sequentially encodes through, for example, the ADCT, the image data in all the segmented areas, and stores in a code buffer 805 the encoded data obtained by the encoding process.

The code buffer 805 calculates the amount of codes in the encoded data and provides the result for a code amount difference storing unit 806 after the encoding process has been performed on the data in all the segmented areas in the present frame.

A previous frame code amount storing unit 807 receives and stores the amount of codes in all the segmented areas in the previous frame after being calculated by the code buffer 805, and then provides the amount of codes for the code amount difference storing unit 807.

On receiving from the code buffer 805 the amount of codes in all the segmented areas in the present frame, the code amount difference storing unit 806 calculates for each segmented area the difference in the amount of codes between a segmented area in the present frame and the corresponding area in the previous frame, whose code amount information is provided by the previous frame code amount storing unit 807. Then, the unit obtains the sum of the absolute values of the differences, and notifies a comparing unit 808 of the sum of the absolute values of the differences.

The comparing unit 808 compares the sum of the absolute values of the code amount differences in a segmented area between the present and previous frames with the standard value of the code amount difference to check whether or not a change of scenes has arisen in the designated segmented area. It is determined that a change of scenes has arisen if the sum of the absolute values of the differences in the amount of codes in all the segmented areas between the present and previous frames (in this case, there can be a single absolute value of the difference in the amount of codes) is larger than a standard value of the code amount difference. When a change of scenes has been detected, a scene change detection signal is externally outputted through output terminal 800d.

When the code amount difference storing unit 806 has calculated the difference in the amount of codes, the code buffer 805 outputs to the previous frame code amount storing unit 807 the stored amount of codes. The previous frame code amount storing unit 807 receives and stores the amount of codes. The amount of codes is used as the amount of codes in the segmented area in the previous frame when the next frame is inputted.

According to the above described embodiment, a plurality of segmented area can be set by the detection condition setting unit 801. However, a single area can also be segmented.

In this case, the image segmenting unit 803 segments image data in a single segmented area among the image data entered in frames. Only the segmented data are encoded by the encoding unit 804. The encoded data are stored in the code buffer 805, and the code buffer 805 calculates the amount of codes in the stored encoded data, and provides the amount for tile code amount difference storing unit 806.

The code amount difference storing unit 806 calculates the absolute value of the difference in the amount of codes in the segmented area between the present and previous frames, and provides the result for the comparing unit 808.

The comparing unit 808 compares the absolute value of the difference with the standard value of the code amount difference notified by the detection condition setting unit 801, determines according to the comparison result whether or not a change of images (scenes) has been detected in the segmented area, and outputs a scene change signal through output terminal 800d if the absolute value of the difference is larger than the standard value of the code amount difference.

A plurality of segmented areas can be separately searched for a change of images (scenes) by using a plurality of scene change detecting devices 800 for detecting a change of images (scenes) in a single segmented area. That is, according to the method showing an example of a detecting process, a parallel process enables a change of images (scenes) to be detected in each of n segmented areas 830 in inputted image data 820.

The scene change detecting device 800 detects a change of scenes in a specific area in a frame according to the difference in the amount of codes. By contrast, a scene change detecting device 900 according to the 16th embodiment of the present invention detects a change of scenes in a specific area in a frame according to the rate of difference in the amount of codes.

Figure 53:
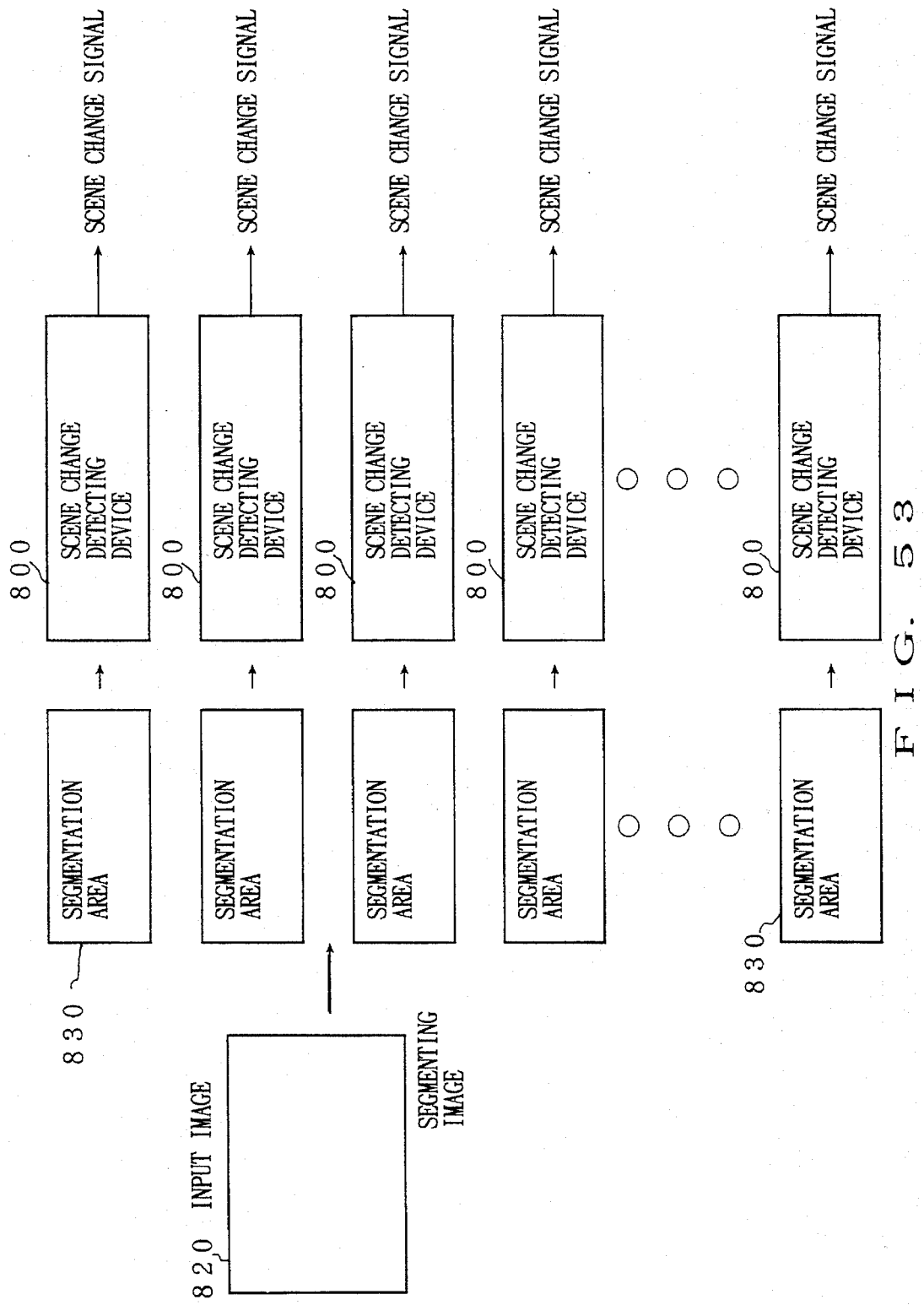
FIG. 53 shows an example of an application of the scene change detecting device according to the 15th embodiment.
Figure 54:
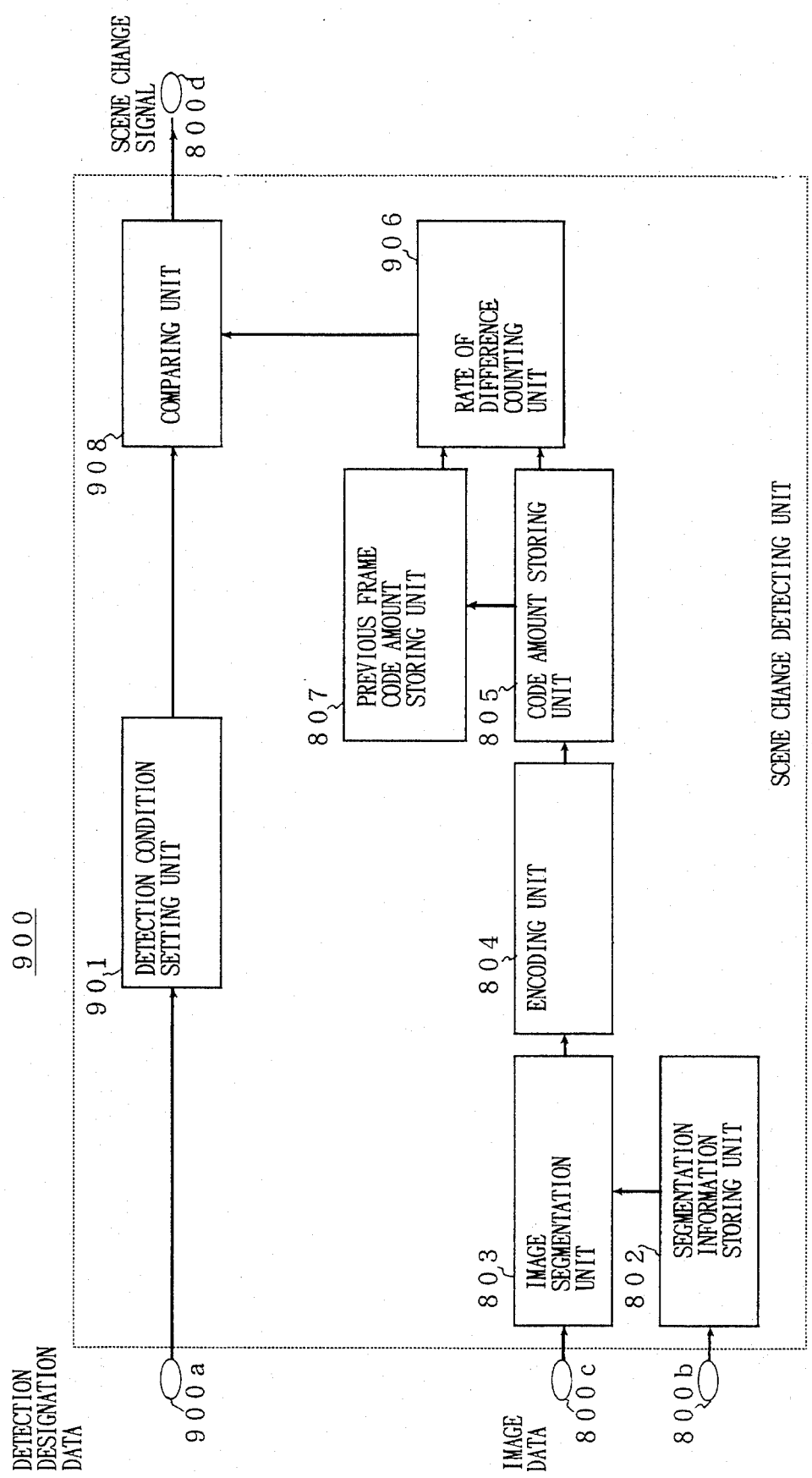
FIG. 54 is the block diagram showing the scene change detecting device according to the 16th embodiment of the present invention.
Figure 56:
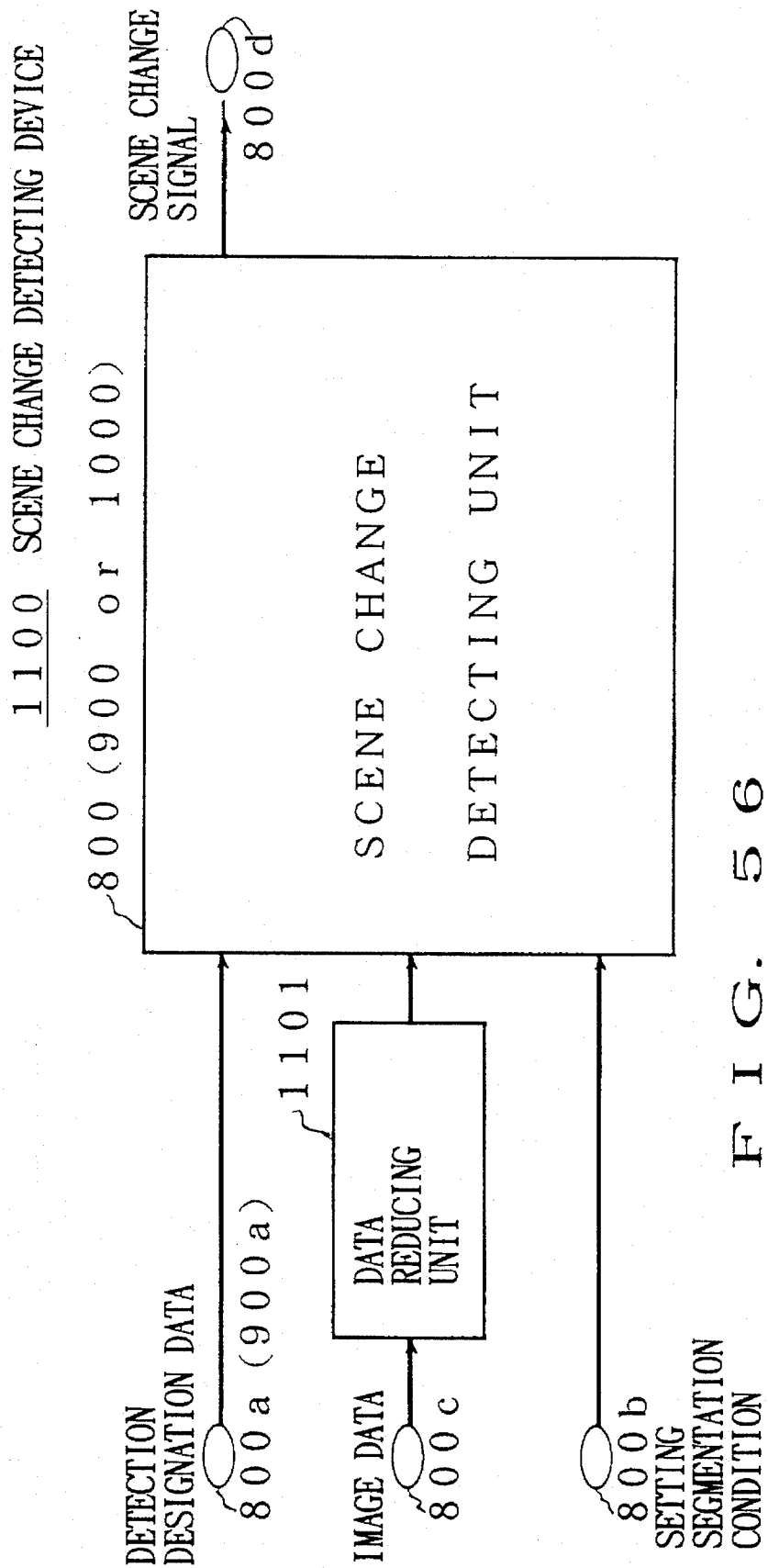
FIG. 56 is the block diagram showing the scene change detecting device according to the 18th embodiment of the present invention.

FIG. 54 is the block diagram showing the circuit of the scene change detecting device 900. In FIG. 54, a block identical to one shown in FIG. 53 is assigned the same number and symbol, and the detailed explanation is not repeated here.

In FIG. 54, a detection condition setting unit 901 sets a standard value of the rate of difference in the amount of codes used when a change of scenes is detected in a specified segmented area designated according to the detection designation data received through input terminal 900a, and notifies the comparing unit 908 of the standard value.

A rate-of-difference counting unit 906 calculates a rate of difference in the amount of codes between the present and previous frames according to the amount of codes in the segmented areas in the present and previous frames notified by the code amount storing unit 805 and the previous code amount storing unit 807, and then provides the resultant rate of difference for the comparing unit 908.

The comparing unit 908 compares the notified code amount difference with the standard value of the code amount difference notified by the detection condition setting unit 901 to check whether or not a change of scenes has arisen in a specified segmented area. That is, if the notified rate of difference in the amount of codes is greater than the standard value, then it is determined that a change of scenes has been detected in the specified segmented area. If a change of scenes has been detected, a scene change detection signal is outputted through output terminal 800d.

The scene change detecting device 900 is applicable when there is a single segmented area. However, if a plurality of segment areas are specified, then the circuit of a scene change detecting unit 1000 is configured according to the 17th embodiment as shown in FIG. 55.

That is, in this case, the image segmenting unit 1003 segments a plurality of segmented areas of image data put in each frame applied through input terminal 1002c according to the segmentation information set in the segmentation information storing unit 1002. The encoding unit 1004 separately encodes data in each segmented area, and stores in the code amount storing unit 1005 the amount of encoded data. The code amount storing unit 1005 counts the amount of codes in each of the segmented areas according to the encoded data in each of the segmented areas, and notifies a rate-of-difference counting unit 1006 of each of the amounts of codes.

The rate-of-difference counting unit 1006 compares the amount of codes in each of the segmented areas in the present frame with the amount of codes in the corresponding area in the previous frame obtained by the previous frame code amount storing unit 1007, and calculates the rate of difference in the amount of codes for each of the segmented areas. Then, the counting unit notifies an average rate-of-difference counting unit 1009 of the rate of difference in the amount of codes in each of the segmented areas.

The average rate-of-difference counting unit 1009 counts an average rate of difference in the amount of codes in each of the segmented areas, and notifies the comparing unit 1008 of the average rate of difference.

The comparing unit 1008 compares the average rate of difference in the amount of codes with the standard value of the average rate of difference in the amount of codes, determines whether or not a change of scenes has arisen, and outputs a scene change detection signal through output terminal 800d when a change of scenes has been detected.

The scene change detecting device 800 (900 or 1000) detects a change of scenes by encoding input image data in a segmented area. At this time, the amount of data processed by the scene change detecting device 800 (900 or 1000) can be reduced by reducing the amount of input image data to be encoded. Thus, the circuit of the scene change detecting device 800 (900 or 1000) can be simplified, reduced in size, and improved in processing speed.

Figure 64:
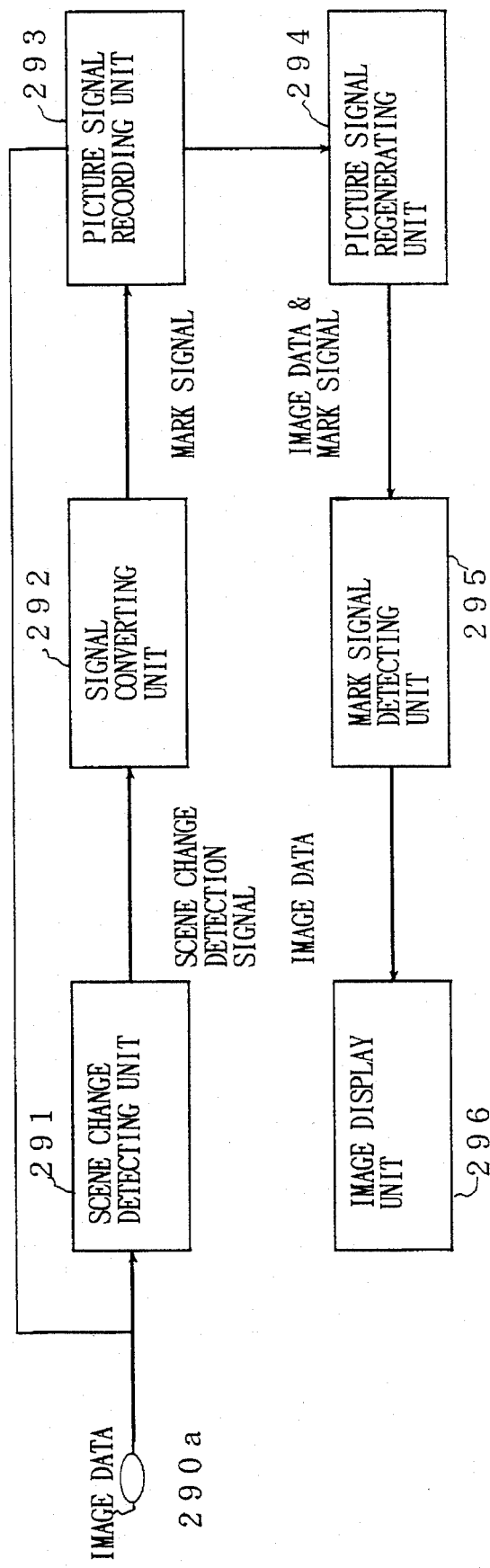
FIG. 64 is the block diagram showing the scene change detection display device according to the 20th embodiment of the present invention.

FIG. 64 is a block diagram showing the circuit of a scene change detecting device 1100 according to the 18th embodiment of the present invention. In FIG. 64, a data reducing unit 1101 reduces at a predetermined rate the amount of data applied through input terminal 800c, and applies them to the image data segmenting unit 803 of the scene change detecting unit in the scene change detecting device 800 (900 or 1000). The data reducing unit 1100 reduces image data according to the method shown in FIGS. 35, 36, 37, or 38.

Next, a practical example of the operation of each of the scene change detecting devices 800, 900, 1000, and 1100 is explained by referring to FIG. 57.

First, an input image 1201, that is, a scene in a museum, can be obtained through a camera as shown in FIG. 57A. For example, as shown in FIG. 57B, area 1201a containing a picture 1202 is segmented. Thus, as shown in FIG. 57C, the image of segmented area 1201a is the area to be encoded.

Figure 58:
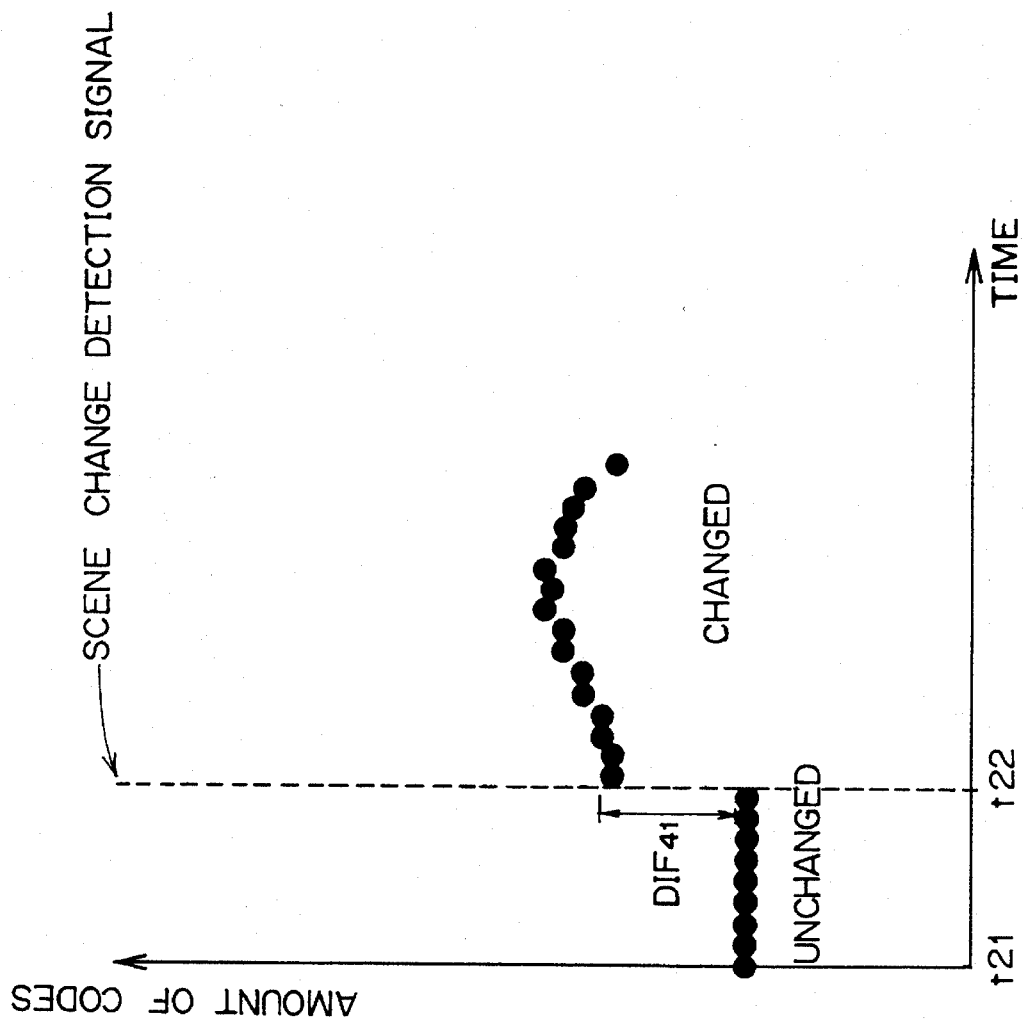
FIG. 58 shows the principle of detecting a change of scenes in a segmented area according to the difference in the amount of codes.

By setting segmented area 1201a as described above, a change of images (scenes) can be detected in segmented area 1201 in the input image 1201 obtained by the camera mounted in the museum. That is, the amount of codes in the image data of segmented area 1201a is constant during the period from t21 to t22 as shown in FIG. 58 if segmented area 1201a of the input image 1201 retains the same as shown in the left column of FIG. 57D. However, if a person 1203 comes near the picture 1202 immediately after the time T22, the image of segmented area 1201a changes as shown in the right column of FIG. 57D. According to the change of the image, the amount of codes in the image data in segmented area 1201a sharply changes as shown in FIG. 58 (the amount of codes increases by the value of $DIF_{41}$). Therefore, the change of images (scenes) of segmented area 1201a can be detected by setting to an appropriate value the standard value of the absolute value of the code amount difference or of the rate of difference in the amount of codes. That is, a scene change detection signal is outputted to inform of the change of scenes as soon as the person 1203 comes near the picture 1202.

Thus, the scene change detecting devices 800, 900, 1000, and 1100 automatically detect through a series of images taken by a camera, etc. the movement of an object and a human being at a specific location. Therefore, the scene change detecting device 800, 900, 1000, or 1100 can be applied to an automatic monitoring device, etc.

FIG. 59 shows an example of segmenting an image through the image segmenting unit 803 (or 1003) of the scene change detecting device 800, 900, 1000, or 1100.

FIG. 59A shows an example of specifying simple area 1411a of an input image 1411 as a segmented area. Accordingly, in this case, only the image data of segmented area 1411a are to be encoded, and a change of scenes can be detected by a single scene change detecting device 800, 900, 1000, or 1100.

Next, FIG. 59B shows an example of specifying a plurality of segmented areas for an input image 1421 (in this case, two areas 1421A and 1421B). In this example, each of the segmented areas (1421A and 1421B) are separately encoded. Then, each of them (1421A and 1421B) is separately searched for a change of images (scenes). Therefore, each of the segmented areas requires the scene change detecting devices 800, 900, 1000, and 1100. One of the scene detecting devices 800, 900, 1000, and 1100 can be used to perform a multiprocessing operation.

Then, FIG. 59C shows an example of segmenting a plurality of areas from an input image 1431 as in FIG. 59B (in this case, two segmented areas 1431A and 1431B). In encoding image data, the plural areas are processed as if they were a single area 1432, and are encoded collectively. Therefore, one of the scene change detecting devices 800, 900, 1000, and 1100 can sufficiently functions.

Furthermore, FIG. 59D shows an example of encoding masked and framed image data 1442, with the data other than those in segmented areas 1441a masked, (in this example, only one area 1441a is segmented) although the size of an image is the same as that of input image 1441.

The scene change detecting devices 800, 900, 1000, and 1100 can be applied to the scene change detecting unit 610 of the image data encoding device shown in FIG. 48. When the image data encoding device is designed as described above, a change of scenes (images) can be detected at a specific area in a frame, and encoded data 130 or 140 can be generated in the format shown in FIG. 24 or 25 with the frame in which the change of scenes has been detected recognized as a scene-changed frame.

The scene change detecting device 220, 230, 400, 450, 800, 900, 1000, or 1100 controls an image recording device, etc. according to the input of a scene change detection signal (extraction information on a change of scenes), thereby realizing a picture recording system responsive to the motions of images.

A scene change detection recording device for realizing such a picture recording system is explained below as the 19th embodiment of the present invention.

Figure 60:
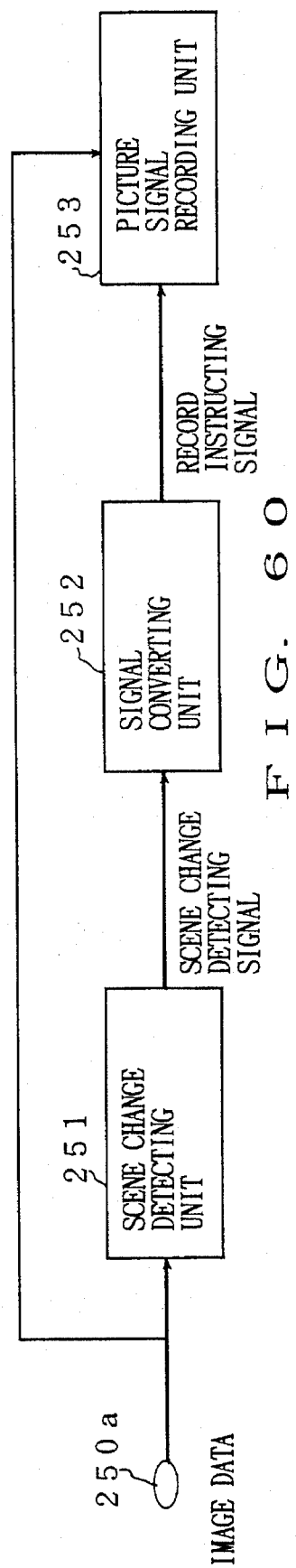
FIG. 60 is the block diagram showing the scene detecting and recording device according to the 19th embodiment of the present invention.

FIG. 60 is a block diagram showing the scene change detection recording device.

In FIG. 60, image data are entered through input terminal 250a. A scene change detecting unit 251 detects a change of scenes according to the input image data, and outputs a scene change detection signal to a signal converting unit 252. The signal converting unit 252 converts the scene change detection signal to a record (image record) instruction signal for the picture recording device, and outputs it to a picture signal recording unit 253. The picture signal recording unit 253 records image data entered through the above described input terminal 250a to a predetermined storage medium according to the record (image record) instruction signal.

The scene detecting unit 251 can be the scene change detecting device 220, 230, 400, 450, 800, 900, 1000, or 1100, and the operation of the scene detecting unit is described above. The picture signal recording unit 253 is, for example, a video tape recorder connected to a television device, and operates similarly. However, the video tape recorder should comprise an input terminal through which a record (image record) instruction signal is received from the signal converting unit 252, and record image data according to the record instruction signal.

Figure 61:
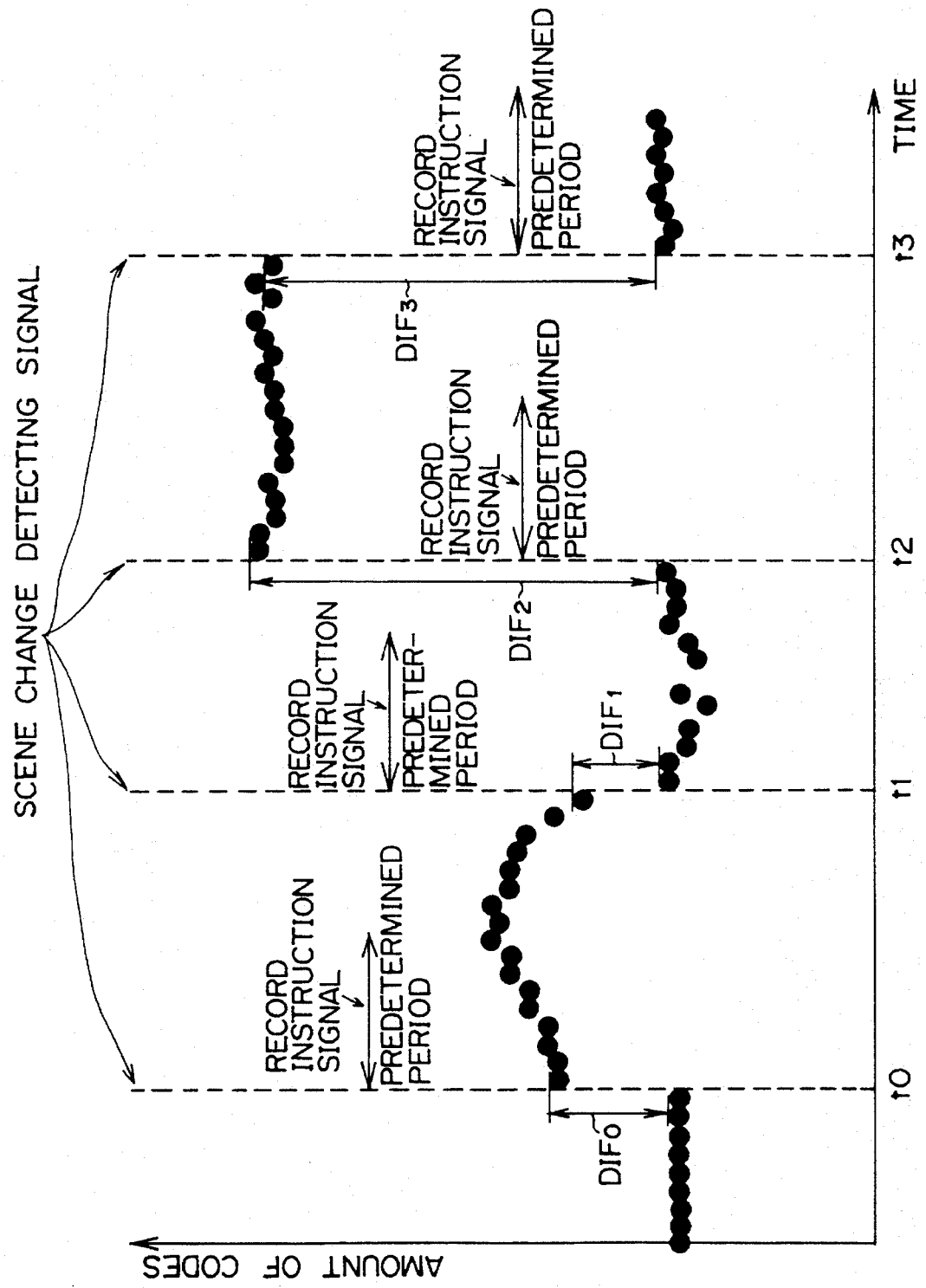
FIG. 61 shows the correlation (1) between the amount of codes and a record instruction signal.
Figure 62:
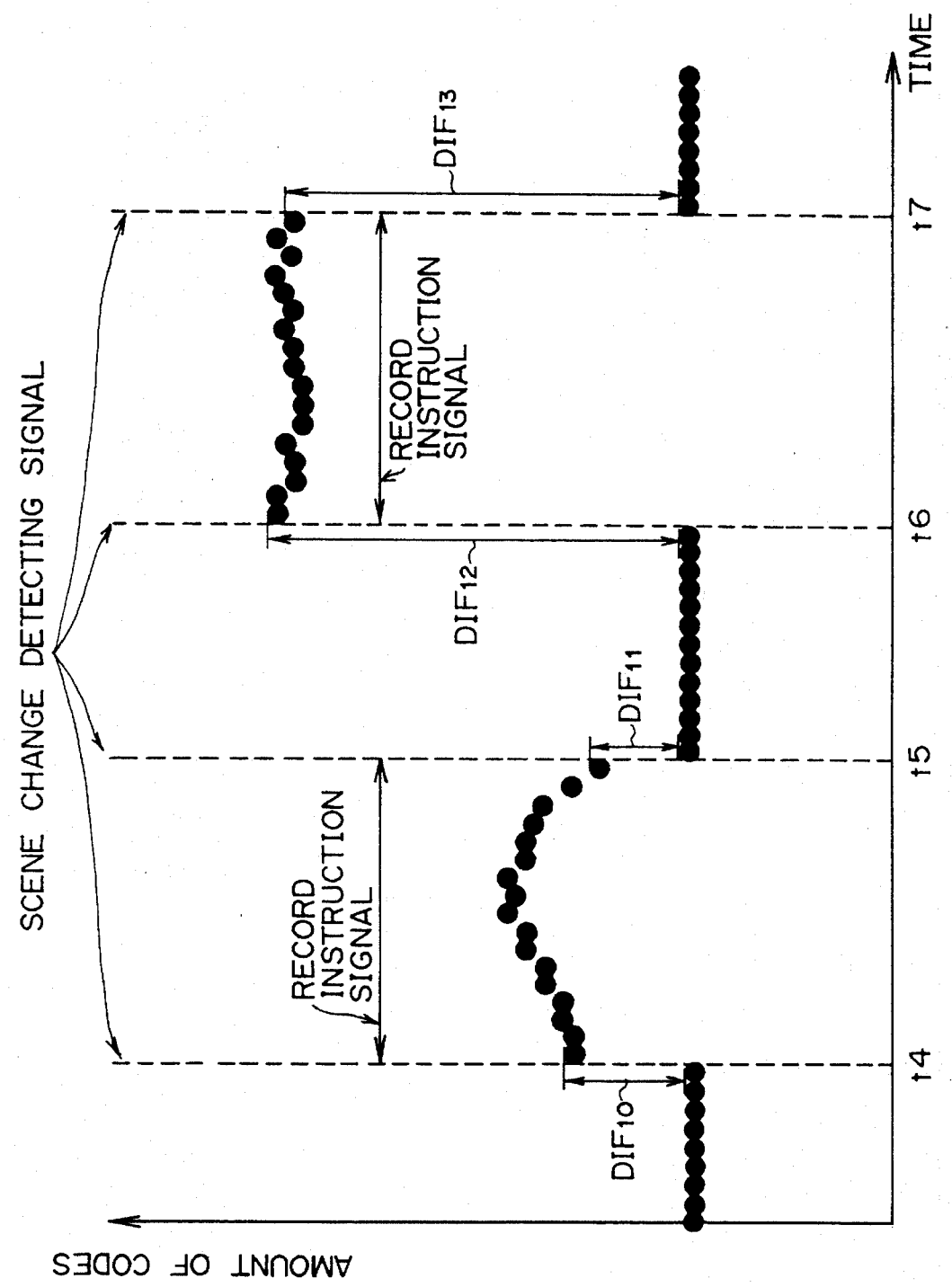
FIG. 62 shows the correlation (2) between the amount of codes and a record instruction signal.
Figure 63:
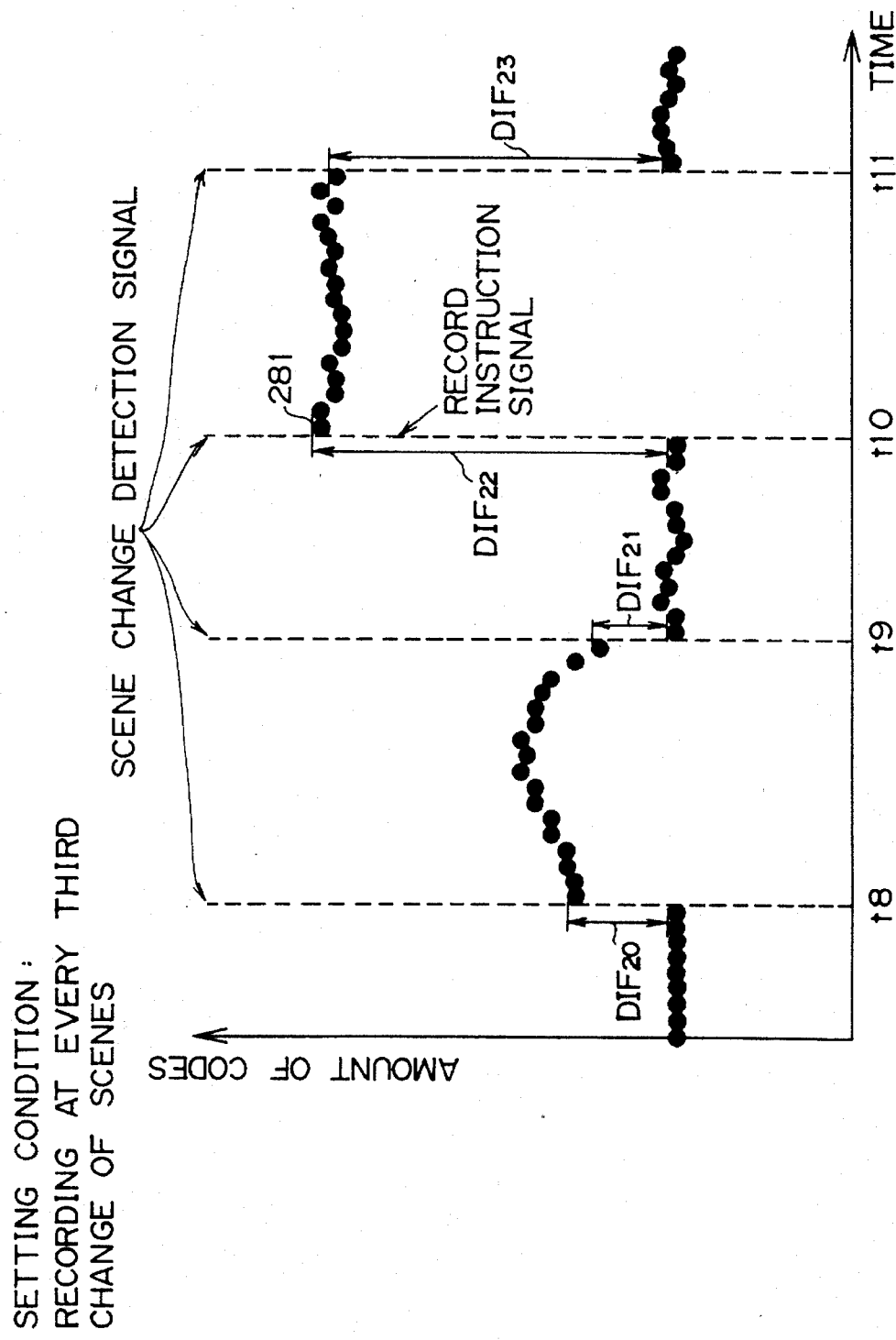
FIG. 63 shows the correlation (3) between the amount of codes and a record instruction signal.

There are various methods of recording images using the picture signal recording unit 253 (for example, a video tape recorder) operated according to a record instruction signal outputted by the signal converting unit 252. FIGS. 61 through 63 show three examples of such image recording methods. In Figures 61 through 63, the vertical axis indicates the amount of codes in animation data in each frame, while the horizontal axis indicates the time at which image data in each frame are entered.

In FIG. 61, the scene change detecting unit 251 detects a difference $DIF_0$, $DIF_1$, $DIF_2$, or $DIF_3$ larger than a standard value of a predetermined code amount difference or a rate of difference in the amount of codes at respective time t0, t1, t2, and t3. That is, the unit detects a change of scenes, and outputs a scene change detection signal at time t0, t1, t2, and t3 respectively. The signal converting unit 252 continues outputting a record instruction signal to the picture signal recording unit 253 during a predetermined time period each time the scene change detection signal is entered. The picture signal recording unit 253 records image data entered through input terminal 250a while a scene change detection signal is entered. Thus, animation after a change of scenes is recorded for a predetermined time including the screen (frame) indicating the change of scenes each time a scene changes.

In FIG. 62, the scene change detecting unit 251 detects a difference $DIF_{10}$, $DIF_{11}$, $DIF_{12}$, or $DIF_{13}$ larger than a standard value of a predetermined code amount difference or a rate of difference in the amount of codes at respective time t4, t5, t6, and t7, and outputs to the signal converting unit 252 a scene change detection signal at time t4, t5, t6, and t7 respectively. In this example, the signal converting unit 252 continues outputting an image data record instruction signal to the picture signal recording unit 253 during the period from t4 at which a scene change detection signal is entered to t5 at which the scene change detection signal is entered next. Then, if the scene change detection signal is entered again at t6 after the signal converting unit 252 has stopped outputting the record instruction signal at t5, then the signal converting unit 252 continues outputting the record instruction signal to the picture signal recording unit 253 until the scene change detection signal is entered again at t7. Thus, in the second example, if a series of animation including the scene (frame) indicating a change of scenes is recorded until the next change of scenes, then the frames including and after the next change of scenes are not recorded. Therefore, when a change of frames has arisen, animation between changes of scenes is recorded at every second scene change detection signal.

Furthermore, in FIG. 63, the scene change detecting unit 251 detects a difference $DIF_{20}$, $DIF_{21}$, $DIF_{22}$, or $DIF_{23}$ larger than a standard value of a predetermined code amount difference or a rate of difference in the amount of codes at respective time t8, t9, t10, and t11, and outputs to the signal converting unit 252 a scene change detection signal at time t8, t9, t10, and t11 respectively. In the third example, the signal converting unit 252 counts the number of inputs of a scene change detection signal, and outputs a record instruction signal to the picture signal recording unit 253 during a predetermined period each time the count value indicates "3", that is, at every third time the scene change detection signal is entered. Thus, in the example shown in FIG. 63, only the image (frame) having the amount of codes 281 is recorded at t10.

As described above, an image indicating a change of scenes can be recorded in various methods according to the scene change detection signal outputted by the scene change detecting unit 251.

Accordingly, the behavior of a strange person can be recorded by a camera of a monitor device during a predetermined period from the moment he or she has appeared by using the scene change detecting device 800, 900, 1000, or 1100 shown in FIG. 52, 54, 55, or 56 as the scene detecting unit 251. This offers an outstanding effect to monitoring services. The similar effect can be obtained by applying each of the scene change detecting devices 220, 230, 400, and 450 as the scene change detecting unit 251.

Only a frame indicating a change of scenes can be regenerated and displayed by recording scene change extraction information (a scene change detection signal) together with picture information. This is explained below as the 20th embodiment.

FIG. 64 is a block diagram showing the configuration of the scene change detecting and displaying device for regenerating images as described above.

In FIG. 64, image data are entered through input terminal 290a. A scene change detecting unit 291 detects a change of scenes according to the input image data and outputs a detection signal (a scene change detection signal). The scene change detecting unit 291 has a similar configuration to the of the scene change detecting unit 251 shown in FIG. 60.

A signal converting unit 292 converts a scene change detection signal to a mark signal for a picture recording device and outputs it.

On receiving the mark signal from the signal converting unit 292, a picture signal regenerating unit 294 adds the mark signal to the image data entered through input terminal 290a and records them to a predetermined storage medium.

The picture signal regenerating unit 294 sequentially reads picture signals recorded into the predetermined storage medium in a picture signal recording unit 293, and regenerates image data.

A mark signal detecting unit 295 extracts the image data provided with a mark signal from the image data regenerated by the picture signal regenerating unit 294 and outputs them.

An image display unit 296 receives only the image data provided with a mark signal from the mark signal detecting unit 295, and displays the image data.

Figure 65:
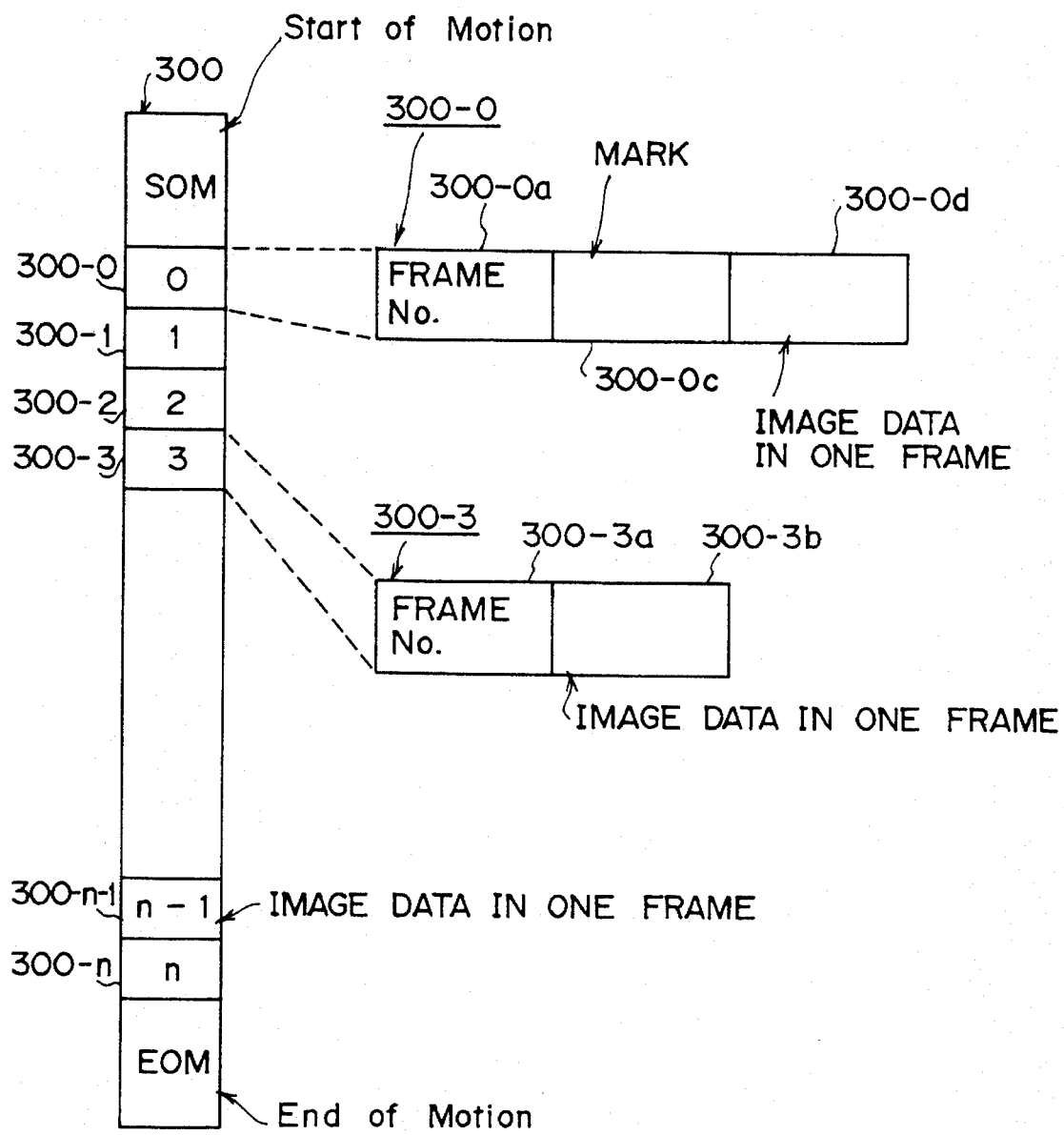
FIG. 65 shows the configuration of a picture signal for image data.

FIG. 65 shows the configuration of the picture signal recorded in the picture signal recording unit 293 and regenerated by the picture signal regenerating unit 294.

A picture signals 300 in total shown in FIG. 65 indicate a sequence (a series of frame image data) of animation. The picture signals 300 are, as with encoded data groups 130 and 140, provided with an SOM signal as a header and a trailing EOM signal. Between the SOM signal and the EOM signal, picture signal area 300-0, 300-1, 300-2, 300-3, . . . , 300-n-1, or 300-n is provided for storing image data in each frame. In each picture signal area 300-i (i=0, 1, 2, 3, . . . , n-1, n), only a frame number 300-ia and image data 300-ib of the frame are stored (refer to picture signal area 300-3 in FIG. 65) if no change of scenes have been detected. On the other hand, if a change of scenes has been detected, a frame indicating a change of scenes stores, in addition to frame number 300-ia and the image data 300-ib of the frame, mark signal 300-ic between the above described data (refer to picture signal area 300-0 in FIG. 65).

On receiving the picture signal 300 having the above described configuration, the mark signal detecting unit 295 reads data sequentially from picture signal area 300-0, detects a scene-changed frame depending on the existence of mark signal 300-ic, and outputs only the image data in the scene-changed frame on the image display unit 296. Thus, the image display unit 296 displays only scene-changed frames.

As a result, images are automatically extracted and displayed only when a strange person has appeared in picture signals taken by a camera of a monitor device by applying the scene change detecting device 800, 900, 1000, or 1100 shown in FIG. 52, 54, 55, or 56 as the scene change detecting unit 291. This realizes an each monitoring service. A similar effect can be obtained by applying any of the scene change detecting devices 220, 230, 400, and 450 as the scene change detecting device 291.

In the embodiment above, only a frame indicating a change of scenes can be regenerated and displayed. It is also possible to, while regenerating at a high speed all the recorded images, regenerate and display only frames indicating a change of scenes by stopping it for a predetermined period. This is explained below as the 21th embodiment.

Figure 66:
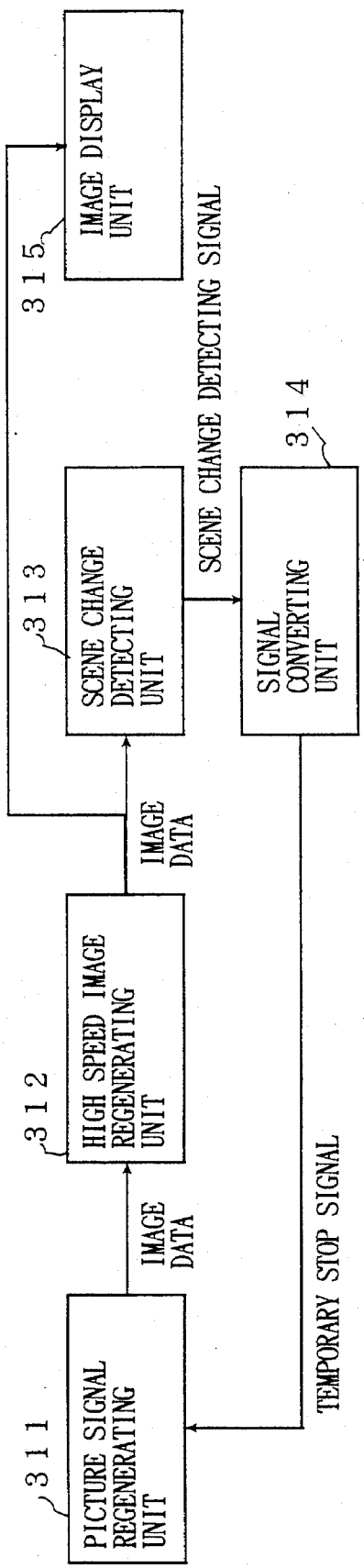
FIG. 66 is the block diagram showing the scene change detection display device according to the 21th embodiment of the present invention.

FIG. 66 is a block diagram showing the configuration of the scene change detecting and displaying device for stopping and displaying for a predetermined period only a frame indicating a change of scenes while regenerating images at a high speed.

In FIG. 66, a picture signal regenerating unit 311 regenerates a picture signal recorded in a predetermined recording medium to image data.

A high-speed image regenerating unit 312 extracts and regenerates at a high speed the regenerated image data with some of the images extracted at a predetermined rate.

A image display unit 315 displays the image data generated and extracted at a high speed by the high-speed image generating unit 312.

A scene change detecting unit 313 detects a change of scenes in animation data extracted and regenerated at a high speed by the high-speed image regenerating unit 312, and outputs a scene change detection signal when a change of scenes has been detected. The scene change detecting unit 313 has the configuration similar to that of the scene change detecting unit 251 shown in FIG. 60.

A signal converting unit 314 converts the scene change detection signal applied from the scene change detecting unit 312 to a temporary stop signal and outputs it to a picture signal regenerating unit 310. The picture signal regenerating unit 310 temporarily stops a picture when it receives the temporary picture stop signal.

Figure 67:
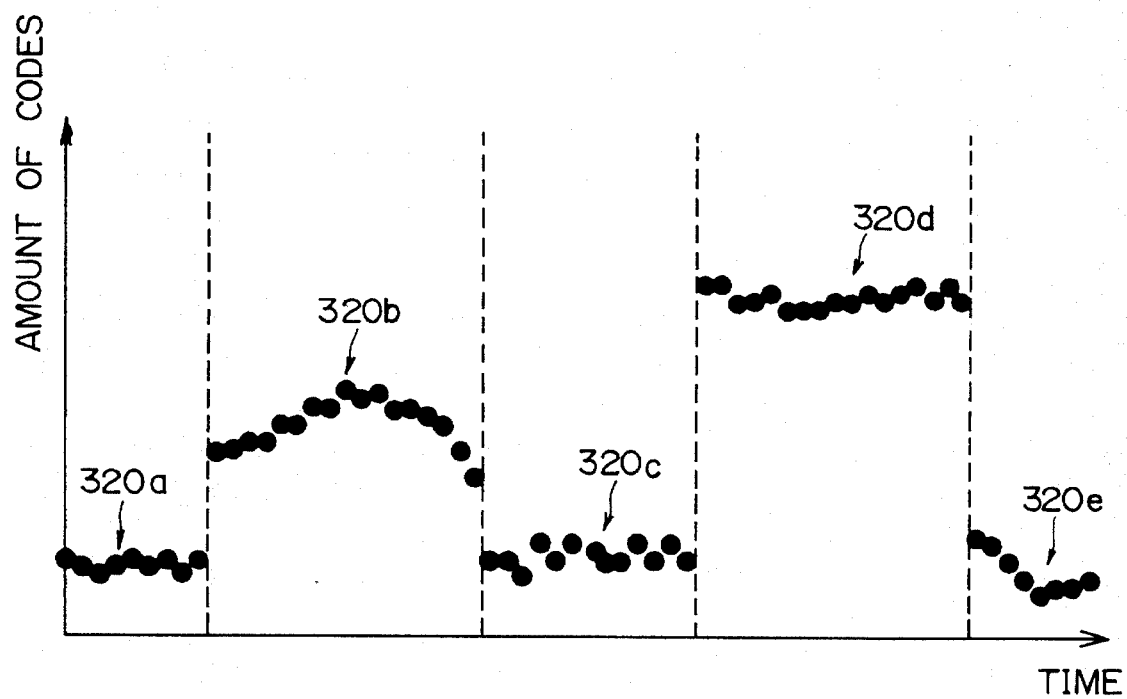
FIG. 67 shows the difference in the amount of codes.
Figures 68A, 68B:
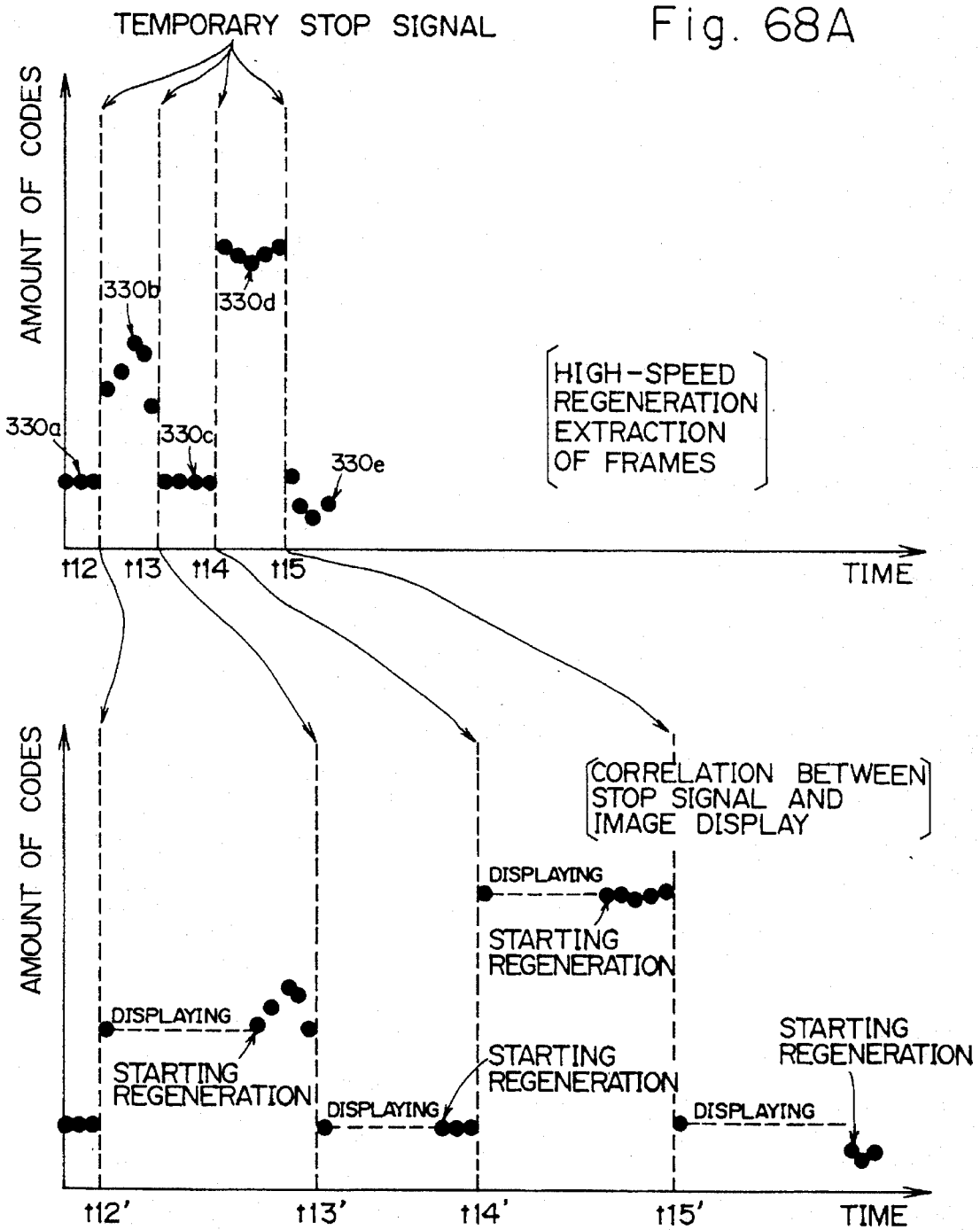
FIGS. 68A and 68B show the correlation between the amount of codes and a temporary stop signal.

The operation of the scene change detecting and displaying device having the above described configuration is explained by referring to FIGS. 67, 68A, and 68B.

FIG. 67 shows an example of a difference in the amount of codes in each frame when image data regenerated by the picture signal regenerating unit 311 (the image data before being extracted) are encoded by an encoding unit (not shown in FIG. 67) in the scene change detecting unit 313. If the image data are extracted and regenerated at a high speed by the high-speed image regenerating unit 312 (by extracting every fourth picture element) and entered in the scene change detecting unit 313, then the amount of codes in the rapidly regenerated image data encoded by an encoding unit in the scene change detecting unit 313 is shown in FIG. 68A. In FIGS. 68A and 68B, the vertical axis indicates the amount of codes in image data, while the horizontal axis indicates time.

In the examples shown in FIGS. 67 and 68, a regenerating process is performed at a high speed such that scene 330a comprising 3 frames shown in FIG. 68A is extracted from a series of scenes 320a comprising 9 frames shown in FIG. 67. Likewise, scenes 330b comprising 5 frames, 330c comprising 4 frames, 330d comprising 5 frames, and 330e comprising 4 frames are regenerated at a high speed as shown in FIG. 68A respectively from a series of scenes 320b comprising 17 frames, 320c comprising 13 frames, 320d comprising 17 frames, and 320e comprising 13 frames (a part of them are not shown exactly) as shown in FIG. 67.

When the scene change detecting unit 313 encodes image data regenerated by the high-speed image generating unit 312 at a high speed, and obtains the amount of codes shown in FIG. 68A, it detects the code amount difference greater than the standard value of a predetermined code amount difference or a rate of difference in the amount of codes at time t12, t13, t14, and t15, and outputs a scene change detection signal to the signal converting unit 314 at time t12, t13, t14, and t15. The signal converting unit 314 outputs a temporary stop signal to the picture signal regenerating unit 311 each time a scene change detection signal is entered.

The picture signal regenerating unit 311 stops regenerating a picture signal for a predetermined period each time a temporary stop signal is entered. Thus, the image display unit 315 continues displaying an image indicating a change of scenes during a predetermined period each time a change of scenes has been detected as shown in FIG. 68B. Then, after the predetermined period, the high-speed image regenerating unit 312 resumes the high-speed regeneration. Therefore, the image display unit 315 starts the high-speed display with some frames extracted at a predetermined rate. Thus, a frame indicating a change of scenes can be stopped and displayed at a predetermined period each time a change of scenes has been detected during the high-speed regeneration.

Therefore, a picture indicating a strange person can be immediately detected in record data of picture signals of a camera of a monitor device and the detected picture can be closely checked by applying, for example, the scene change detecting device 800, 900, 1000, or 1100 shown in FIGS. 52, 53, 55, or 56 as the scene change detecting unit 313. A similar effect can be obtained by applying any of the scene change detecting devices 220, 230, 400, and 450.

As describe above, the present invention has the following advantageous effects.

1. Only a frame indicating a change of scenes can be automatically extracted from animation data.

2. Animation data in each frame can be encoded in a format in which scene-changed frames can be easily recognized from normal frames (scene-unchanged frames) by a reconstructing unit.

3. Animation data in frames each indicating a change of frames can be automatically extracted from encoded animation data by an encoding unit, operated according to the JPEG method, for a general purpose static image. The reconstructed image in a scene-changed frame can be displayed in a predetermined format.

4. Data in scene-changed frames can be automatically extracted from animation data, and each image corresponding to each change of scenes can be recorded in various methods.

5. Animation data in scene-changed frames can be automatically extracted from animation data and then displayed.

6. Only a scene-changed frame can be stopped and displayed at a predetermined period while animation images are regenerated at a high speed.

7. A change of images in a specific area in a frame can be automatically detected. Therefore, a change in a specific portion of a picture can be automatically detected. Accordingly, the present invention can be applied to an automatic monitor device, etc.

8. Since only a scene-changed frame in a picture (including a frame indicating a change of scenes in a specific area) can be recorded, a series of pictures can be recorded for a long time.

9. In a device having the effects listed in 1 through 8 above, changes of scenes in a series of animation data can be automatically extracted by using an encoding unit for static images according to, for example, the JPEG method, etc. Therefore, a device having the above listed effects 1 through 8 can be realized by a small circuit.

What is claimed is:

1. An image data encoding method for encoding image data comprising:

a detection condition storing step of storing a detection condition set for detecting a scene-changed frame;

an encoding step of encoding image data of an input frame;

a code amount storing step of storing the amount of codes in the data, encoded in said encoding step, of previous and present frames;

a determining step of determining whether or not the present frame is a scene-changed frame according to the amount of codes of the previous and present frames stored in said code amount storing step 3 and to the condition set for detecting a scene-changed frame stored in said detection condition storing step;

and an output step for outputting, as a determination result of said determining step, said encoded data generated in the code amount storing step and a code indicating a scene-changed frame if the present frame is a scene-changed frame, and only the encoded data if the present frame is not a scene-changed frame, wherein said encoding step, said code amount storing step, said determining step, and said output step are performed on image data in a plurality of frames whose data are to be encoded.

2. The image data reconstructing method of reconstructing image data from encoded data obtained by the image data encoding method according to claim 1, comprising:

an identifying step of identifying a scene-changed frame among the encoded data; and a reconstructing step of reconstructing only the codes of the scene-changed frames identified by said identifying step.

3. An image data encoding device for encoding image data comprising:

frame encoding means for sequentially encoding image data in an input frame;

frame encoded data storing means for storing encoded data of frames whose data are encoded by said frame encoding step 8;

detection condition storing means for storing the condition set for detecting that a frame encoded by said frame encoding means is a scene-changed frame;

scene-changed frame detecting means for detecting a scene-changed frame according to the difference in the amount of codes between the encoded data in the previous frame stored in said frame code storing means and the data, encoded by said frame encoding means, in the present frame, and to the detection condition stored in said detection condition storing means; and output means for outputting encoded data stored in said frame code storing means and encoded data indicating a scene-changed frame for a scene-changed frame detected by said scene-changed frame detecting means, and outputting only the encoded data for a normal frame (scene-unchanged frame).

4. The image data encoding device according to claim 3, wherein said detection condition storing means stores as the detection condition of a scene-changed frame a standard value of the difference in the amount of codes between adjacent frames.

5. The image data encoding device according to claim 3, wherein said detection condition storing means stores as the detection condition of a scene-changed frame the standard value of the rate of difference in the amount of codes between adjacent frames.

6. The image data reconstructing device according to claim 3 for reconstructing image data from the data encoded by said image data encoding device according to claim 3, comprising:

scene-changed frame detecting means for extracting encoded data of a scene-changed frame from all encoded data;

encoded data reconstructing means for reconstructing image data from the encoded data of a scene-changed frame extracted by said scene-changed frame detecting means;

scene-changed frame image storing means for storing image data of a scene-changed frame reconstructed by said encoded data reconstructing means; and display instructing means for instructing a method of displaying image data in a scene-changed frame stored by said scene-changed frame image storing means.

7. The image data reconstructing means according to claim 6, wherein said display instructing means instructs such that scene-changed frames are displayed in sequence.

8. The image data reconstructing device according to claim 6, wherein said display instructing means instructs such that images of a plurality of scene-changed frames are reduced to be displayed on one screen.

9. An image data reconstructing device for reconstructing image data from moving picture data encoded by an image data encoding device, comprising:

frame encoded data storing means for storing encoded data of frames;

detection condition storing means for storing the condition set for detecting that the present frame is a scene-changed frame;

scene-changed frame detecting means for extracting encoded data of scene-changed frames from the encoded data according to the detection condition stored in said detection condition storing means and to the difference in the amount of codes, between adjacent frames, inputted from said frame encoded data storing means;

encoded data reconstructing means for reconstructing image data from encoded data of scene-changed frames extracted by said scene-changed frame detecting means;

scene-changed frame image storing means for storing image data of the scene-changed frames reconstructed by said encoded data reconstructing means; and display instructing means for instructing a method of displaying image data in a scene-changed frame stored by said scene-changed frame image storing means.

10. A scene change detecting method comprising:

a detection condition storing step of storing a detection condition set for detecting changes of scenes in moving picture data;

an encoding step of encoding image data in a frame;

a code amount storing step of storing the amount of codes, in a frame, encoded by the encoding step 24;

a scene change determining step of determining a change of scenes according to the amount of codes of the previous and present frames stored in said code amount storing step and to the detection condition stored in said detection condition storing step; and a change signal outputting step of outputting a scene change detection signal according to the determination result of said scene change determining step.

11. The scene change detecting method according to claim 10, wherein said encoding step reduces an original image and performs an encoding process on image data having the reduced amount of data.

12. A scene change detecting device comprising:

detection condition storing means for storing the condition set for detecting changes of scenes in moving picture data;

previous frame code amount storing means for storing the amount of codes in image data in the previous frame;

present frame code amount storing means for storing the amount of codes in image data in the present frame;

code difference storing means for obtaining a difference between the amount of codes in the previous frame stored in said previous frame code amount storing means and the amount of codes in the present frame stored in said present frame code amount storing means, and storing the difference; and scene change detecting means for detecting changes of scenes according to the difference in the amount of codes stored in said code difference storing means and to the detection condition stored in said detection condition storing means, and outputting a scene change detection signal when changes of scenes are detected.

13. A scene change recording device, comprising:

signal converting means for outputting a record instruction signal based on a scene change detection signal externally applied to indicate a scene-changed frame; and image signal storing means for recording image data according to the recording instruction signal applied from said signal converting means.

14. The scene change recording device according to claim 13, wherein said signal converting means consecutively outputs the record instruction signals within a predetermined period each time the scene change detection signal is inputted.

15. The scene change recording device according to claim 13, wherein the record instruction signal said signal converting means consecutively outputs during a predetermined period if the scene change signals are consecutively inputted for a predetermined number of times.

16. An image data encoding method comprising:

a scene change detection condition storing step of storing the condition set for detecting a change of scenes;

an area dividing step of dividing image data in an input frame to a plurality of small areas;

an encoding step of encoding the image data separately for each small area of the input frame obtained in said area dividing step;

a code amount storing step of calculating and storing the amount of codes of encoded data in each small area obtained in said encoding step;

a code amount difference calculating step for obtaining a predetermined difference in the amount of codes between the present frame and the previous frame in each small area according to the amount of codes of the present and previous frames in each small area stored in said code amount storing step;

a determining step for determining whether or not the present frame is a scene-changed frame according to the difference calculated in said code amount difference calculating step in the amount of codes in each small area between the present frame and the previous frame, and to the detection condition stored in said scene change detection condition storing step; and an outputting step of outputting data, encoded in said encoding step, of image data together with a code indicating that the present frame is a scene-changed frame if the present frame is determined to be a scene-changed frame in said determining step, and outputting only the data, encoded in said encoding step, of the image data if the present frame is determined not to be a scene-changed frame.

17. The image data encoding method according to claim 16, wherein a detection condition stored in said scene change detection condition storing step refers to a standard value of the sum of absolute values of the differences between the present and previous frames for all small areas;

said code amount difference calculating step obtains the difference in the amount of codes between the present and previous frames for each small area; and said determining step obtains the sum of absolute values of the differences in the amount of codes between the present and previous frames, and the sum can be compared with the standard value to detect a scene-changed frame.

18. The image data encoding method according to claim 16, wherein detection information stored in said scene change detection condition storing step refers to the standard value of the average rate of the amount of codes between the present and previous frames for each small area;

said code amount difference calculating step obtains the rate of the amount of codes between the present and previous frames for each small area; and said determining step can obtain the average change rate of difference in the amount of codes between the present and previous frames for each small area to detect a scene-changed frame by comparing the average rate of difference with the above described standard value.

19. The image data encoding method according to claim 16, wherein said area dividing step can divide an input frame to two small areas, that is, odd fields and even fields.

20. The image data encoding method according to claim 16, wherein said area dividing step can divide an input frame to small areas each indicating a color component when the input frame refers to colored image data.

21. The image data encoding method according to claim 16, wherein said area dividing step can equally divide an input frame to a plurality of blocks as small areas.

22. The image data encoding method according to claim 16, wherein said encoding step encodes image data in a small areas in parallel.

23. The image data reconstructing method according to claim 16 for reconstructing an original image from data encoded in the image data encoding method stated in claim 16, comprising:

a reconstructing step of reconstructing image data from said encoded data;

an identifying step of identifying said encoded data of scene-changed frames from said encoded data;

a displaying step of displaying only image data of scene-changed frames identified in said identifying step among image data in each frame reconstructed by said reconstructing step.

24. A scene change detecting device comprising:

detection condition setting means for storing the condition set for detecting a scene-changed frame;

small area dividing means for dividing image data in an input frame to a plurality of small areas;

encoding means for individually encoding image data in the plurality of small areas obtained by said small area dividing means;

previous frame small area code amount storing means for calculating and storing the amount of codes of data, encoded by said encoding means, in all small areas in the previous frame;

code amount difference calculating means for calculating the amount of codes of data, encoded by said encoding means, in all small areas in the present frame, and obtaining the difference in the amount of codes between the present and previous frames in each small area according to the obtained amount of codes in each of the small areas in the present frame and to the amount of codes in each of the small areas stored in said previous frame small area code amount storing means; and scene-changed frame detecting means for detecting a scene-changed frame according to the difference, calculated by said code amount difference calculating means, in the amount of codes between the present frame and the previous frame for all small areas, and to the detection condition stored by said detection condition setting means, and outputting a scene change detection signal indicating a scene-changed frame if a scene-changed frame has been detected.

25. The scene change detecting device according to claim 24, wherein said detection condition setting means stores as a detection condition a standard value of the sum of the absolute values of the differences in the amount of codes between the present frame and the previous frame for all small areas;

said code amount difference calculating means obtains the difference in the amount of codes between the present frame and the previous frame for each of the small areas; and said scene-changed frame detecting means obtains the sum of the absolute values of differences in the amount of codes between the present frame and the previous frame for all small areas, and detects a scene-changed frame by comparing the sum with the above described standard value.

26. The scene change detecting device according to claim 24, wherein said detection condition setting means stores as a detection condition a standard value of the average rate of difference in the amount of codes between the present frame and the previous frame;

said code amount difference calculating means obtains the rate of the difference in the amount of codes between the present frame and the previous frame for each of the small areas; and said scene-changed frame detecting means obtains the average rate of difference in the amount of codes between the present frame and the previous frame for small areas, and compares the average rate of difference with said standard value.

27. A scene change recording device receiving a scene change detection signal indicating a change between two frames obtained by calculating a code amount difference in encoded corresponding small areas of the two frames, comprising:

signal converting means for outputting a record instruction signal based on the scene change detection signal; and image signal storing means for recording image data according to the recording instruction signal applied from said signal converting means.

28. The scene change recording device according to claim 27, wherein said signal converting means consecutively outputs the record instruction signals within a predetermined period each time the scene change detection signal is inputted.

29. The scene change recording device according to claim 27, wherein said signal converting means consecutively outputs the record instruction signal during a period from a predetermined scene change detection signal to the next scene change detection signal.

30. The scene change recording device according to claim 27, wherein said signal converting means consecutively outputs the record instruction signal during a predetermined period if the scene change signals are consecutively inputted for a predetermined number of times.

31. A scene change recording/regenerating device, comprising:

mark signal converting means for converting a scene change detection signal externally applied to indicate a scene-changed frame to a mark signal indicating a change of scenes and for outputting the mark signal;

image recording means for, when recording image data, adding the mark signal outputted by said mark signal converting means to corresponding image data;

image regenerating means for regenerating the image data recorded by said image recording means;

image extracting means for extracting only the image data provided with a mark signal from the image data regenerated by said image data regenerating means; and image display means for displaying image data extracted by said image extracting means.

32. An image data encoding device comprising:

detection condition setting means for storing the condition set for detecting a scene-changed frame;

small area dividing means for dividing image data in an input frame to a plurality of small areas;

encoding means for individually encoding image data in the plurality of small areas obtained by said small area dividing means;

previous frame small area code amount storing means for calculating and storing an amount of codes of data, encoded by said encoding means, in all small areas in the previous frame;

code amount difference calculating means for calculating the amount of codes of data, encoded by said encoding means, in all the small areas in the present frame, and obtaining a difference in the amount of codes between the present and previous frames in each of the small areas according to the amount of codes in each of the small areas in the present frame and to the amount of codes in each of the small areas stored in said previous frame small area code amount storing means;

scene-changed frame detecting means for detecting a scene-changed frame according to the difference, calculated by said code amount difference calculating means, in the amount of codes between the present frame and the previous frame for all of the small areas, and according to the detection condition stored by said detection condition setting means, and for outputting a scene-changed detection signal when the scene-changed frame has been detected;

frame encoding means for encoding image data applied to said scene-changed frame detecting means; and data outputting means for outputting a code indicating the scene-changed frame together with the image data encoded by said encoding means, when the scene-changed frame is detected by said scene-changed frame detecting means, and for outputting only the data, encoded by said encoding means, of the image data if the scene-changed frame is not detected by said scene-changed frame detecting means.

33. The image data reconstructing device for reconstructing image data from the data encoded by said image data encoding device according to claim 32, comprising:

reconstructing means for reconstructing image data in each frame from said encoded data;

scene-changed frame detecting means for detecting encoded data in a scene-changed frame in said encoded data;

selecting means for selecting and outputting only image data of a scene-changed frame detected by said scene-changed frame detecting means in image data of each frame reconstructed by said reconstructing means;

image data storing means for storing image data of a scene-changed frame outputted by said selecting means;

display instructing means for instructing a method of displaying image data of a scene-changed frame stored in said image data storing means; and frame display control means for controlling according to the displaying method instructed by said display instructing means the display of image data of a scene-changed frame stored in said image data storing means.

34. An image data encoding device comprising:

detection condition setting means for storing the condition set for detecting a scene-changed frame;

small area dividing means for dividing image data in an input frame to a plurality of small areas;

encoding means for individually encoding image data in the plurality of small areas obtained by said small area dividing means;

previous frame small area code amount storing means for calculating and storing an amount of codes of data, encoded by said encoding means, in all small areas in the previous frame;

code amount difference calculating means for calculating the amount of codes of data, encoded by said encoding means, in all the small areas in the present frame, and obtaining a difference in the amount of codes between the present and previous frames in each of the small areas according to the amount of codes in each of the small areas in the present frame and to the amount of codes in each of the small areas stored in said previous frame small area code amount storing means;

scene-changed frame detecting means for detecting a scene-changed frame according to the difference, calculated by said code amount difference calculating means, in the amount of codes between the present frame and the previous frame for all of the small areas, and according to the detection condition stored by said detection condition setting means, and for outputting a scene-changed detection signal when the scene-changed frame has been detected;

frame encoding means for encoding image data applied to said scene-changed frame detecting means;

scene-changed frame storing means for storing identification information on a frame detected as the scene-changed frame by said scene-changed frame detecting means; and data outputting means for sequentially outputting image data encoded by said frame encoding means, and for outputting identification information on all scene-changed frames stored by said scene-changed frame storing means after all encoded data have been outputted.

35. A scene change detecting method for detecting a change of scenes in moving picture data, comprising:

a segmentation information storing step of storing segmentation information which indicates all areas to be extracted from image data in input frames;

a detection condition storing step of storing the condition set for detecting a scene-changed frame in which an image indicates the difference from that in the previous frame;

an image segmenting step of segmenting image data in all areas specified by segmentation information from among image data in input frames according to said segmentation information stored in said segmentation information storing step;

an encoding step of encoding image data in said all areas segmented in said image segmenting step;

a code amount storing step of storing the amount of codes of said data, encoded in said encoding step, in all areas segmented in the previous frame;

a code amount difference calculating step of calculating a predetermined difference between the amount of codes in the data encoded by said encoding step in all specified areas in the present frame and the amount of codes in the encoded data, stored in said code amount storing step, in the previous frame; and a scene change detecting step of determining whether or not there is a change of scenes between the present frame and the previous frame in a specified area according to the difference calculated in said code amount difference calculating step and to the detection condition stored in said detection condition storing step, and outputting a scene change signal if the determination indicates a scene-changed frame.

36. The scene change detecting method according to claim 35, wherein the detection condition stored in said detection condition storing step refers to a standard value of the sum of the absolute values of the difference in the amount of codes;

said code amount difference calculating step obtains the sum of the differences in the amount of codes between the present frame and the previous frame for all specified areas;

said scene change detecting step determines whether or not there is a change between the specified area of the present frame and that of the previous frame in a specified area by comparing the sum of the absolute values of the differences in the amount of codes calculated in said code amount difference calculating step with said standard value.

37. The scene change detecting method according to claim 35, wherein said image segmenting step segments image data of the specified area in reduced image data obtained by reducing original image data in a frame by a predetermined reducing method.

38. The scene change detecting method according to claim 35, wherein the detection condition stored in said detection condition storing step refers to a standard value of an average rate of difference in the amount of codes;

said code amount difference calculating step obtains said average rate of difference in the amount of codes between the present frame and the previous frame for all specified areas;

said scene change detecting step determines whether or not there is a change of scenes between the present frame and the previous frame in the specified area by comparing said average rate of difference in the amount of codes calculated in said code amount difference calculating step with said standard value.

39. The scene change detecting method according to claim 37, further comprising:

data reducing step for reducing image data of input frames by a predetermined method; and said image segmenting step segments image data of a specified area in the image data, compressed by said data reducing means, in input frames.

40. The scene change recording method according to claim 39, further comprising:

signal converting step for consecutively outputting a record instruction signal during a period from a predetermined scene change detection signal to the next scene change detection signal.

41. A scene change detecting device for detecting a change of scenes in moving picture data, comprising:

segmentation information storing means for storing segmentation information which indicates all areas to be extracted from image data in input frames;

detecting condition storing means for storing a condition set for detecting a scene-changed frame in which an image indicates a difference from a previous frame;

an image segmenting unit for segmenting image data in all areas specified by the segmentation information from among the image data in the input frames according to the segmentation information stored in said segmentation information storing means;

encoding means for encoding the image data in all areas segmented in said image segmenting means to produce encoded data;

code amount storing means for storing an amount of codes of the image data, encoded in said encoding means, in all areas in the previous frame;

code amount difference calculating means for calculating a predetermined difference between the amount of codes in the image data encoded by said encoding means in all specified areas in a present frame and the amount of codes in the encoded data, stored in said code amount storing means, in the previous frame; and scene change detecting means for determining whether there is a change of scenes between the present frame and the previous frame in one of the specified areas segmented by said image segmenting unit according to the predetermined difference in the amount of codes calculated in said code amount difference calculating means and to the detection condition stored in said detection condition storing means, and for outputting a scene change detection signal if there is a change of scenes.

42. The scene change detecting device according to claim 41, wherein said detection condition refers to a standard value of the sum of the absolute values of the differences in the amount of codes;

said code amount difference calculating means obtains the sum of the differences in the amount of codes between the present frame and the previous frame for all specified areas; and said scene change detecting means determines whether or not there is a change of scenes between the present frame and the previous frame in a specified area by comparing the sum of the absolute values of the differences in the amount of codes calculated in said code amount difference calculating means with said standard value.

43. The scene change detecting device according to claim 41, wherein said detection condition refers to an average rate of difference in the amount of codes;

said code amount difference calculating means obtains the average rate of difference in the amount of codes between the present frame and the previous frame for all specified areas; and said scene change detecting means determines whether or not there is a change of scenes between the present frame and the previous frame in a specified area by comparing the average rate of difference in the amount of codes calculated in said code amount difference calculating means with said standard value.

44. The scene change detecting device according to claim 41, wherein said image segmenting means masks the image data in the input frames for the areas other than the specified areas, and outputs to said encoding means the image data to be encoded.

45. The scene change recording/regenerating device according to claim 41, comprising:

mark signal converting means for converting a scene change detection signal outputted by said scene change detecting device according to claim 41 to a mark signal indicating a change of scenes and outputting it;

image recording means for, when recording image data, adding a mark signal outputted by said mark signal converting means to a corresponding image data;

image regenerating means for regenerating the image data recorded by said image recording means; and image extracting means for extracting only the image data provided with a mark signal from the image data regenerated by said image data regenerating means; and image display means for displaying image data extracted by said image extracting means.

46. The scene change detecting device according to claim 41, wherein said encoding means encodes image data simultaneously for the specified areas as if they were a single area when there are a plurality of the specified areas.

47. A scene change recording device, comprising:

signal converting means for outputting a record instruction signal based on a scene change detection signal externally applied to indicate a scene-changed frame after determining the scene-changed frame by checking whether there is a change of scenes between a present frame and a previous frame in an area segmented according to a difference in amount of calculated codes and according to a detection condition; and image signal storing means for recording image data according to the recording instruction signal applied from said signal converting means.

48. The scene change recording device according to claim 47, wherein said signal converting means consecutively outputs the record instruction signal within a predetermined period each time the scene change detection signal is inputted.

49. The scene change recording device according to claim 47, wherein said signal converting means consecutively outputs the record instruction signal during a period from a predetermined scene change detection signal to the next scene change detection signal.

50. The scene change recording device according to claim 47, wherein said signal converting means consecutively outputted during a predetermined period if the scene change signals are consecutively outputs the record instruction signal for a predetermined number of times.

51. A scene change recording device receiving a scene change detection signal based on a predetermined difference in the amount of codes of corresponding encoded segmented image data for two frames, comprising:

signal converting means for outputting a record instruction signal based on the scene change detection signal; and image signal storing means for recording the image data according to the recording instruction signal applied from said signal converting means.

52. The scene change recording device according to claim 51, wherein said signal converting means consecutively outputs the record instruction signal within a predetermined period each time the scene change detection signal is inputted.

53. The scene change recording device according to claim 51, wherein said signal converting means consecutively outputs the record instruction signal during a period from a predetermined scene change detection signal to the next scene change detection signal.

54. The scene change recording device according to claim 50, wherein said signal converting means consecutively outputs the record instruction signal during a predetermined period if the scene change signals are consecutively inputted for a predetermined number of times.

55. A scene change recording/regenerating device receiving a scene change detection signal indicating a change between two frames obtained by calculating a code amount difference in image data of the two frames, comprising:

mark signal converting means for converting the scene change detection signal to a mark signal indicating a change of scenes and for outputting the mark signal;

image recording means for, when recording image data, adding a mark signal outputted by said mark signal converting means to corresponding image data;

image regenerating means for regenerating the image data recorded by said image recording means;

image extracting means for extracting only the image data provided with the mark signal from the image data regenerated by said image data regenerating means; and image display means for displaying the image data extracted by said image extracting means.

56. A scene change recording/regenerating device, comprising:

mark signal converting means for converting a scene change detection signal externally applied to indicate a scene-changed frame by checking whether there is a change of scenes between a present frame and a previous frame in an area segmented according to a difference in amount of calculated codes and according to a detection condition, to a mark signal indicating a change of scenes and for outputting the mark signal;

image recording means for, when recording image data, adding the mark signal outputted by said mark signal converting means to corresponding image data;

image regenerating means for regenerating the image data recorded by said image recording means;

image extracting means for extracting only the image data provided with the mark signal from the image data regenerated by said image data regenerating means; and image display means for displaying the image data extracted by said image extracting means.

57. A scene change recording/regenerating device, comprising:

high-speed image regenerating means for regenerating image data to be regenerated after skipping a few scenes at a predetermined rate;

image display means for displaying image data regenerated by said high-speed image regenerating means;

scene change detecting means for detecting a change of scenes in the image data after being scene-skipped and regenerated by said high-speed image regenerating means; and signal converting means for converting a detection signal outputted by said scene change detecting means to a regeneration stop signal to be outputted to said high-speed image regenerating means.

58. An encoding device for encoding image data, comprising:

encoding means for encoding image data of an input frame;

code amount storing means for storing a code amount in image data in a previous frame after the image data are encoded by said encoding means;

determining means for determining whether a present frame is a scene changed frame according to predetermined detection conditions and the code amount in the present frame as encoded by said encoding means compared with the code amount in the image data in the previous frame stored in said code amount storing means; and output means for outputting data in the input frame as being encoded by said encoding means and encoded data of information specifying a scene-changed frame determined by said determining means.

59. An encoding method for encoding image data, comprising the steps of:

encoding image data in an input frame;

determining whether a present frame is a scene-changed frame according to an amount of codes in the present frame, a code amount in the image data encoded prior to the present frame, and predetermined detection conditions; and outputting data in the input frame encoded in said encoding step and encoded data of information specifying a scene-changed frame determined in said determining step.

* * * * *

UNITED STATES PATENT AND TRADEMARK OFFICE
CERTIFICATE OF CORRECTION

PATENT NO. : 5,614,960
DATED : March 25, 1997
INVENTOR(S) : Hirotaka CHIBA, et al.

It is certified that error appears in the above-indentified patent and that said Letters Patent is hereby corrected as shown below:

TITLE PAGE [54] THE TITLE

"IMAGE DATA ENCODING METHOD AND DEVICE, IMAGE DATA RECONSTRUCTING METHOD AND DEVICE, SCENE CHANGE DETECTING METHOD AND DEVICE, SCENE CHANGE RECORDING DEVICE, AND IMAGE DATA SCENE CHANGE RECORD/REGENERATING DEVICE" should be --IMAGE DATA ENCODING METHOD AND DEVICE, IMAGE DATA RECONSTRUCTING METHOD AND DEVICE, SCENE CHANGE DETECTING METHOD AND DEVICE, SCENE CHANGE RECORDING DEVICE, AND IMAGE DATA SCENE CHANGE RECORD/REGENERATING DEVICE--.

Column 1

Line 7, "RECORD/REGENERATING DEVICE" should be --RECORDING/REGENERATING DEVICE--.

Column 45

Line 67, delete "24".

Signed and Sealed this

Tenth Day of June, 1997

Attest:

BRUCE LEHMAN

*Attesting Officer*  *Commissioner of Patents and Trademarks*